United States Patent
Kim et al.

(10) Patent No.: US 11,700,659 B2
(45) Date of Patent: *Jul. 11, 2023

(54) METHOD AND APPARATUS FOR PERFORMING USER EQUIPMENT CAPABILITY PROCEDURE FOR SUPPORTING VEHICLE COMMUNICATION IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Sangyeob Jung, Suwon-si (KR); Soenghun Kim, Suwon-si (KR); Hyunjeong Kang, Suwon-si (KR); Seungri Jin, Suwon-si (KR); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,562

(22) Filed: Jun. 30, 2022

(65) Prior Publication Data
US 2022/0330370 A1 Oct. 13, 2022

Related U.S. Application Data

(63) Continuation of application No. 16/789,686, filed on Feb. 13, 2020, now Pat. No. 11,382,156.

(30) Foreign Application Priority Data

Feb. 14, 2019 (KR) .................. 10-2019-0017418

(51) Int. Cl.
*H04W 4/00* (2018.01)
*H04W 76/15* (2018.01)
(Continued)

(52) U.S. Cl.
CPC .......... *H04W 76/15* (2018.02); *H04W 48/08* (2013.01); *H04W 48/16* (2013.01); *H04W 76/14* (2018.02); *H04W 76/27* (2018.02); *H04W 88/06* (2013.01)

(58) Field of Classification Search
CPC ..... H04W 76/15; H04W 76/27; H04W 76/14; H04W 48/16; H04W 48/08; H04W 88/06
(Continued)

(56) References Cited

U.S. PATENT DOCUMENTS 10,630,410 B2  4/2020  Parkvall et al.
10,938,733 B2  3/2021  Ganesan et al.
(Continued)

FOREIGN PATENT DOCUMENTS

WO    2018/064068 A1    4/2018

OTHER PUBLICATIONS

LTE; E-UTRA and EPC; Common test environments for User Equipment (UE) conformance testing (3GPP TS 36.508 version 15.3.0 Release 15), ETSI TS 136 508 V15.3.0, Oct. 19, 2018, pp. 40, 246, 384, 620.
(Continued)

*Primary Examiner* — Marceau Milord
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method of performing user equipment capability procedure
(Continued)

US 11,700,659 B2

Page 2 for supporting vehicle communication in a next generation mobile communication system is provided.

12 Claims, 23 Drawing Sheets

(51) Int. Cl.
*H04W 76/27* (2018.01)
*H04W 76/14* (2018.01)
*H04W 48/16* (2009.01)
*H04W 48/08* (2009.01)
*H04W 88/06* (2009.01)

(58) Field of Classification Search
USPC .................. 370/329, 331, 312, 335, 394
See application file for complete search history.

(56) References Cited

U.S. PATENT DOCUMENTS

| | | | |
|---|---|---|---|
| 11,382,156 B2 * | 7/2022 | Kim ................. | H04W 88/06 |
| 11,425,775 B2 * | 8/2022 | Ganesan ............ | H04B 7/0695 |
| 2013/0143542 A1 | 6/2013 | Kovvali et al. | |
| 2013/0273857 A1 | 10/2013 | Zhang et al. | |
| 2016/0021526 A1 | 1/2016 | Niu et al. | |
| 2016/0242109 A1 | 8/2016 | Kwak et al. | |
| 2016/0380791 A1 | 12/2016 | Vishwanathan | |
| 2017/0273055 A1 | 9/2017 | Xu et al. | |
| 2018/0013513 A1 | 1/2018 | Pachnicke | |
| 2018/0092067 A1 | 3/2018 | Liu et al. | |
| 2018/0092085 A1 | 3/2018 | Shaheen et al. | |
| 2018/0124650 A1 | 5/2018 | Park et al. | |
| 2018/0184428 A1 | 6/2018 | Cariou et al. | |
| 2019/0028974 A1 | 1/2019 | Wang et al. | |
| 2019/0110175 A1 | 4/2019 | Chun et al. | |
| 2019/0149365 A1 | 5/2019 | Chatterjee et al. | |
| 2019/0281587 A1 | 9/2019 | Zhang et al. | |
| 2019/0313222 A1 | 10/2019 | Karampatsis et al. | |
| 2019/0313469 A1 | 10/2019 | Karampatsis et al. | |
| 2019/0320488 A1 * | 10/2019 | Mildh ................ | H04W 76/30 |
| 2020/0092685 A1 * | 3/2020 | Fehrenbach ......... | H04W 36/18 |
| 2020/0178039 A1 | 6/2020 | Lee et al. | |
| 2020/0229104 A1 | 7/2020 | Molavianjazi et al. | |
| 2020/0250990 A1 * | 8/2020 | Heath ................ | G06Q 50/30 |
| 2020/0252990 A1 | 8/2020 | Ganesan et al. | |
| 2020/0267799 A1 | 8/2020 | Lee et al. | |
| 2020/0295883 A1 | 9/2020 | Lee et al. | |
| 2020/0305176 A1 | 9/2020 | Hu et al. | |
| 2020/0337107 A1 * | 10/2020 | Mildh ................ | H04W 76/22 |
| 2020/0359251 A1 | 11/2020 | Gunnarsson et al. | |
| 2021/0058899 A1 | 2/2021 | Lee et al. | |
| 2021/0112375 A1 | 4/2021 | Lee et al. | |
| 2021/0127377 A1 | 4/2021 | Lee et al. | |
| 2021/0160890 A1 | 5/2021 | Selvanesan et al. | |
| 2021/0204238 A1 | 7/2021 | Li et al. | |
| 2021/0219187 A1 | 7/2021 | Lee et al. | |
| 2021/0250957 A1 | 8/2021 | Roth-Mandut et al. | |
| 2022/0141738 A1 * | 5/2022 | Chou ................ | H04L 41/5051 455/437 |
| 2022/0167441 A1 * | 5/2022 | Lee .................. | H04W 28/0278 |
| 2022/0173781 A1 * | 6/2022 | Hou ................. | H04L 5/0048 |
| 2022/0322369 A1 * | 10/2022 | Wu .................. | H04W 8/18 |

OTHER PUBLICATIONS

3GPP; TSG RAN; Mission Critical (MC) services over LTE; Part 1: Common test environment (Release 14), 3GPP TS 36.579-1 V14.1.0, Dec. 19, 2018, sections 5.4.2.2, 5.4.6.1.

International Search Report dated May 25, 2020, issued in International Patent Application No. PCT/KR2020/002064.

* cited by examiner

METHOD AND APPARATUS FOR PERFORMING USER EQUIPMENT CAPABILITY PROCEDURE FOR SUPPORTING VEHICLE COMMUNICATION IN NEXT GENERATION MOBILE COMMUNICATION SYSTEM

CROSS-REFERENCE TO RELATED APPLICATION(S)

This application is a continuation application of prior application Ser. No. 16/789,686, filed on Feb. 13, 2020, which will be issued as U.S. Pat. No. 11,382,156 on Jul. 5, 2022, which is based on and claimed priority under 35 U.S.C. § 119(a) of a Korean patent application number 10-2019-0017418, filed on Feb. 14, 2019, in the Korean Intellectual Property Office, the disclosure of which is incorporated by reference herein in its entirety.

BACKGROUND

1. Field

The disclosure relates to a method and apparatus for performing a user equipment capability procedure for supporting vehicle communication in a next generation mobile communication system. More particularly, the disclosure relates to a method and apparatus for configuring a measurement time period in a next generation mobile communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there is a need for a method of performing user equipment capability procedure for supporting vehicle communication in a next generation mobile communication system with development of Long Term Evolution (LTE) and LTE-Advanced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of performing user equipment capability procedure for supporting vehicle communication in a next generation mobile communication system.

Another aspect of the disclosure is to provide a method of configuration a measurement time period in a next generation mobile communication system.

Additional aspects will be set forth in part in the description which follows and, in part, will be apparent from the description, or may be learned by practice of the presented embodiments.

In accordance with an aspect of the disclosure, an efficient communication method between a user equipment (UE) and a base station that perform a UE capability procedure for supporting vehicle communication in a next generation mobile communication system are provided.

In accordance with another aspect of the disclosure, an efficient communication method between a UE and a base station that configure a measurement time period in a next generation mobile communication system are provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1O is a diagram illustrating a structure of a user equipment according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Embodiment

Figure 1A:
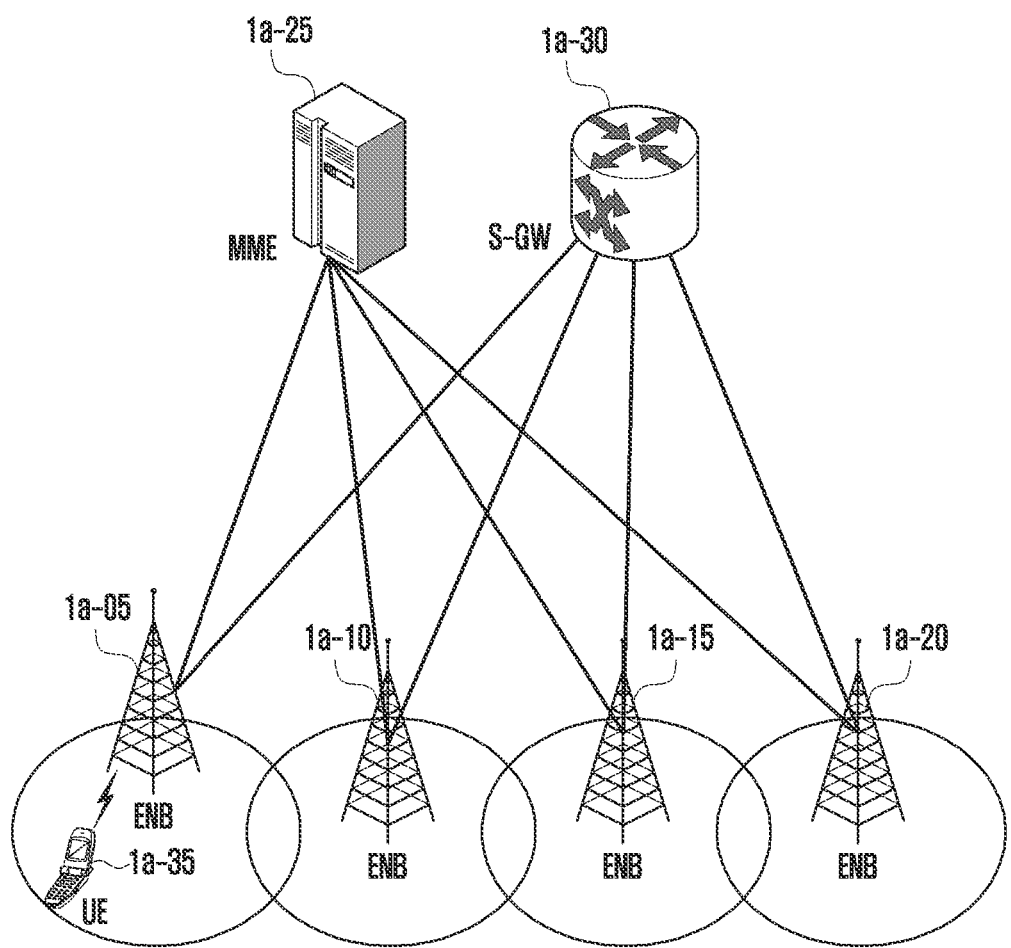
FIG. 1A is a diagram illustrating a structure of an LTE system according to an embodiment of the disclosure.

FIG. 1A is a diagram illustrating a structure of an LTE system according to an embodiment of the disclosure.

Referring to FIG. 1A, a wireless access network of an LTE system may include: next generation base stations (Evolved Node B)(hereafter, ENB, Node B, or base station) 1a-05, 1a-10, 1a-15, and 1a-20; a Mobility Management Entity (MME) 1a-25; and a Serving-Gateway (S-GW) 1a-30. A user equipment (hereafter, UE or terminal) 1a-35 may be connected to an external network through the ENBs 1a-05 to 1a-20 and the S-GW 1a-30.

In FIG. 1A, the ENBs 1a-05 to 1a-20 may correspond to existing node Bs in a Universal Mobile Telecommunication System (UMTS). The ENBs may be connected to the UE 1a-35 through a radio channel and can perform more complicated functions than the existing node Bs. In an LTE system, all user traffics including a real-time service such as a Voice over IP (VoIP) through an internet protocol may be serviced through a shared channel. Accordingly, there is a need for a device that performs scheduling by combining state information such as the buffer state, the available transmission power state, and the channel state of UEs, and the ENBs 1a-05 to 1a-20 can take charge of the device.

One ENB usually can control several cells. For example, in order to implement a transmission speed of 100 Mbps, an LTE system, for example, may use Orthogonal Frequency Division Multiplexing (OFDM) at a bandwidth of 20 MHz as a wireless connection technology. It may also possible to apply modulation scheme and Adaptive Modulation & Coding (AMC) determining a channel coding rate, depending on the channel state of a user equipment. The S-GW 1a-30 is a device that provides a data bearer, and can generate or remove a data bearer in accordance with control by the MME 1a-25. The MME, which is a device tacking charge of not only a mobility management function for UEs, but also various control functions, can be connected with several base stations.

Figure 1B:
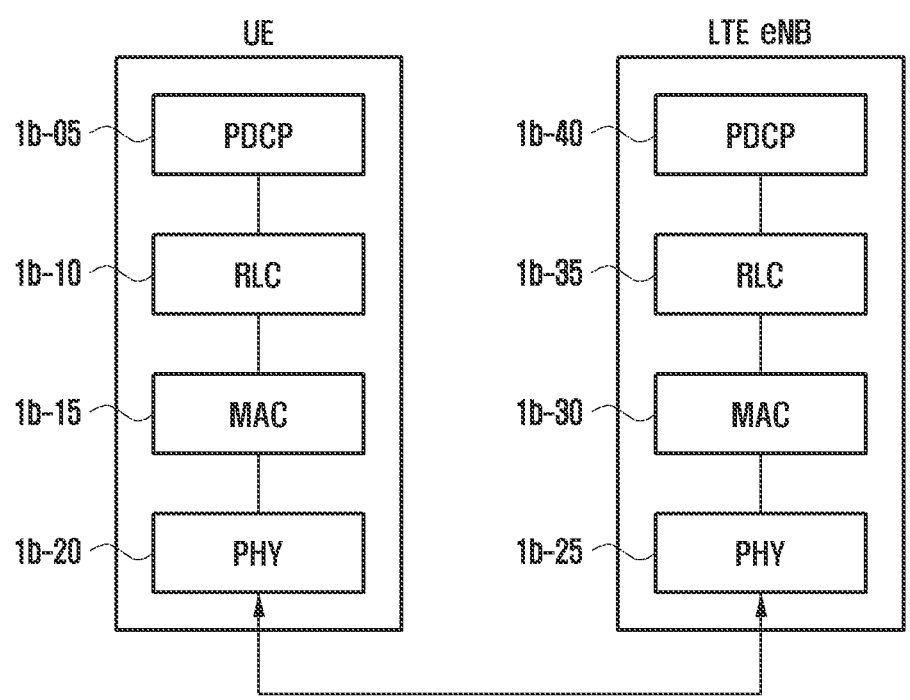
FIG. 1B is a diagram illustrating a radio protocol architecture of an LTE system according to an embodiment of the disclosure.

FIG. 1B is a diagram illustrating a radio protocol architecture of an LTE system according to an embodiment of the disclosure.

Referring to FIG. 1B, the radio protocol of the LTE system may include Packet Data Convergence Protocols (PDCP) 1b-05 and 1b-40, Radio Link Controls (RLC) 1b-10 and 1b-35, and Medium Access Controls (MAC) 1b-15 and 1b-30 respectively in a user equipment and an ENB. The PDCP can take charge of operations such as IP header compression/restoration. The main functions of the PDCP may be summarized as follows.

Header compression and decompression (Header compression and decompression: ROHC only)
Transmission of user data (Transfer of user data)
Sequential transmission (In-sequence delivery of upper layer Protocol Data Units (PDUs) at PDCP re-establishment procedure for RLC Acknowledged Mode (AM))
Reordering (For split bearers in Dual Connectivity (DC) (only support for RLC AM): PDCP PDU routing for transmission and PDCP PDU reordering for reception)
Duplicate detection (Duplicate detection of lower layer Service Data Units (SDUs) at PDCP re-establishment procedure for RLC AM)
Retransmission (Retransmission of PDCP SDUs at handover and, for split bearers in DC, of PDCP PDUs at PDCP data-recovery procedure, for RLC AM)
Ciphering and deciphering
Timer-based SDU deletion (Timer-based SDU discard in uplink)

The RLCs 1b-10 and 1b-35 can perform an Automatic Repeat Query (ARQ) operation, etc. by reconfiguring the PDCP PDU in an appropriate size. The main functions of the RLC may be summarized as follows.
Transmission of data (Transfer of upper layer PDUs)
ARQ function (Error Correction through ARQ (only for AM data transfer))
Concatenation, segmentation and reassembly (Concatenation, segmentation and reassembly of RLC SDUs (only for Unacknowledged Mode (UM) and AM data transfer))
Re-segmentation (Re-segmentation of RLC data PDUs (only for AM data transfer))
Reordering (Reordering of RLC data PDUs (only for UM and AM data transfer))
Duplicate detection (Duplicate detection (only for UM and AM data transfer))
Error detection (Protocol error detection (only for AM data transfer))
RLC SDU deletion (RLC SDU discard (only for UM and AM data transfer))
RLC re-establishment The MACs 1b-15 and 1b-30 are connected with several RLC layer devices configured in one user equipment and can perform the operation of multiplexing RLC PDUs into an MAC PDU and demultiplexing RLC PDUs from an MAC PDU. The main functions of the MAC may be summarized as follows:

Mapping (Mapping between logical channels and transport channels)
Multiplexing/demultiplexing (Multiplexing/demultiplexing of MAC SDUs belonging to one or different logical channels into/from transport blocks (TB) delivered to/from the physical layer on transport channels)
Scheduling information reporting
Hybrid ARQ (HARQ) function (Error correction through HARQ)
Priority handling between logical channels (Priority handling between logical channels of one UE)
Priority handling between UEs (Priority handling between UEs by means of dynamic scheduling)
Multimedia Broadcast Multicast Services (MBMS) service identification
Transport format selection
Padding The physical layers 1b-20 and 1b-25 can perform make upper layer data into OFDM symbols by coding and modulating them and transmit the OFDM symbols to a radio channel or can demodulate OFDM symbols received through a radio channel, perform channel-decoding, and transmit them to an upper layer.

Figure 1C:
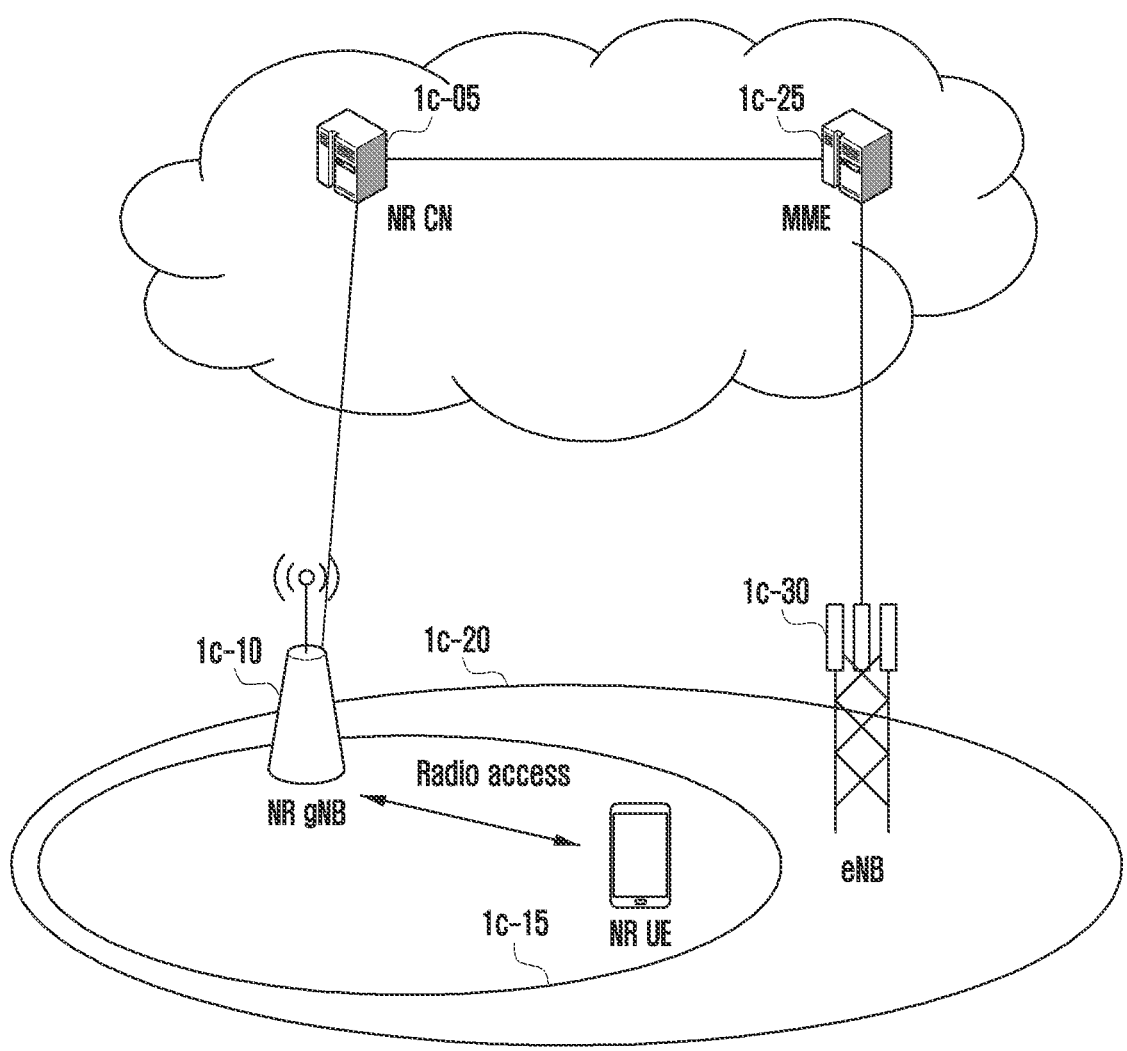
FIG. 1C is a diagram illustrating a structure of a next generation mobile communication system according to an embodiment of the disclosure.

FIG. 1C is a diagram illustrating a structure of a next generation mobile communication system according to an embodiment of the disclosure.

Referring to FIG. 1C, a radio access network of a next generation mobile communication system (hereafter, NR or 5g) may include a new radio node B (hereafter, NR gNB or NR base station) (1c-10) and a New Radio Core Network (NR CN) 1c-05. A New Radio User Equipment (NR UE or user equipment) 1c-15 in a cell 1c-20 can be connected to an external network through the NR gNB 1c-10 and the NR CN 1c-05.

In FIG. 1C, the NR gNB 1c-10 may correspond to an Evolved Node B (eNB) of an existing LTE system. The NR gNB is connected with the NR UE 1c-15 through a radio channel and can provide a superior service more than an existing node B. In a next generation mobile communication system, all user traffics can be serviced through a shared channel. Accordingly, there is a need for a device that performs scheduling by combining state information such as the buffer state, the available transmission power state, and the channel state of UEs, and the NR NB 1c-10 can take charge of the device. One NR gNB usually can control several cells. In a next generation mobile communication system, a bandwidth over the current maximum bandwidth may be applied to implement high-speed data transmission in comparison to the current LTE. A beamforming technology may be employed by using Orthogonal Frequency Division Multiplexing (OFDM) as a radio connection technology. It may also possible to apply modulation scheme and Adaptive Modulation & Coding (hereafter, referred to as AMC) determining a channel coding rate, depending on the channel state of a user equipment.

The NR CN 1c-05 can perform function such as mobility support, bearer configuration, and Quality of Service (QoS) configuration. The NR CN, which is a device being in charge of not only a mobility management function for UEs, but also various control functions, can be connected with several base stations. The next generation mobile communication systems may operate with an existing LTE system and the NR CN may be connected with the MME 1c-25 through a network interface. The MME may be connected with the eNB 1c-30 that is an existing base station.

Figure 1D:
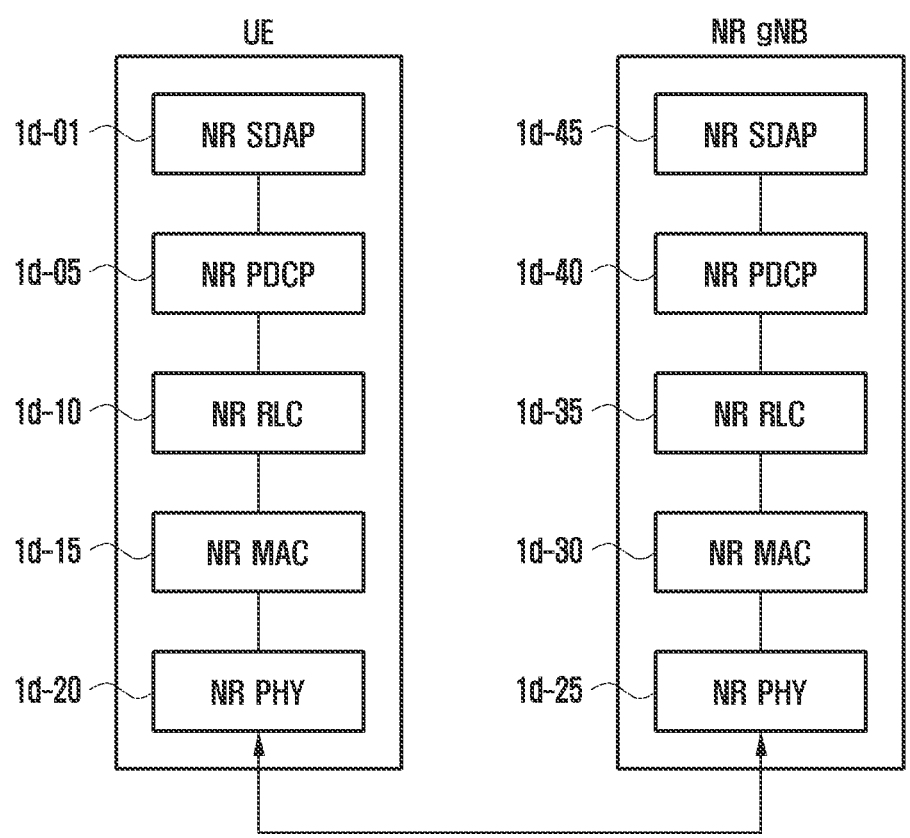
FIG. 1D is a diagram illustrating a radio protocol architecture of a next generation mobile communication system according to an embodiment of the disclosure.

FIG. 1D is a diagram illustrating a wireless protocol architecture of a next generation mobile communication system according to an embodiment of the disclosure.

Referring to FIG. 1D, a radio protocol of a next generation mobile communication system includes an NR Service Data Adaptation Protocols (SDAP) 1d-01 and 1d-45, NR PDCPs 1d-05 and 1d-40, NR RLC 1d-10 and 1d-35, NR MACs 1d-15 and 1d-30, and NR PHYs 1d-20 and 1d-25, respectively in a user equipment and an NR base station.

The main function of the NR SDAPs 1d-01 and 1d-45 may include some of the following functions:

Transmission of user data (Transfer of user plane data)
Mapping a QoS flow and a data bearer for an uplink and a downlink (Mapping between a QoS flow and a Data Radio Bearer (DRB) for both downlink (DL) and uplink (UL))
Marking a QoS flow Identifier (ID) for an uplink and a downlink (Marking QoS flow ID in both DL and UL packets)
Mapping a reflective QoS flow to a data bearer for uplink SDAP PDUs (reflective QoS flow to DRB mapping for the UL SDAP PDUs)

For an SDAP layer device, a user equipment can receive whether to use the header of the SDAP device or whether to use the function of the SDAP layer device for each of PDCP layer device, each bearer, or each logical channel through a Radio Resource Control (RRC) message. When an SDAP header is set, the user equipment can instruct a Non-Access Stratum (NAS) QoS (Quality of Service) reflective 1-bit indicator (NAS reflective QoS) and an Access Stratum (AS) QoS reflective 1-bit indicator (AS reflective QoS) of the SDAP header to update or reset the mapping information of the QoS flow and the data bearer of the uplink and the downlink. The SDAP header may include QoS flow ID information showing a QoS. The QoS information may be used as a data processing priority, scheduling information, etc. for supporting a smooth service.

The main function of the NR PDCP 1d-05 and 1d-40 may include some of the following functions:

Header compression and decompression (Header compression and decompression: ROHC only)
Transmission of user data (Transfer of user data)
Sequence transmission (In-sequence delivery of upper layer PDUs)
Non-sequence transmission Out-of-sequence delivery of upper layer PDUs)
Reordering (PDCP PDU reordering for reception)
Duplicate detection (Duplicate detection of lower layer SDUs)
Retransmission (Retransmission of PDCP SDUs)
Ciphering and deciphering
Timer-based SDU deletion (Timer-based SDU discard in uplink)

In the above description, the reordering of the NR DPCP device may mean a function of sequentially reordering PDCP PDU from a downlink, based on a PDCP SN (sequence number). The reordering of the NR PDCP device may include a function of transmitting data to an upper layer in a rearranged order, may include a function of directly transmitting data without considering the order, may include a function of recording missing PDCP PDUs by rearranging the order, may include a function of reporting the state of the missing PDCP PDUs to a transmission side, and may include a function of re-requesting retransmission of the missing PDCP PDUs.

The main function of the NR RLC 1d-10 and 1d-35) may include some of the following functions:

Transmission of data (Transfer of upper layer PDUs)
Sequence transmission (In-sequence delivery of upper layer PDUs)
Non-sequence transmission (Out-of-sequence delivery of upper layer PDUs)
ARQ function (Error correction through ARQ)
Concatenation, segmentation and reassembly (Concatenation, segmentation and reassembly of RLC SDUs)
Re-segmentation (Re-segmentation of RLC data PDUs)
Reordering (Reordering of RLC data PDUs)
Duplicate detection
Error detection (Protocol error detection)
RLC SDU deletion (RLC SDU discard)
RLC re-establishment In the above description, the sequential transmission (in-sequence delivery) of the NR RLC device may mean a function of sequentially transmitting RLC SDUs received from a lower layer to an upper layer. When one RLC SDU is divided into several RLC SDUs and received, the sequential transmission (in-sequence delivery) of the NR RLC device may include a function of reassembling and transmitting the divided RLC SDUs.

The sequential transmission (in-sequence delivery) of the NR RLC device may include a function of reordering received RLC PDUs, based on RLC SNs (sequence number) or PDCP SNs (sequence number), may include a function of recording missing RLC PDUs by rearranging the order, may include a function of reporting the state of the missing RLC PDUs to a transmission side, and may include a function of re-requesting retransmission of the missing RLC PDUs.

The sequential transmission (in-sequence delivery) of the NR RLC devices 1d-10 and 1d-35 may include a function of transmitting only the RLC SDUs before the missing RLC SDUs to an upper layer when there are missing RLC SDUs. Further, the sequential transmission (in-sequence delivery) of the NR RLC device may include a function of sequentially transmitting all of RLC SDUs received before a predetermined timer starts to an upper layer if the predetermined timer is expired even if there is a missing RLC SDU. Further, the sequential transmission (in-sequence delivery) of the NR RLC device may include a function of sequentially transmitting all of RLC SDUs received up to now to an upper layer if the predetermined timer is expired even if there is a missing RLC SDU.

The NR RLC devices 1d-10 and 1d-35 can process and transmit RLC PDUs to the NR PDCP devices 1d-05 and 1d-40 in the reception order regardless of the order of the sequence numbers (out-of sequence delivery).

When the NR RLC devices 1d-10 and 1d-35 receive a segment, they can receive segments stored in a buffer or to be received later, reconfigure them into one complete RLC PDU, and then transmit it to the NR PDCP device.

The NR RLC layer may not include a concatenation function and can perform the function in an NR MAC layer or may replace the function with a multiplexing function of the NR MAC layer.

In the above description, the non-sequential transmission (out-of-sequence delivery) of the NR RLC device may mean a function of transmitting RLC SDUs received from a lower layer to the immediate upper layer regardless of the order. When non-sequential transmission (out-of-sequence delivery) of the NR RLC device may include a function of reassembling and transmitting divided RLC SDUs when one RLC SDU is divided into several RLC SDUs. The non-sequential transmission (out-of-sequence delivery) of the NR RLC device may include a function of storing the RLC SNs or the PDCP SNs of received RLC PDUs, reordering them, and recording missing RLC PDUs.

The NR MACs 1d-15 and 1d-30 may be connected with several NR RLC layer devices configured in one user equipment and the main function of the NR MACs may include some of the following functions:

Mapping (Mapping between logical channels and transport channels)
Multiplexing/demultiplexing (Multiplexing/demultiplexing of MAC SDUs)
Scheduling information reporting
HARQ function (Error correction through HARQ)
Priority handling between logical channels (Priority handling between logical channels of one UE)
Priority handling between UEs (Priority handling between UEs by means of dynamic scheduling)
MBMS service identification
Transport format selection
Padding NR PHY layers 1d-20 and 1d-25 can make upper layer data into OFDM symbols by coding and modulating them and transmit the OFDM symbols to a radio channel or can demodulate OFDM symbols received through a radio channel, perform channel-decoding, and transmit them to an upper layer.

Figure 1E:
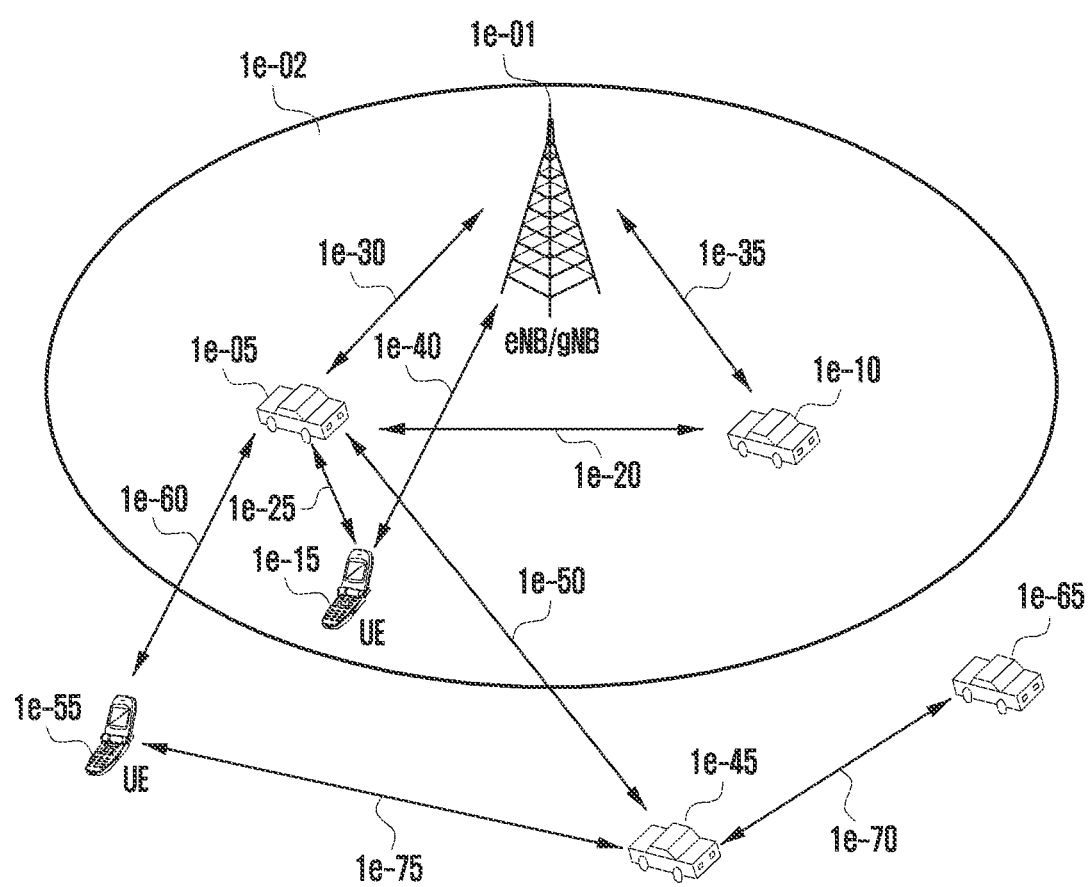
FIG. 1E is a diagram vehicle-to-everything (V2X) communication by a next generation mobile communication system according to an embodiment of the disclosure.

FIG. 1E is a diagram V2X communication by a next generation mobile communication system according to an embodiment of the disclosure.

V2X (vehicle-to-everything) according to an embodiment of the disclosure generally means a communication technology with a vehicle through all interfaces, and there are V2V (vehicle-to-vehicle), V2I (vehicle-to-infrastructure), V2P (vehicle-to-pedestrian), V2N (vehicle-to-network), etc. in accordance with the type and the components for communication.

Referring to FIG. 1E, a base station 1e-01 may include at least one vehicle UE 1e-05 and 1e-10 and pedestrian portable UE 1e-15 that are included in a cell 1e-02 supporting V2X. The V2X in this case can be supported through a Uu interface and/or a PC5 interface. The Uu interface is the radio interface between the mobile and the radio access network. When V2X is supported through a Uu interface, for example, the vehicle UEs 1e-05 and 1e-10 can perform V2X cellular communication using the base station 1e-01 and a vehicle UE-base station uplink (UL)/downlink (DL) 1e-30 and 1e-35 and the pedestrian portable UE 1e-15 can perform V2X cellular communication using a pedestrian UE-base station UL/DL 1e-40. When V2X is supported by a PC5 interface, it is possible to perform V2X SL communication using UE-UE SLs 1e-20 and 1e-25. For example, the vehicle UE 1e-05 existing in the coverage of the base station (in coverage of Evolved-Universal Terrestrial Radio Access (E-UTRA)/NR) can transmit/receive a V2X packet through SLs 1e-20, 1e-50, 1e-25, and 1e-60 that are transmission channels to/from other vehicle UEs 1e-10 and 1e-45 and/or pedestrian portable UEs 1e-15 and 1e-55. The V2X packet can be transmitted/received in a broadcast transmission type and/or a unicast and/or groupcast transmission type.

The UE that supports V2X SL communication can transmit/receive a V2X packet through a resource assignment mode (scheduled resource assignment or UE autonomous resource selection). Scheduled resource allocation (mode 1 and/or mode 3) is a mode in which a base station allocates resources that are used for slide link transmission in a dedicated scheduling type to an RRC connected mode equipment. The mode enables a base station to manage sidelink resources, it may be efficient in interference management and/or management of resource pool (dynamic allocation, semi-persistence transmission). When there are data to be transmitted to other equipment(s), the RRC connected mode UE can inform a base station that there are data to be transmitted to other UE(s) using an RRC message or an MAC control element (hereafter, CE). For example, the RRC message may be SidelinkUEInformation and UEAssistanceInformation messages, and the MAC CE may be a buffer state report MAC CE of a new format (including information about at least an indicator notifying a buffer report state for V2X communication and a data size buffered from sidelink communication).

UE autonomous resource selection (mode 2 and/or mode 4) is a mode in which a base station provides sidelink resource information/pool to a UE supporting side link communication through system information and/or an RRC message and the UE selects a resource in accordance with a predetermined rule. For example, a base station can provide sidelink resource information to equipment by signaling SIBx, etc. to be newly defined for an SIB21, SIB26, or NR V2X UE. As the RRC message, for example, a base station can provide sidelink resource information to a UE by signaling an RRC connected reconfiguration message (RRCReconfiguration message) and/or an RRC resume message (RRCResume message). UE autonomous resource selection may help a UE to select a resource to be used for a sidelink for other UE(s) through a PC5-RRC message and/or an MAC CE or may allocate a resource to be used for sidelink transmission through direct/indirect scheduling. That is, the UE autonomous resource selection mode may be referred to as one or a plurality of the following:

UE autonomously selects sidelink resource for transmission
UE assists sidelink resource selection for other UEs
UE is configured with NR configured grant for sidelink transmission
UE schedules sidelink transmission of other UEs A resource selection method of a UE may include zone mapping, sensing-based resource selection, random selection, and configured grant-based resource selection.

A UE that supports V2X SL communication can transmit/receive a V2X packet, based on a predetermined resource poll (Preconfiguration resource) included in SL-V2X-Preconfiguration that is an information element (hereafter, IE). For example, when a UE cannot perform V2X SL communication, based on the scheduled resource allocation and/or UE autonomous resource selection mode due to a predetermined reason even if the UE exists in the coverage of a base station, the UE can perform V2X SL communication through an SL transmission/reception resource pool preconfigured in the SL-V2X-Preconfiguration that is an IE. A vehicle UE 1e-45 that is out of the coverage of base station (out-of-coverage of E-UTRA/NR) can perform V2X SL communication with another vehicle UE 1e-65 or pedestrian portable UE 1e-55, based on the SL Preconfiguration resource through the SLs 1e-70 and 1e-75 that are transmission channels.

LTE V2X SL communication is designed mainly for a basic safety service. That is, a UE supporting LTE V2X SL communication is designed to provide a basic safety service to all surrounding UEs supporting LTE V2X SL communication through a broadcast transmission type. Accordingly, the UE does not need to perform a process of separately making session with another specific UE or to perform a sidelink connection establishment procedure.

However, V2X SL communication may be designed to provide not only a basic safety service, but also various and improved services (for example, an autonomous service, a platooning service, a remote driving service, and an in-vehicle infotainment service) in next generation mobile communication (NR). Accordingly, NR V2X SL communication may be designed to be supported by not only a broadcast transmission type, but also a unicast and/or group-cast transmission type.

Figure 1F:
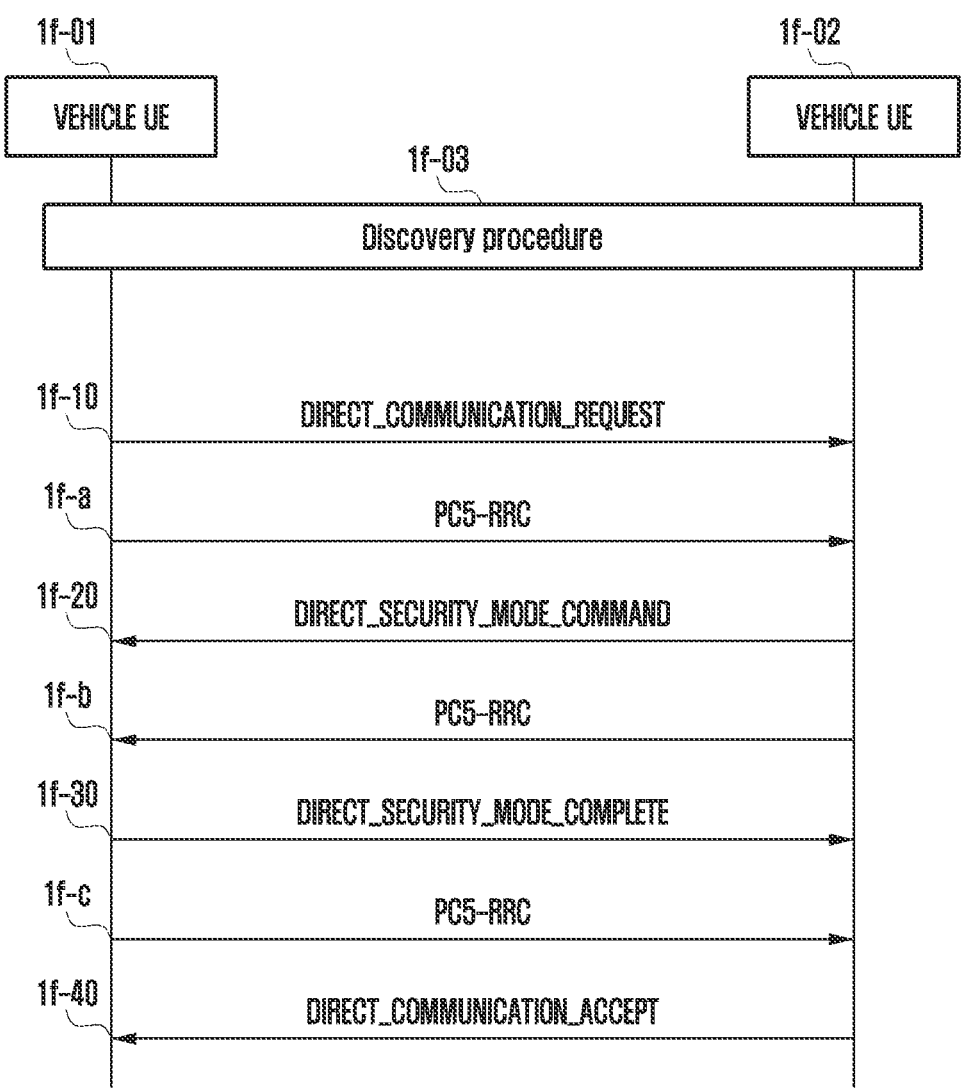
FIG. 1F is a diagram illustrating a unicast link establishment procedure to support a new radio (NR) V2X sidelink (SL) unicast according to an embodiment of the disclosure.

FIG. 1F is a diagram illustrating a unicast link establishment procedure to support an NR V2X SL unicast according to an embodiment of the disclosure.

Referring to FIG. 1F, in order to establish a UE-UE unicast link, a vehicle UE 1f-01 can perform a discovery procedure (operation 1f-03) with another vehicle UE 1f-02. Accordingly, the vehicle UE 1f-01 can acquire a link layer identifier of the vehicle UE 1f-02. For example, the link layer identifier may mean a Layer 2 ID, a Destination Layer 2 ID, or a Destination ID that is used in NR V2X SL unicast communication.

When the operation 1f-03 is finished, the vehicle UE 1f-01 can perform an upper layer connection establishment procedure and/or an AS layer connection establishment procedure to establish UE-UE SL connection with the vehicle UE 1f-02. Although the upper layer connection establishment procedure is described and then the AS layer connection establishment procedure is described for the convenience of description herein, the upper layer connection establishment procedure is described and the AS layer connection establishment procedure may be independently performed, or may be performed in parallel, or may be performed through one process.

The upper layer connection establishment procedure may be performed through next series of processes (operation 1f-10, operation 1f-20, operation 1f-30, and operation 1f-40) between UEs, based on a PC5 signaling protocol procedure defined in Rel-15 D2D.

The vehicle UE 1f-01 transmits a DIRECT_COMMUNICATION_REQUEST message to another vehicle UE 1f-02 (operation 1f-10):

It is the first PC5 signaling message that the vehicle UE 1f-01 transmits to the vehicle UE 1f-02 to request direct link establishment (which is referred to a PC5 signaling message because it is generated in a PC5 signaling protocol).

The vehicle UE 1f-01 receives a DIRECT_SECURITY_MODE_COMMAND message from the vehicle UE 1f-02 (operation 1f-20):

It is the first PC5 signaling message that the vehicle UE 1f-02 transmits to the vehicle UE 1f-01 to establish a direct security mode while establishing the direct link (which is referred to a PC5 signaling message because it is generated in a PC5 signaling protocol).

The vehicle UE 1f-01 transmits a DIRECT_SECURITY_MODE_COMPLETE message to another vehicle UE 1f-02 (operation 1f-30):

It is a PC5 signaling message that the vehicle UE 1f-01 transmits to inform the vehicle UE 1f-02 that the direct security mode has been successfully established/finished while the direct link is established (which is referred to a PC5 signaling message because it is generated in a PC5 signaling protocol).

The vehicle UE 1f-01 transmits a DIRECT_COMMUNICATION_ACCEPT message to another vehicle UE 1f-02 (operation 1f-40):

It is a PC5 signaling message that the vehicle UE 1f-01 transmits to the vehicle UE 1f-02 to inform the vehicle UE 1f-02 that the direct link has been successfully established (which is referred to a PC5 signaling message because it is generated in a PC5 signaling protocol).

The PC5 signaling message that is transmitted/received during the upper layer connection process may include or not only some AS layer parameters and some of configuration information for establishing V2X SL connection between UEs. Accordingly, in order to establish V2X SL connection between UEs, not only the upper layer connection process, but also the AS layer connection procedure may be required.

The AS layer connection establishment procedure according to an embodiment of the disclosure may mean that the vehicle UE 1f-01 and the vehicle UE 1f-02 exchange AS layer parameters and configuration information for establishing V2X SL connection or NR V2X SL unicast communication through a PC5 RRC message. The PC5 RRC message may be transmitted/received through a logical channel that is generated in an RRC layer and newly defined in the NR. For example, the logical channel may be referred to as a Sidelink Control Channel (SCCH).

The PC5 RRC message (operation 1f-a and/or 1f-b and/or 1f-c) according to an embodiment of the disclosure may include at least one of the next AS layer parameter and configuration information.

An indicator or an IE that asks or notify whether V2X SL unicast communication support is available (or intension is available):

It is possible to check whether to perform V2X SL communication between UEs using a unicast through the indicator or the IE. For example, the vehicle UE 1f-01 can ask whether a V2X SL unicast is supported by transmitting a PC5-RRC message to another vehicle UE 1f-02, and as a response, the vehicle UE 1f-02 can inform the vehicle UE 1f-01 that communication is possible through the V2X SL unicast by transmitting a PC-5 RRC message.

UE ID: UE identifier:

It is possible to discriminate UEs that will perform or perform V2X SL unicast communication through the UE ID. For example, the UE ID may mean a Source Layer-2 ID and/or a Destination Layer-2 ID of a target UE for the unicast (herein, the target UE may mean the vehicle UE 1f-01 and/or the vehicle UE 1f-02). Alternatively, the UE ID may be a new Radio Network Temporary Identifier (RNTI) that can discriminate UEs such as an RNTI, and it is possible to perform an HARQ process between UEs, based on the RNTI.

Radio bearer configuration: Radio bearer configuration information:

It is possible to exchange an SRB ID for an SRB and/or a DRB ID for a DRB that are used for NR V2X SL unicast communication between vehicle UEs, and/or configuration information related to a PDCP layer, and/or configuration information related to an SDAP layer. For example, the radio bearer configuration information may include some or all of srb-ToAddModList, drb-ToAddModList, drb-ToReleaseList, securityConfig, etc. that are information elements (hereafter, IE).

RLC bearer configuration: RLC bearer configuration information:

It is possible to exchange an ID for an SRB and/or a DRB used for NR V2X SL unicast communication between vehicle UEs, a logical channel ID (LCH-ID), an indicator showing whether it is required to reestablish an RLC layer, configuration information related to an RLC layer, and configuration information of an MAC-logical channel through the RLC bearer configuration information.

Configuration information for performing HARQ process:

It is possible to perform retransmission through an HARQ process in NR V2X SL unicast communication between vehicle UEs. For example, a timer for retransmission and a retransmission period may be included.

QoS-related configuration information: 5QI (5G QoS Indicator) VQI (V2X QoS Indicator) list/group:

It is possible to show QoS information for a desired V2X service in NR V2X SL unicast communication between vehicle UEs through the QoS-related configuration information. For example, a list of 5QIs or VQIs may be included in the QoS-related configuration information.

QoS-related configuration information: IE including a ProSe Per-Packet Priority (PPPP) and/or Prose Per-Packet Reliability (PPPR) list and/or traffic pattern information:

It is possible to show QoS information for a desired V2X service or show information that performs Packet Duplication or perform SPS or ConfiguredGrant Type 1 or ConfiguredGrant Type 2 in NR V2X SL unicast communication between vehicle UEs through the QoS-related configuration information. For example, the IE may include PPPPInfoSL and/or reliabilityInfoListSL and/or SL-V2X-PacketDuplicationConfig and/or trafficPatternInfoListSL.

IE including a ProSe Per-Packet Priority (PPPP) and/or Prose Per-Packet Reliability (PPPR) list and/or traffic pattern information:

It is possible to show QoS information for a desired V2X service or show information that performs Packet Duplication or perform SPS or ConfiguredGrant Type 1 or ConfiguredGrant Type 2 in NR V2X SL unicast communication between vehicle UEs through the IE. For example, the IE may include PPPPInfoSL and/or reliabilityInfoListSL and/or SL-V2X-PacketDuplicationConfig and/or trafficPatternInfoListSL.

IE including a ProSe Per-Packet Priority (PPPP) and/or Prose Per-Packet Reliability (PPPR) list and/or traffic pattern information:

It is possible to show QoS information for a desired V2X service or show information that performs Packet Duplication or perform SPS or ConfiguredGrant Type 1 or ConfiguredGrant Type 2 in NR V2X SL unicast communication between vehicle UEs through the IE. For example, the IE may include PPPPInfoSL and/or reliabilityInfoListSL and/or SL-V2X-PacketDuplicationConfig and/or trafficPatternInfoListSL.

Indicator or IE explicitly notifying whether to use a Preconfiguration transmission resource pool and/or reception resource pool:

It is possible to know whether to use a Preconfiguration transmission resource pool and/or reception resource pool and use a resource allocation mode-based transmission resource pool and/or reception resource pool in NR V2X SL unicast communication between vehicle UEs through the indicator or IE.

IE including an instructor explicitly notifying a resource allocation mode, or some of a resource allocation mode-based transmission resource pool and/or reception resource pool or a Preconfiguration transmission resource pool and/or reception resource pool:

It is possible to know whether to use some resources of a Preconfiguration resource pool and/or reception resource pool and use a resource allocation mode-based transmission resource pool and/or reception resource pool in NR V2X SL unicast communication between vehicle UEs through the indicator or IE.

The AS layer connection establishment procedure according to an embodiment of the disclosure may be performed independently from or in parallel with the upper layer connection establishment procedure or may be performed through one process. Accordingly, a point in time at which a PC5-RRC message (operation **1*f*-a, operation 1*f*-b, and operation 1*f*-c**) is proposed in the disclosure.

A first PC5-RRC message that the vehicle UE **1*f*-01 transmits to another vehicle 1*f*-02 to perform the an AS layer connection establishment procedure may be transmitted before a DIRECT_COMMUNICATION_REQUEST message (operation 1*f*-10) is transmitted or may be transmitted simultaneously with a DIRECT_COMMUNICATION_REQUEST message (operation 1*f*-10) or may be multiplexed and transmitted with a DIRECT_COMMUNICATION_REQUEST message (operation 1*f*-10) or may be transmitted after a DIRECT_COMMUNICATION_REQUEST message (operation 1*f*-10) is transmitted or may be transmitted after a DIRECT_SECURITY_MODE_COMMAND message (operation 1*f*-20) is received or may be transmitted before a DIRECT_SECURITY_MODE_COMPLETE message (operation 1*f*-30) is transmitted or may be transmitted simultaneously with a DIRECT_SECURITY_MODE_COMPLETE message (operation 1*f*-30) or may be multiplexed and transmitted with a DIRECT_SECURITY_MODE_COMPLETE message (operation 1*f*-30) or may be transmitted after a DIRECT_SECURITY_MODE_COMPLETE message (operation 1*f*-30) is transmitted or may be transmitted after a DIRECT_COMMUNICATION_ACCEPT message (operation 1*f*-40**) is received.

If the vehicle UE **1*f*-02 receives the PC5-RRC message (operation 1*f*-a) from the vehicle UE 1*f*-01, the vehicle UE 1*f*-02 can transmit a PC5-RRC message (operation 1*f*-b) to the vehicle UE 1*f*-01 as a response. The PC5-RRC message (operation 1*f*-b**):

may be transmitted after a PC5-RRC message (operation **1*f*-a) is received or may be transmitted before a DIRECT_SECURITY_MODE_COMMAND message (operation 1*f*-20**) is transmitted or may be transmitted simultaneously with a DIRECT_SE-
CURITY_MODE_COMMAND message (operation
1*f*-20) or may be multiplexed and transmitted with a DIRECT_SE-
CURITY_MODE_COMMAND message (operation
1*f*-20) or may be transmitted after a DIRECT_SECURITY_MOD-
E_COMMAND message (operation 1*f*-20) is transmit-
ted or may be transmitted after a DIRECT_SECURITY_MOD-
E_COMPLETE message (operation 1*f*-30) is received
or may be transmitted before a DIRECT_COMMUNICA-
TION_ACCEPT message (operation 1*f*-40) is transmit-
ted or may be transmitted simultaneously with a DIRECT_
COMMUNICATION_ACCEPT message (operation
1*f*-40) or may be multiplexed and transmitted with a DIRECT_
COMMUNICATION_ACCEPT message (operation
1*f*-40) or may be transmitted after a DIRECT_COMMUNICA-
TION_ACCEPT message (operation 1*f*-40) is transmit-
ted.

If the vehicle UE 1*f*-01 receives the PC5-RRC message
(operation 1*f*-*b*) from the vehicle UE 1*f*-02, the vehicle UE
1*f*-01 can transmit or not a PC5-RRC message (operation
1*f*-*c*) to the vehicle UE 1*f*-02 as a response. For example,
when the upper layer connection establishment procedure
and the AS layer connection establishment procedure are
performed through one process, the vehicle UE 1*f*-01 can
provide a response to the PC5-RRC message (operation
1*f*-*b*) to the vehicle UE 1*f*-02 using a PC5 signaling message,
so the vehicle UE 1*f*-01 may not transmit a PC5-RRC
message (operation 1*f*-*c*). If when the PC5-RRC message
(operation 1*f*-*c*) needs to be transmitted, the PC5-RRC
message (operation 1*f*-*c*):

may be transmitted after a PC5-RRC message (operation
1*f*-*b*) is received or may be transmitted before a DIRECT_COMMUNICA-
TION_REQUEST message (operation 1*f*-10) is trans-
mitted or may be transmitted simultaneously with a DIRECT_
COMMUNICATION_REQUEST message (operation
1*f*-10) or may be multiplexed and transmitted with a DIRECT_
COMMUNICATION_REQUEST message (operation
1*f*-10) or may be transmitted after a DIRECT_COMMUNICA-
TION_REQUEST message (operation 1*f*-10) is trans-
mitted or may be transmitted after a DIRECT_SECURITY_MOD-
E_COMMAND message (operation 1*f*-20) is received
or may be transmitted before a DIRECT_SECURITY_MO-
DE_COMPLETE message (operation 1*f*-30) is trans-
mitted or may be transmitted simultaneously with a DIRECT_SE-
CURITY_MODE_COMPLETE message (operation
1*f*-30) or may be multiplexed and transmitted with a DIRECT_SE-
CURITY_MODE_COMPLETE message (operation
1*f*-30) or may be transmitted after a DIRECT_SECURITY_MOD-
E_COMPLETE message (operation 1*f*-30) is transmit-
ted or may be transmitted after a DIRECT_COMMUNICA-
TION_ACCEPT message (operation 1*f*-40) is received.

Figure 1G:
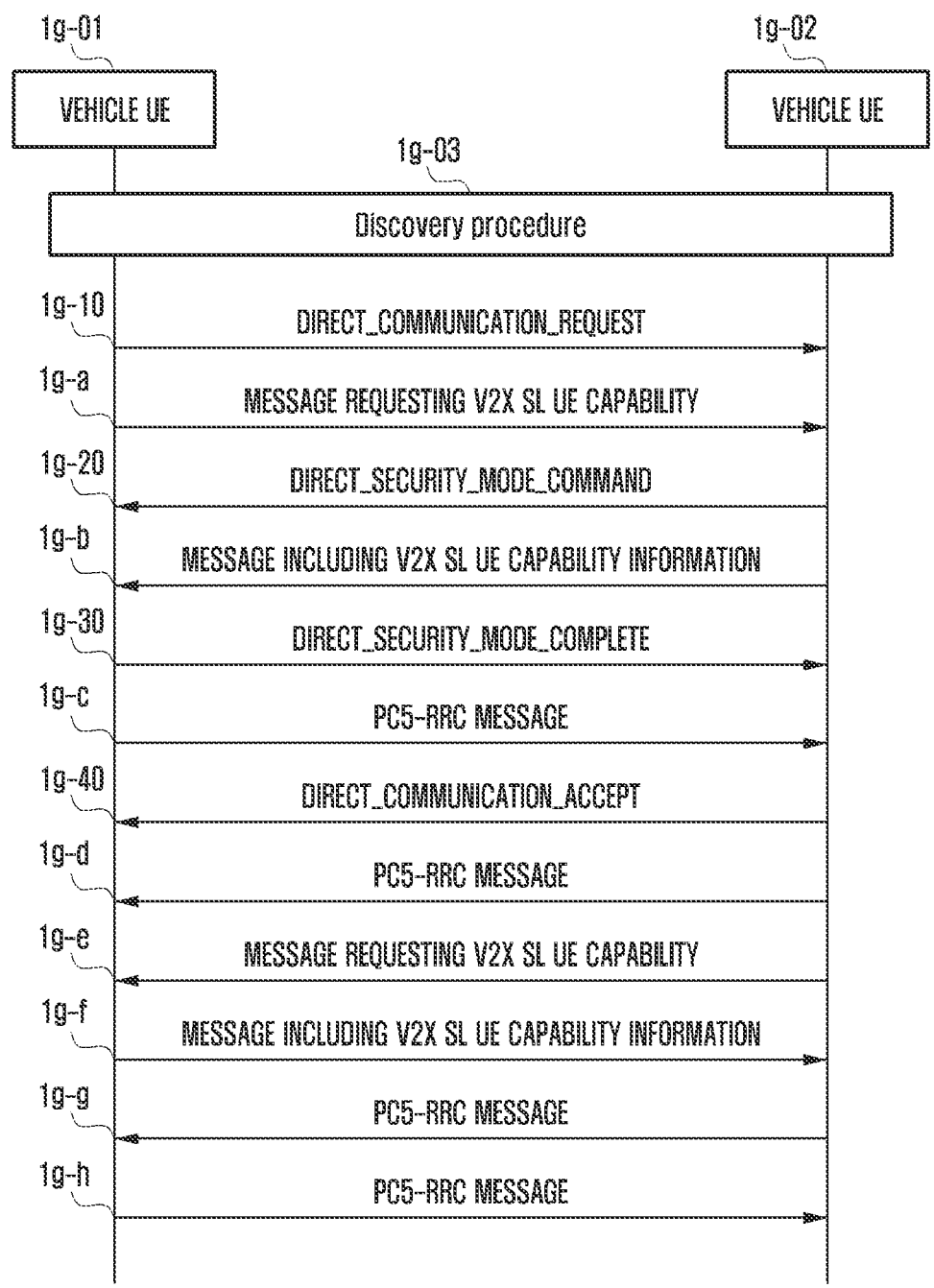
FIG. 1G is a diagram illustrating a V2X SL UE capability transfer procedure to perform NR V2X SL unicast communication between user equipments according to an embodiment of the disclosure.

FIG. 1G is a diagram illustrating a V2X SL UE capability
transfer procedure to perform NR V2X SL unicast commu-
nication between user equipments according to an embodi-
ment of the disclosure.

Referring to FIG. 1G, a vehicle UE 1*g*-01 can perform a
discovery procedure (operation 1*g*-03) with another vehicle
UE 1*g*-02 for NR V2X SL unicast communication. The
vehicle UE 1*g*-01 can perform an upper layer connection
establishment procedure (operation 1*g*-10, operation 1*g*-20,
operation 1*g*-30, and operation 1*g*-40) to establish SL con-
nection with the vehicle UE 1*g*-02. The upper layer con-
nection establishment procedure may be performed through
the embodiment described above.

The vehicle UE 1*g*-01 can start a V2X SL UE capability
transfer procedure when V2X sidelink radio access capabil-
ity information of the vehicle UE 1*g*-02 is required. The
upper layer connection establishment procedure and the
V2X SL UE capability transfer procedure may be indepen-
dently performed, or may be performed in parallel, or may
be performed through one process.

1. The vehicle UE 1*g*-01 can transmit a message the
requests the V2X sidelink radio access capability of the
vehicle UE 1*g*-02 (operation 1*g*-*a*). For example, the mes-
sage may be referred to as V2X-SL-UECapabilityEnquiry.
The message may be transmitted through an SCCH as a
PC5-RRC control message. The vehicle UE 1*g*-01 can
request a UE radio access capability for an NR V2X SL or
a UE radio access capability for an LTE V2X SL from the
vehicle UE 1*g*-02 through the message. The message may
include at least one of the following information:

A. V2X-SL-UE-CapabilityRAT-RequestList that is used
to request V2X SL UE capability for one or more Radio
Access Technologies (RAT) of the vehicle UE 1*g*-02:

i. The V2X-SL-UE-CapabilityRAT-RequestList may
include one or more V2X-SL-UE-CapabilityRAT-Request.

ii. Each V2X-SL-UE-CapabilityRequest may include rat-
type indicating the type of a radio access technology. The
rat-Type may indicate one of NR standalone, EUTRA stand-
alone, and MR-DC. For example, the rat-Type may be
indicated as one value of eutra-nr, eutra, and nr-eutra.

iii. Each V2X-SL-UE-CapabilityRequest may include
information (v2x-SL-CapabilityRequestFilter) for filtering
the V2X SL UE capability of the vehicle UE 1*g*-02. For
example, when the rat-Type is configured as nr (or eutra-nr),
the v2x-SL-CapabilityRequestFilter may mean V2X-SL-
UE-CapabilityRequestNR (or V2X-SL-UE-Capabili-
tyMRDC).

2. The vehicle UE 1*g*-02 receiving the message (e.g.,
V2X-SL-UECapabilityEnquiry) requesting V2X SL UE
capability can compile its SL UE capability information to
the vehicle UE 1*g*-01 and can transmit a message including
V2X SL UE capability information (operation 1*g*-*b*). For
example, the message may be referred to as V2X-SL-
UECapabilityInformation. The message may be transmitted
through an SCCH as a PC5-RRC control message.

A message that the vehicle UE 1*g*-01 that has started the
V2X SL UE capability transfer procedure transmits to the
vehicle UE 1*g*-02 to request V2X SL UE capability (opera-
tion 1*g*-*a*):

may be transmitted before a DIRECT_COMMUNICA-
TION_REQUEST message (operation 1*g*-10) is trans-
mitted or may be transmitted simultaneously with a DIRECT_
COMMUNICATION_REQUEST message (operation
1*g*-10) or may be multiplexed and transmitted with a DIRECT_COMMUNICATION_REQUEST message (operation 1g-10) or may be transmitted after a DIRECT_COMMUNICATION_REQUEST message (operation 1g-10) is transmitted or may be transmitted after a DIRECT_SECURITY_MODE_COMMAND message (operation 1g-20) is received or may be transmitted before a DIRECT_SECURITY_MODE_COMPLETE message (operation 1g-30) is transmitted or may be transmitted simultaneously with a DIRECT_SECURITY_MODE_COMPLETE message (operation 1g-30) or may be multiplexed and transmitted with a DIRECT_SECURITY_MODE_COMPLETE message (operation 1f-30) or may be transmitted after a DIRECT_SECURITY_MODE_COMPLETE message (operation 1g-30) is transmitted or may be transmitted after a DIRECT_COMMUNICATION_ACCEPT message (operation 1g-40) is received.

The message (operation 1g-b) including V2X SL UE capability information that the vehicle UE 1g-02 receiving the message (e.g., V2X-SL-UECapabilityEnquiry) requesting V2X SL UE capability transmits to the vehicle UE 1g-01:

may be transmitted after a message (operation 1g-a) requesting V2X SL UE capability is received or may be transmitted before a DIRECT_SECURITY_MODE_COMMAND message (operation 1g-20) is transmitted or may be transmitted simultaneously with a DIRECT_SECURITY_MODE_COMMAND message (operation 1g-20) or may be multiplexed and transmitted with a DIRECT_SECURITY_MODE_COMMAND message (operation 1g-20) or may be transmitted after a DIRECT_SECURITY_MODE_COMMAND message (operation 1g-20) is transmitted or may be transmitted after a DIRECT_SECURITY_MODE_COMPLETE message (operation 1g-30) is received or may be transmitted before a DIRECT_COMMUNICATION_ACCEPT message (operation 1g-40) is transmitted or may be transmitted simultaneously with a DIRECT_COMMUNICATION_ACCEPT message (operation 1g-40) or may be multiplexed and transmitted with a DIRECT_COMMUNICATION_ACCEPT message (operation 1g-40) or may be transmitted after a DIRECT_COMMUNICATION_ACCEPT message (operation 1f-40) is transmitted.

When the V2X SL UE capability transfer procedure is successfully performed, the vehicle UE 1g-01 can perform a NR V2X SL PC5 RRC connection reconfiguration procedure to provide an AS layer parameter and configuration information that can be applied to NR V2X SL unicast communication to the vehicle UE 1g-02.

The vehicle UE 1g-01 can transmit a PC5-RRC message including an AS layer parameter and configuration information that can be applied to NR V2X SL unicast communication to the vehicle UE 1g-02 (operation 1g-c). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1g-b) including V2X SL UE information is received or may be transmitted before a DIRECT_COMMUNICATION_REQUEST message (operation 1g-10) is transmitted or may be transmitted simultaneously with a DIRECT_COMMUNICATION_REQUEST message (operation 1g-10) or may be multiplexed and transmitted with a DIRECT_COMMUNICATION_REQUEST message (operation 1g-10) or may be transmitted after a DIRECT_COMMUNICATION_REQUEST message (operation 1g-10) is transmitted or may be transmitted after a DIRECT_SECURITY_MODE_COMMAND message (operation 1g-20) is received or may be transmitted before a DIRECT_SECURITY_MODE_COMPLETE message (operation 1g-30) is transmitted or may be transmitted simultaneously with a DIRECT_SECURITY_MODE_COMPLETE message (operation 1g-30) or may be multiplexed and transmitted with a DIRECT_SECURITY_MODE_COMPLETE message (operation 1g-30) or may be transmitted after a DIRECT_SECURITY_MODE_COMPLETE message (operation 1g-30) is transmitted or may be transmitted after a DIRECT_COMMUNICATION_ACCEPT message (operation 1g-40) is received.

The vehicle UE 1g-02 can receive the PC5 RRC message (operation 1g-c) transmitted from the vehicle UE 1g-01, and when the message is applied, the vehicle UE 1g-02 can transmit a PC5 RRC message to inform the vehicle UE 1g-01 that the message has been confirmed (1g-d). For example, the message may be referred to as a V2X-SL-RRCReconfigurationComplete message. The message may be transmitted through an SCCH as a PC5-RRC control message. The message may include at least one of information included in the PC5-RRC message according to the embodiment described above.

The message may be transmitted after a PC5 RRC message (operation 1g-c) including an AS layer parameter and configuration information that can be applied to NR V2X SL unicast communication is received or may be transmitted before a DIRECT_SECURITY_MODE_COMMAND message (operation 1g-20) is transmitted or may be transmitted simultaneously with a DIRECT_SECURITY_MODE_COMMAND message (operation 1g-20) or may be multiplexed and transmitted with a DIRECT_SECURITY_MODE_COMMAND message (operation 1g-20) or may be transmitted after a DIRECT_SECURITY_MODE_COMMAND message (operation 1g-20) is transmitted or may be transmitted after a DIRECT_SECURITY_MODE_COMPLETE message (operation 1g-30) is received or may be transmitted before a DIRECT_COMMUNICATION_ACCEPT message (operation 1g-40) is transmitted or may be transmitted simultaneously with a DIRECT_COMMUNICATION_ACCEPT message (operation 1g-40) or may be multiplexed and transmitted with a DIRECT_COMMUNICATION_ACCEPT message (operation 1g-40) or may be transmitted after a DIRECT_COMMUNICATION_ACCEPT message (operation 1g-40) is transmitted.

The V2X SL UE capability transfer procedure according to an embodiment of the disclosure may be referred to as a 2-operation procedure. The 2-operation may have the following advantages:

When the vehicle UE 1g-01 transmits a message for requesting UE capability to the vehicle UE 1g-02, information for filtering the V2X SL UE capability of the vehicle UE 1g-02 may be included, so the vehicle UE 1g-02 can transmit a message including V2X SL UE capability information, based on filtered information to the vehicle UE 1g-01. That is, less information may be included in the message including the V2X SL UE capability information, so signaling overhead can be reduced.

However, the 2-operation may have the following disadvantages:

The vehicle UE 1g-02 may not know at least some of the V2X SL radio access capability information of the vehicle UE 1g-01. For example, when requiring V2X SL UE capability information of the vehicle UE 1g-01, the vehicle UE 1g-02 may have to start the 2-operation procedure or a NR V2X SL PC5 RRC connection reconfiguration procedure. For example, it may be required to perform operation 1g-e, or operation 1g-f, or operation 1g-g, or operation 1g-h.

Figure 1H:
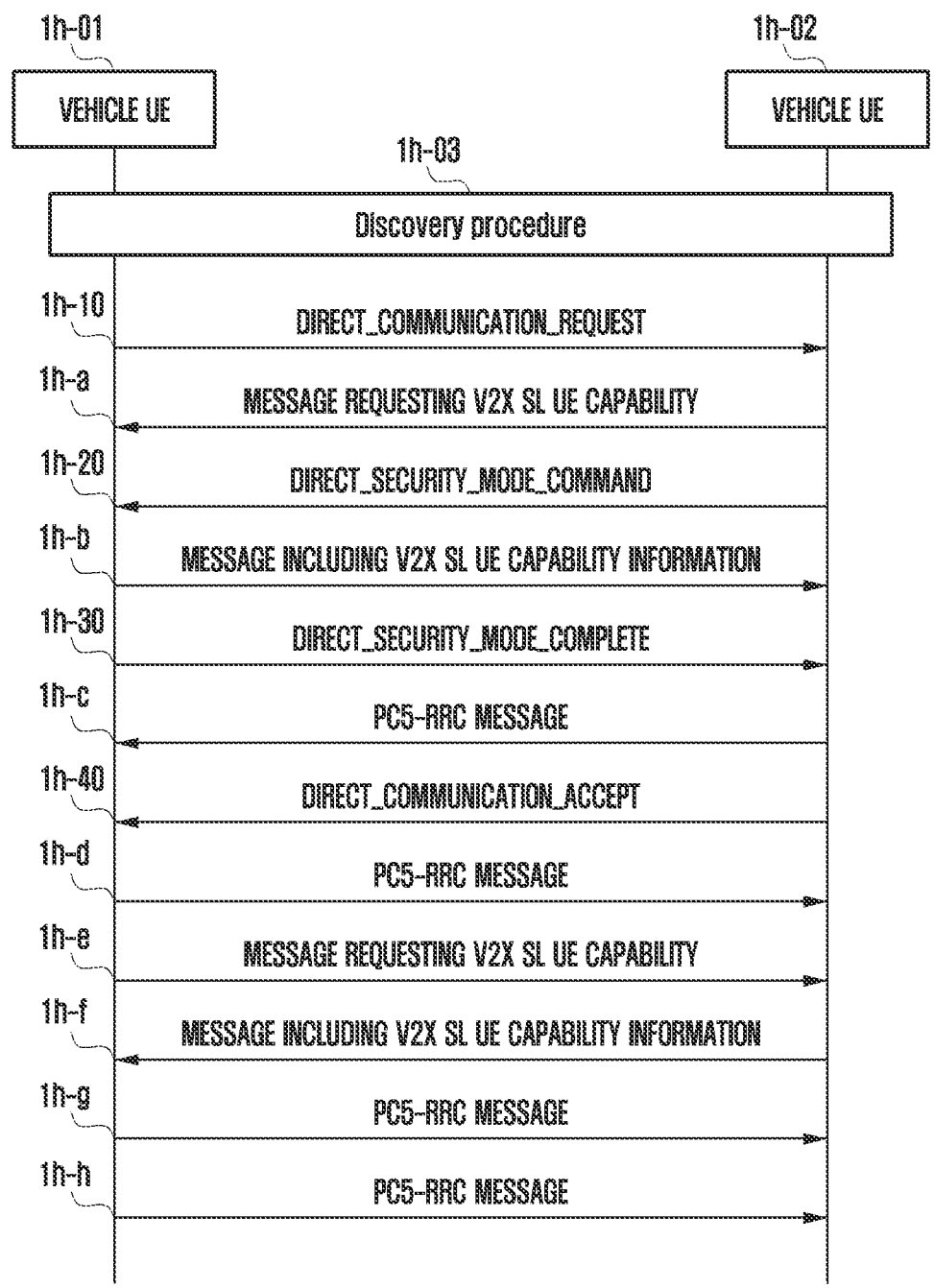
FIG. 1H is a diagram illustrating a V2X SL UE capability transfer procedure to perform NR V2X SL unicast communication between user equipments according to an embodiment of the disclosure.

FIG. 1H is a diagram illustrating a V2X SL UE capability transfer procedure to perform NR V2X SL unicast communication between user equipments according to an embodiment of the disclosure.

Referring to FIG. 1H, a vehicle UE 1h-01 can perform a discovery procedure (operation 1h-03) with another vehicle UE 1h-02 for NR V2X SL unicast communication. The vehicle UE 1h-01 can perform an upper layer connection establishment procedure (operation 1h-10, operation 1h-20, operation 1h-30, and operation 1h-40) to establish SL connection with the vehicle UE 1h-02. The upper layer connection establishment procedure may be performed through the embodiment described above.

The vehicle UE 1h-02 can start a V2X SL UE capability transfer procedure when V2X sidelink radio access capability information of the vehicle UE 1h-01 is required. The upper layer connection establishment procedure and the V2X SL UE capability transfer procedure may be independently performed, or may be performed in parallel, or may be performed through one process.

1. The vehicle UE 1h-02 can transmit a message that requests the V2X sidelink radio access capability information of the vehicle UE 1h-01 (operation 1h-a). For example, the message may be referred to as V2X-SL-UECapabilityEnquiry. The message may be transmitted through an SCCH as a PC5-RRC control message. The vehicle UE 1h-02 can request a UE radio access capability for an NR V2X SL or a UE radio access capability for an LTE V2X SL from the vehicle UE 1h-01 through the message. The message may include at least one of the following information:

A. V2X-SL-UE-CapabilityRAT-RequestList that is used to request V2X SL UE capability for one or more Radio Access Technologies (RAT) of the vehicle UE 1h-01:

i. The V2X-SL-UE-CapabilityRAT-RequestList may include one or more V2X-SL-UE-CapabilityRAT-Request.

ii. Each V2X-SL-UE-CapabilityRequest may include rat-type indicating the type of a radio access technology. The rat-Type may indicate one of NR standalone, EUTRA standalone, and MR-DC. For example, the rat-Type may be indicated as one value of eutra-nr, eutra, and nr-eutra.

iii. Each V2X-SL-UE-CapabilityRequest may include information (v2x-SL-CapabilityRequestFilter) for filtering the V2X SL UE capability of the vehicle UE 1h-01. For example, when the rat-Type is configured as nr (or eutra-nr), the v2x-SL-CapabilityRequestFilter may mean V2X-SL-UE-CapabilityRequestNR (or V2X-SL-UE-CapabilityMRDC).

2. The vehicle UE 1h-01 receiving the message (e.g., V2X-SL-UECapabilityEnquiry) requesting V2X SL UE capability can compile its SL UE capability information to the vehicle UE 1h-02 and can transmit a message including V2X SL UE capability information (operation 1h-b). For example, the message may be referred to as V2X-SL-UECapabilityInformation. The message may be transmitted through an SCCH as a PC5-RRC control message.

A message that the vehicle UE 1h-02 that has started the V2X SL UE capability transfer procedure transmits to the vehicle UE 1h-01 to request V2X SL UE capability (operation 1h-a):

may be transmitted after a DIRECT_COMMUNICATION_REQUEST message (operation 1h-10) is received or may be transmitted before a DIRECT_SECURITY_MODE_COMMAND message (operation 1h-20) is transmitted or may be transmitted simultaneously with a DIRECT_SECURITY_MODE_COMMAND message (operation 1h-20) or may be multiplexed and transmitted with a DIRECT_SECURITY_MODE_COMMAND message (operation 1h-20) or may be transmitted after a DIRECT_SECURITY_MODE_COMMAND message (operation 1h-20) is transmitted or may be transmitted after a DIRECT_SECURITY_MODE_COMPLETE message (operation 1h-30) is received or may be transmitted before a DIRECT_COMMUNICATION_ACCEPT message (operation 1h-40) is transmitted or may be transmitted simultaneously with a DIRECT_COMMUNICATION_ACCEPT message (operation 1h-40) or may be multiplexed and transmitted with a DIRECT_COMMUNICATION_ACCEPT message (operation 1h-40) or may be transmitted after a DIRECT_COMMUNICATION_ACCEPT message (1h-40) is transmitted.

The message (operation 1h-b) including V2X SL UE capability information that the vehicle UE 1h-01 receiving the message (e.g., V2X-SL-UECapabilityEnquiry) requesting V2X SL UE capability transmits to the vehicle UE 1h-02:

may be transmitted after a message (operation 1*h*-a) requesting V2X SL UE capability is received or may be transmitted before a DIRECT_COMMUNICATION_REQUEST message (operation 1*h*-10) is transmitted or may be transmitted simultaneously with a DIRECT_COMMUNICATION_REQUEST message (operation 1*h*-10) or may be multiplexed and transmitted with a DIRECT_COMMUNICATION_REQUEST message (operation 1*h*-10) or may be transmitted after a DIRECT_COMMUNICATION_REQUEST message (operation 1*h*-10) is transmitted or may be transmitted after a DIRECT_SECURITY_MODE_COMMAND message (operation 1*h*-20) is received or may be transmitted before a DIRECT_SECURITY_MODE_COMPLETE message (operation 1*h*-30) is transmitted or may be transmitted simultaneously with a DIRECT_SECURITY_MODE_COMPLETE message (operation 1*h*-30) or may be multiplexed and transmitted with a DIRECT_SECURITY_MODE_COMPLETE message (operation 1*h*-30) or may be transmitted after a DIRECT_SECURITY_MODE_COMPLETE message (operation 1*h*-30) is transmitted or may be transmitted after a DIRECT_COMMUNICATION_ACCEPT message (operation 1*h*-40) is received.

When the V2X SL UE capability transfer procedure is successfully performed, the vehicle UE 1*h*-02 can perform a NR V2X SL PC5 RRC connection reconfiguration procedure to provide an AS layer parameter and configuration information that can be applied to NR V2X SL unicast communication to the vehicle UE 1*h*-01.

The vehicle UE 1*h*-02 can transmit a PC5-RRC message including an AS layer parameter and configuration information that can be applied to NR V2X SL unicast communication to the vehicle UE 1*h*-01 (operation 1*h*-c). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1*h*-b) including V2X SL UE information is received or may be transmitted after a DIRECT_COMMUNICATION_REQUEST message (operation 1*h*-10) is received or may be transmitted before a DIRECT_SECURITY_MODE_COMMAND message (operation 1*h*-20) is transmitted or may be transmitted simultaneously with a DIRECT_SECURITY_MODE_COMMAND message (operation 1H-20) or may be multiplexed and transmitted with a DIRECT_SECURITY_MODE_COMMAND message (operation 1*h*-20) or may be transmitted after a DIRECT_SECURITY_MODE_COMMAND message (operation 1*h*-20) is transmitted or may be transmitted after a DIRECT_SECURITY_MODE_COMPLETE message (operation 1*h*-30) is received or may be transmitted before a DIRECT_COMMUNICATION_ACCEPT message (operation 1*h*-40) is transmitted or may be transmitted simultaneously with a DIRECT_COMMUNICATION_ACCEPT message (operation 1*h*-40) or may be multiplexed and transmitted with a DIRECT_COMMUNICATION_ACCEPT message (operation 1*h*-40) or may be transmitted after a DIRECT_COMMUNICATION_ACCEPT message (1*h*-40) is transmitted.

The vehicle UE 1*h*-01 can receive the PC5 RRC message (operation 1*h*-c) transmitted from the vehicle UE 1*h*-02, and when the message is applied, the vehicle UE 1*h*-01 can transmit a PC5 RRC message to inform the vehicle UE 1*h*-02 that the message has been confirmed (1*h*-d). For example, the message may be referred to as a V2X-SL-RRCReconfigurationComplete message. The message may be transmitted through an SCCH as a PC5-RRC control message. The message may include at least one of information included in the PC5-RRC message according to the embodiment described above.

The message may be transmitted after a PC5 RRC message (operation 1*h*-c) including an AS layer parameter and configuration information that can be applied to NR V2X SL unicast communication is received or may be transmitted before a DIRECT_COMMUNICATION_REQUEST message (operation 1*h*-10) is transmitted or may be transmitted simultaneously with a DIRECT_COMMUNICATION_REQUEST message (operation 1*h*-10) or may be multiplexed and transmitted with a DIRECT_COMMUNICATION_REQUEST message (operation 1*h*-10) or may be transmitted after a DIRECT_COMMUNICATION_REQUEST message (operation 1*h*-10) is transmitted or may be transmitted after a DIRECT_SECURITY_MODE_COMMAND message (operation 1*h*-20) is received or may be transmitted before a DIRECT_SECURITY_MODE_COMPLETE message (operation 1*h*-30) is transmitted or may be transmitted simultaneously with a DIRECT_SECURITY_MODE_COMPLETE message (operation 1*h*-30) or may be multiplexed and transmitted with a DIRECT_SECURITY_MODE_COMPLETE message (operation 1*h*-30) or may be transmitted after a DIRECT_SECURITY_MODE_COMPLETE message (operation 1*h*-30) is transmitted or may be transmitted after a DIRECT_COMMUNICATION_ACCEPT message (operation 1*h*-40) is received.

The V2X SL UE capability transfer procedure according to an embodiment of the disclosure may be referred to as a 2-operation procedure. The 2-operation may have the following advantages:

When the vehicle UE 1*h*-02 transmits a message for requesting UE capability to the vehicle UE 1*h*-01, information for filtering the V2X SL UE capability of the vehicle UE 1*h*-01 may be included, so the vehicle UE 1h-01 can transmit a message including V2X SL UE capability information, based on filtered information to the vehicle UE 1h-02. That is, less information may be included in the message including the V2X SL UE capability information, so signaling overhead can be reduced.

However, the 2-operation may have the following disadvantages:

The vehicle UE 1h-01 may not know at least some of the V2X SL UE capability information of the vehicle UE 1h-02. For example, when requiring V2X SL radio access capability information of the vehicle UE 1h-02, the vehicle UE 1h-01 may have to start the 2-operation procedure or a NR V2X SL PC5 RRC connection reconfiguration procedure. For example, it may be required to perform operation 1h-e, or operation 1h-f, or operation 1h-g, or operation 1h-h.

Figure 1I:
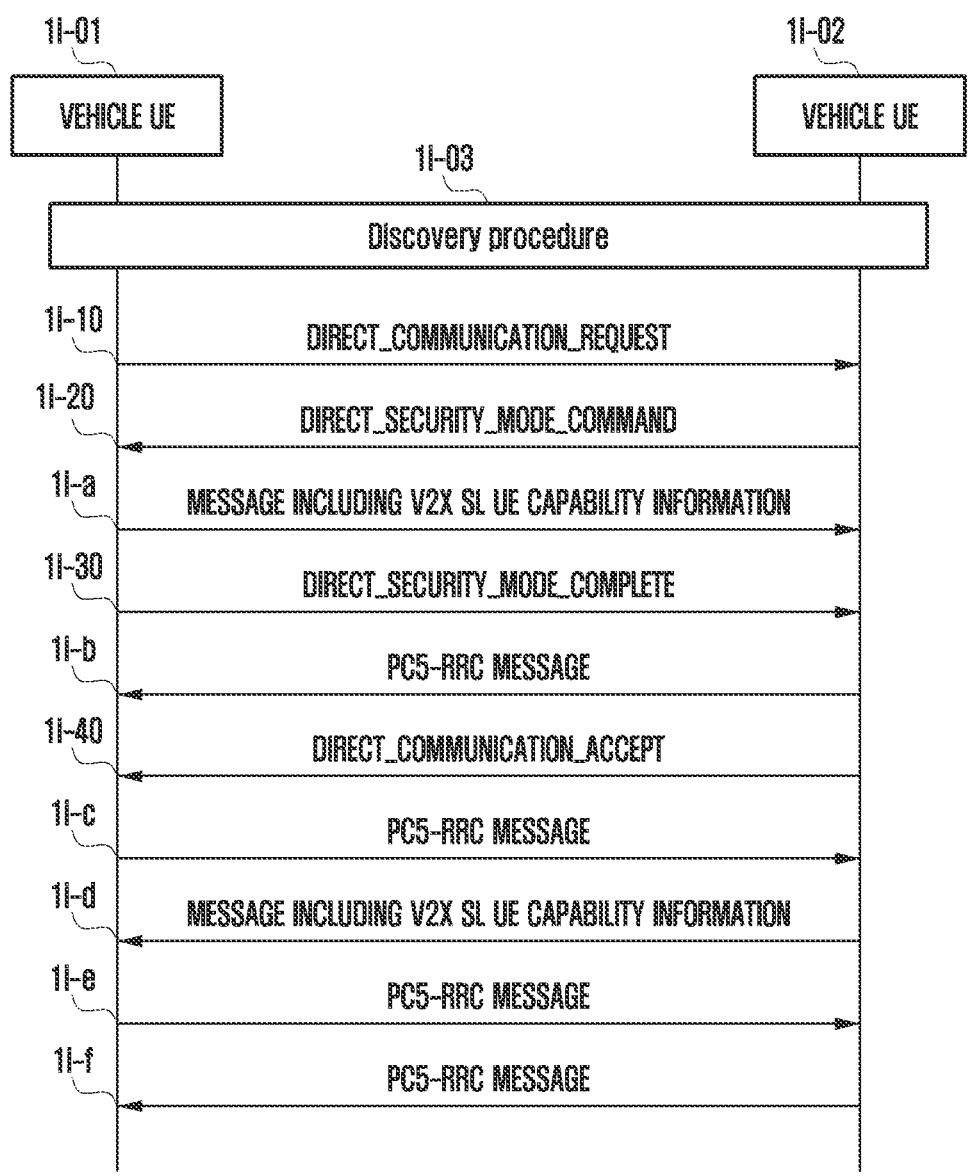
FIG. 1I is a diagram illustrating a V2X SL UE capability transfer procedure to perform NR V2X SL unicast communication between user equipments according to an embodiment of the disclosure.

FIG. 1I is a diagram illustrating a V2X SL UE capability transfer procedure to perform NR V2X SL unicast communication between user equipments according to an embodiment of the disclosure.

Referring to FIG. 1I, a vehicle UE 1i-01 can perform a discovery procedure (operation 1i-03) with another vehicle UE 1i-02 for NR V2X SL unicast communication. The vehicle UE 1i-01 can perform an upper layer connection establishment procedure (operation 1i-10, operation 1i-20, operation 1i-30, and operation 1i-40) to establish SL connection with the vehicle UE 1i-02. The upper layer connection establishment procedure may be performed through the embodiment described above.

The vehicle UE 1i-01 can start a V2X SL UE capability transfer procedure when transmitting V2X sidelink radio access capability information to the vehicle UE 1i-02. The upper layer connection establishment procedure and the V2X SL UE capability transfer procedure may be independently performed, or may be performed in parallel, or may be performed through one process.

1. The vehicle UE 1i-01 can transmit a message including the entire V2X SL UE capability information that it supports, to the vehicle UE 1i-02 (operation 1i-a). For example, the message may be referred to as V2X-SL-UECapability-Information. The message may be transmitted, including an indicator or an information element that shows the vehicle UE 1i-02 does not need to transmit a message including V2X SL UE capability information. Alternatively, the message may include a Provider Service Identifier (PSID) of a V2X application, or Intelligent Transport System-Application Identifiers (ITS-AIDs), or a QoS rule mapped to an identifier such as new identifiers, or a 5G QoS Indicator (5QI) or a QoS Indicator (VQI), or a QoS Flow Indicator (QFI) based on a QoS parameter. Based on the information, the vehicle UE 1i-02 can determine that it may not be required to send a message including V2X SL UE capability information to the vehicle UE 1i-01.

The message may be transmitted through an SCCH as a PC5-RRC control message.

A message including V2X SL UE capability information that the vehicle UE 1i-01 that has started the V2X SL UE capability transfer procedure transmits to the vehicle UE 1i-02 (operation 1i-a):

may be transmitted before a DIRECT_COMMUNICATION_REQUEST message (operation 1i-10) is transmitted or may be transmitted simultaneously with a DIRECT_COMMUNICATION_REQUEST message (operation 1i-10) or may be multiplexed and transmitted with a DIRECT_COMMUNICATION_REQUEST message (operation 1i-10) or may be transmitted after a DIRECT_COMMUNICATION_REQUEST message (operation 1i-10) is transmitted or may be transmitted after a DIRECT_SECURITY_MODE_COMMAND message (operation 1i-20) is received or may be transmitted before a DIRECT_SECURITY_MODE_COMPLETE message (operation 1i-30) is transmitted or may be transmitted simultaneously with a DIRECT_SECURITY_MODE_COMPLETE message (operation 1i-30) or may be multiplexed and transmitted with a DIRECT_SECURITY_MODE_COMPLETE message (operation 1i-30) or may be transmitted after a DIRECT_SECURITY_MODE_COMPLETE message (operation 1i-30) is transmitted or may be transmitted after a DIRECT_COMMUNICATION_ACCEPT message (operation 1i-40) is received.

When the V2X SL UE capability transfer procedure is successfully performed, the vehicle UE 1i-02 can perform a NR V2X SL PC5 RRC connection reconfiguration procedure to provide an AS layer parameter and configuration information that can be applied to NR V2X SL unicast communication to the vehicle UE 1i-01.

The vehicle UE 1i-02 can transmit a PC5-RRC message including an AS layer parameter and configuration information that can be applied to NR V2X SL unicast communication to the vehicle UE 1i-01 (operation 1i-b). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1i-a) including V2X SL UE information is received or may be transmitted after a DIRECT_COMMUNICATION_REQUEST message (operation 1i-10) is received or may be transmitted before a DIRECT_SECURITY_MODE_COMMAND message (operation 1i-20) is transmitted or may be transmitted simultaneously with a DIRECT_SECURITY_MODE_COMMAND message (operation 1i-20) or may be multiplexed and transmitted with a DIRECT_SECURITY_MODE_COMMAND message (operation 1i-20) or may be transmitted after a DIRECT_SECURITY_MODE_COMMAND message (operation 1i-20) is transmitted or may be transmitted after a DIRECT_SECURITY_MODE_COMPLETE message (operation 1i-30) is received or may be transmitted before a DIRECT_COMMUNICATION_ACCEPT message (operation 1i-40) is transmitted or may be transmitted simultaneously with a DIRECT_COMMUNICATION_ACCEPT message (operation 1i-40) or may be multiplexed and transmitted with a DIRECT_COMMUNICATION_ACCEPT message (operation 1*i*-40) or may be transmitted after a DIRECT_COMMUNICATION_ACCEPT message (operation 1*i*-40) is transmitted.

The vehicle UE 1*i*-01 can receive the PC5 RRC message (operation 1*i*-b) transmitted from the vehicle UE 1*i*-02, and when the message is applied, the vehicle UE 1*i*-01 can transmit a PC5 RRC message to inform the vehicle UE 1*i*-02 that the message has been confirmed (1*i*-c). For example, the message may be referred to as a V2X-SL-RRCReconfigurationComplete message. The message may be transmitted through an SCCH as a PC5-RRC control message. The message may include at least one of information included in the PC5-RRC message according to the embodiment described above.

The message may be transmitted after a PC5 RRC message (operation 1*i*-b) including an AS layer parameter and configuration information that can be applied to NR V2X SL unicast communication is received or may be transmitted before a DIRECT_COMMUNICATION_REQUEST message (operation 1*i*-10) is transmitted or may be transmitted simultaneously with a DIRECT_COMMUNICATION_REQUEST message (operation 1*i*-10) or may be multiplexed and transmitted with a DIRECT_COMMUNICATION_REQUEST message (operation 1*i*-10) or may be transmitted after a DIRECT_COMMUNICATION_REQUEST message (operation 1*i*-10) is transmitted or may be transmitted after a DIRECT_SECURITY_MODE_COMMAND message (operation 1*i*-20) is received or may be transmitted before a DIRECT_SECURITY_MODE_COMPLETE message (operation 1*i*-30) is transmitted or may be transmitted simultaneously with a DIRECT_SECURITY_MODE_COMPLETE message (operation 1*i*-30) or may be multiplexed and transmitted with a DIRECT_SECURITY_MODE_COMPLETE message (operation 1*i*-30) or may be transmitted after a DIRECT_SECURITY_MODE_COMPLETE message (operation 1*i*-30) is transmitted or may be transmitted after a DIRECT_COMMUNICATION_ACCEPT message (operation 1*i*-40) is received.

The V2X SL UE capability transfer procedure according to an embodiment of the disclosure may be referred to as a 1-operation procedure. The 1-operation may have the following advantages:

The vehicle UE 1*i*-01 can transmit a message including V2X SL UE capability information through one-time signaling to the vehicle UE 1*i*-02. That is, the signaling flow can be reduced in comparison to the 2-operation, so latency can be decreased.

However, the 1-operation may have the following disadvantages:

When the vehicle UE 1*i*-01 transmits a message including V2X SL UE capability information to the vehicle UE 1*i*-02, the message may include much information in comparison to the 2-operation of the embodiment described above. That is, this is because the vehicle UE 1*i*-01 has to transmit a message including the entire supportable V2X SL UE capability information not filtered to the vehicle UE 1*i*-02.

The vehicle UE 1*i*-01 may not know at least some of the V2X SL UE capability information of the vehicle UE 1*i*-02. For example, when the vehicle UE 1*i*-01 requires V2X SL radio access capability information of the vehicle UE 1*i*-02, the vehicle UE 1*i*-01 may have to start the 1-operation procedure or the vehicle UE 1*i*-02 may have to start a NR V2X SL PC5 RRC connection reconfiguration procedure. For example, it may be required to perform operation 1*i*-d, or operation 1*i*-e, or operation 1*i*-f.

Figure 1J:
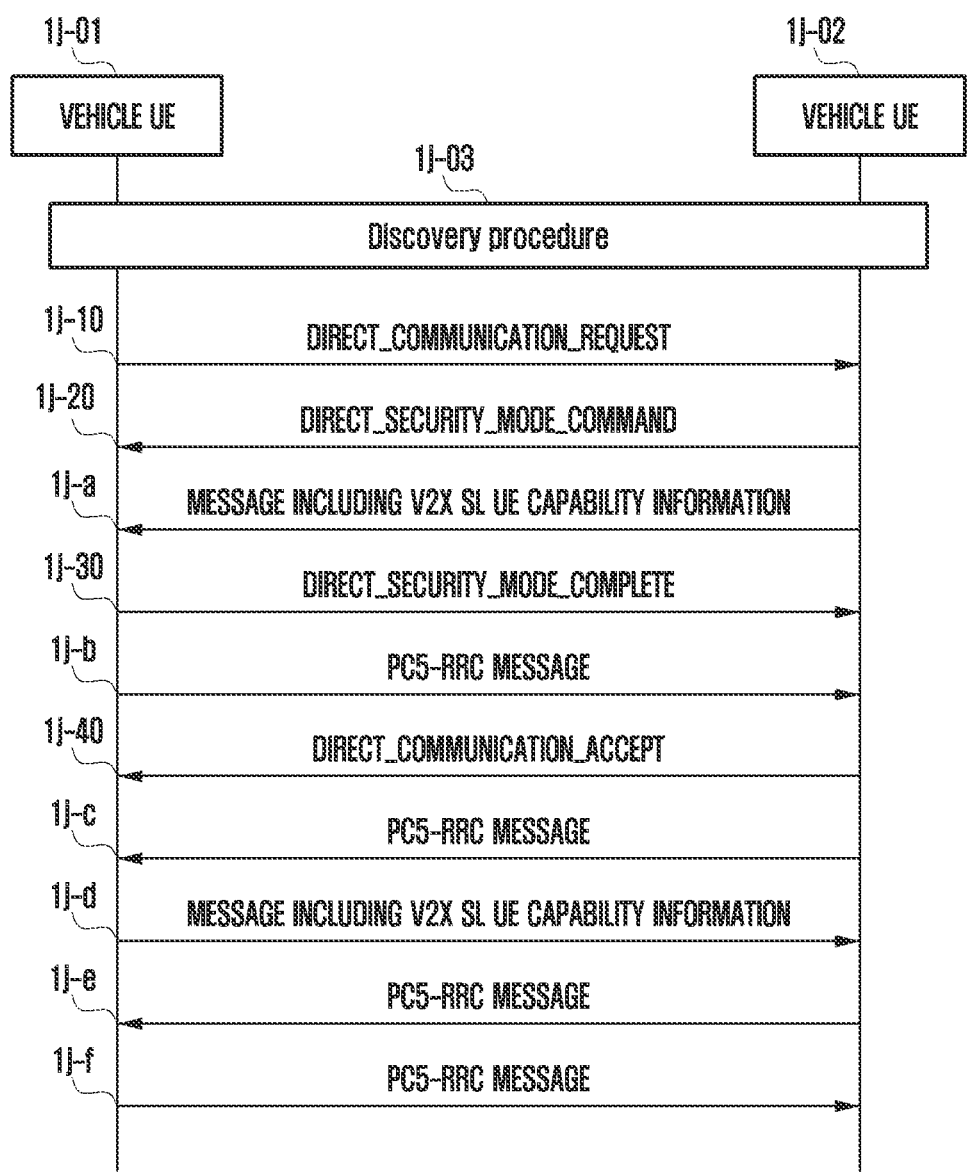
FIG. 1J is a diagram illustrating a V2X SL UE capability transfer procedure to perform NR V2X SL unicast communication between user equipments according to an embodiment of the disclosure.

FIG. 1J is a diagram illustrating a V2X SL UE capability transfer procedure to perform NR V2X SL unicast communication between user equipments according to an embodiment of the disclosure.

Referring to FIG. 1J, a vehicle UE 1*j*-01 can perform a discovery procedure (operation 1*j*-03) with another vehicle UE 1*j*-02 for NR V2X SL unicast communication. The vehicle UE 1*j*-01 can perform an upper layer connection establishment procedure (operation 1*j*-10, operation 1*j*-20, operation 1*j*-30, and operation 1*j*-40) to establish SL connection with the vehicle UE 1*j*-02. The upper layer connection establishment procedure may be performed through the embodiment described above.

The vehicle UE 1*j*-02 can start a V2X SL UE capability transfer procedure when transmitting V2X sidelink radio access capability information to the vehicle UE 1*j*-02. The upper layer connection establishment procedure and the V2X SL UE capability transfer procedure may be independently performed, or may be performed in parallel, or may be performed through one process.

1. The vehicle UE 1*j*-02 can transmit a message including the entire V2X SL UE capability information that it supports, to the vehicle UE 1*j*-01 (operation 1*j*-a). For example, the message may be referred to as V2X-SL-UECapabilityInformation. The message may be transmitted through an SCCH as a PC5-RRC control message.

A message including V2X SL UE capability information that the vehicle UE 1*j*-02 that has started the V2X SL UE capability transfer procedure transmits to the vehicle UE 1*j*-01 (operation 1*j*-a):

may be transmitted after a DIRECT_COMMUNICATION_REQUEST message (operation 1*j*-10) is received or may be transmitted before a DIRECT_SECURITY_MODE_COMMAND message (operation 1*j*-20) is transmitted or may be transmitted simultaneously with a DIRECT_SECURITY_MODE_COMMAND message (operation 1*j*-20) or may be multiplexed and transmitted with a DIRECT_SECURITY_MODE_COMMAND message (operation 1*j*-20) or may be transmitted after a DIRECT_SECURITY_MODE_COMMAND message (operation 1*j*-20) is transmitted or may be transmitted after a DIRECT_SECURITY_MODE_COMPLETE message (operation 1*j*-30) is received or may be transmitted before a DIRECT_COMMUNICATION_ACCEPT message (operation 1*j*-40) is transmitted or may be transmitted simultaneously with a DIRECT_COMMUNICATION_ACCEPT message (operation 1*j*-40) or may be multiplexed and transmitted with a DIRECT_COMMUNICATION_ACCEPT message (operation 1j-4) or may be transmitted after a DIRECT_COMMUNICATION_ACCEPT message (operation 1j-40) is transmitted.

When the V2X SL UE capability transfer procedure is successfully performed, the vehicle UE 1j-01 can perform an NR V2X SL PC5 RRC connection reconfiguration procedure to provide an AS layer parameter and configuration information that can be applied to NR V2X SL unicast communication to the vehicle UE 1j-02.

The vehicle UE 1j-01 can transmit a PC5-RRC message including an AS layer parameter and configuration information that can be applied to NR V2X SL unicast communication to the vehicle UE 1j-02 (operation 1j-b). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1j-a) including V2X SL UE information is received or may be transmitted before a DIRECT_COMMUNICATION_REQUEST message (operation 1j-10) is transmitted or may be transmitted simultaneously with a DIRECT_COMMUNICATION_REQUEST message (operation 1j-10) or may be multiplexed and transmitted with a DIRECT_COMMUNICATION_REQUEST message (operation 1j-10) or may be transmitted after a DIRECT_COMMUNICATION_REQUEST message (operation 1j-10) is transmitted or may be transmitted after a DIRECT_SECURITY_MODE_COMMAND message (operation 1j-20) is received or may be transmitted before a DIRECT_SECURITY_MODE_COMPLETE message (operation 1j-30) is transmitted or may be transmitted simultaneously with a DIRECT_SECURITY_MODE_COMPLETE message (operation 1j-30) or may be multiplexed and transmitted with a DIRECT_SECURITY_MODE_COMPLETE message (operation 1j-30) or may be transmitted after a DIRECT_SECURITY_MODE_COMPLETE message (operation 1j-30) is transmitted or may be transmitted after a DIRECT_COMMUNICATION_ACCEPT message (operation 1j-40) is received.

The vehicle UE 1j-02 can receive the PC5 RRC message (operation 1j-b) transmitted from the vehicle UE 1j-01, and when the message is applied, the vehicle UE 1j-02 can transmit a PC5 RRC message to inform the vehicle UE 1j-01 that the message has been confirmed (1j-c). For example, the message may be referred to as a V2X-SL-RRCReconfigurationComplete message. The message may be transmitted through an SCCH as a PC5-RRC control message. The message may be transmitted, including an indicator or an information element that shows the vehicle UE 1j-01 does not need to transmit a message including V2X SL UE capability information. Alternatively, the message may include a Provider Service Identifier (PSID) of a V2X application, or Intelligent Transport System-Application Identifiers (ITS-AIDs), or a QoS rule mapped to an identifier such as new identifiers, or a 5G QoS Indicator (5QI) or a QoS Indicator (VQI), or a QoS Flow Indicator (QFI) based on a QoS parameter. Based on the information, the vehicle UE 1j-01 can determine that it may not be required to send a message including V2X SL UE capability information to the vehicle UE 1j-02. The message may include at least one of information included in the PC5-RRC message according to the embodiment described above.

The message may be transmitted after a PC5 RRC message (operation 1j-b) including an AS layer parameter and configuration information that can be applied to NR V2X SL unicast communication is received or may be transmitted after a DIRECT_COMMUNICATION_REQUEST message (operation 1j-10) is received or may be transmitted before a DIRECT_SECURITY_MODE_COMMAND message (operation 1j-20) is transmitted or may be transmitted simultaneously with a DIRECT_SECURITY_MODE_COMMAND message (operation 1j-20) or may be multiplexed and transmitted with a DIRECT_SECURITY_MODE_COMMAND message (operation 1j-20) or may be transmitted after a DIRECT_SECURITY_MODE_COMMAND message (operation 1j-20) is transmitted or may be transmitted after a DIRECT_SECURITY_MODE_COMPLETE message (operation 1j-30) is received or may be transmitted before a DIRECT_COMMUNICATION_ACCEPT message (operation 1j-40) is transmitted or may be transmitted simultaneously with a DIRECT_COMMUNICATION_ACCEPT message (operation 1j-40) or may be multiplexed and transmitted with a DIRECT_COMMUNICATION_ACCEPT message (operation 1j-40) or may be transmitted after a DIRECT_COMMUNICATION_ACCEPT message (operation 1j-40) is transmitted.

The V2X SL UE capability transfer procedure according to an embodiment of the disclosure may be referred to as a 1-operation procedure. The 1-operation may have the following advantages:

The vehicle UE 1j-02 can transmit a message including V2X SL UE capability information through one-time signaling to the vehicle UE 1j-01. That is, the signaling flow can be reduced in comparison to the 2-operation, so latency can be decreased.

However, the 1-operation may have the following disadvantages:

When the vehicle UE 1j-02 transmits V2X SL UE capability information to the vehicle UE 1j-01, the message may include much information in comparison to the 2-operation of the embodiment described above. That is, this is because the vehicle UE 1j-02 has to transmit a message including the entire supportable V2X SL UE capability information not filtered to the vehicle UE 1j-01.

The vehicle UE 1j-02 may not know at least some of the V2X SL UE capability information of the vehicle UE 1j-01. For example, when the vehicle UE 1j-02 requires V2X SL radio access capability information of the vehicle UE 1j-01, the vehicle UE 1j-01 may have to start the 1-operation procedure or the vehicle UE 1*j*-02 may have to start an NR V2X SL PC5 RRC connection reconfiguration procedure. For example, it may be required to perform operation 1*j*-*d*, or operation 1*j*-*e*, or operation 1*j*-*f*.

Figure 1K:
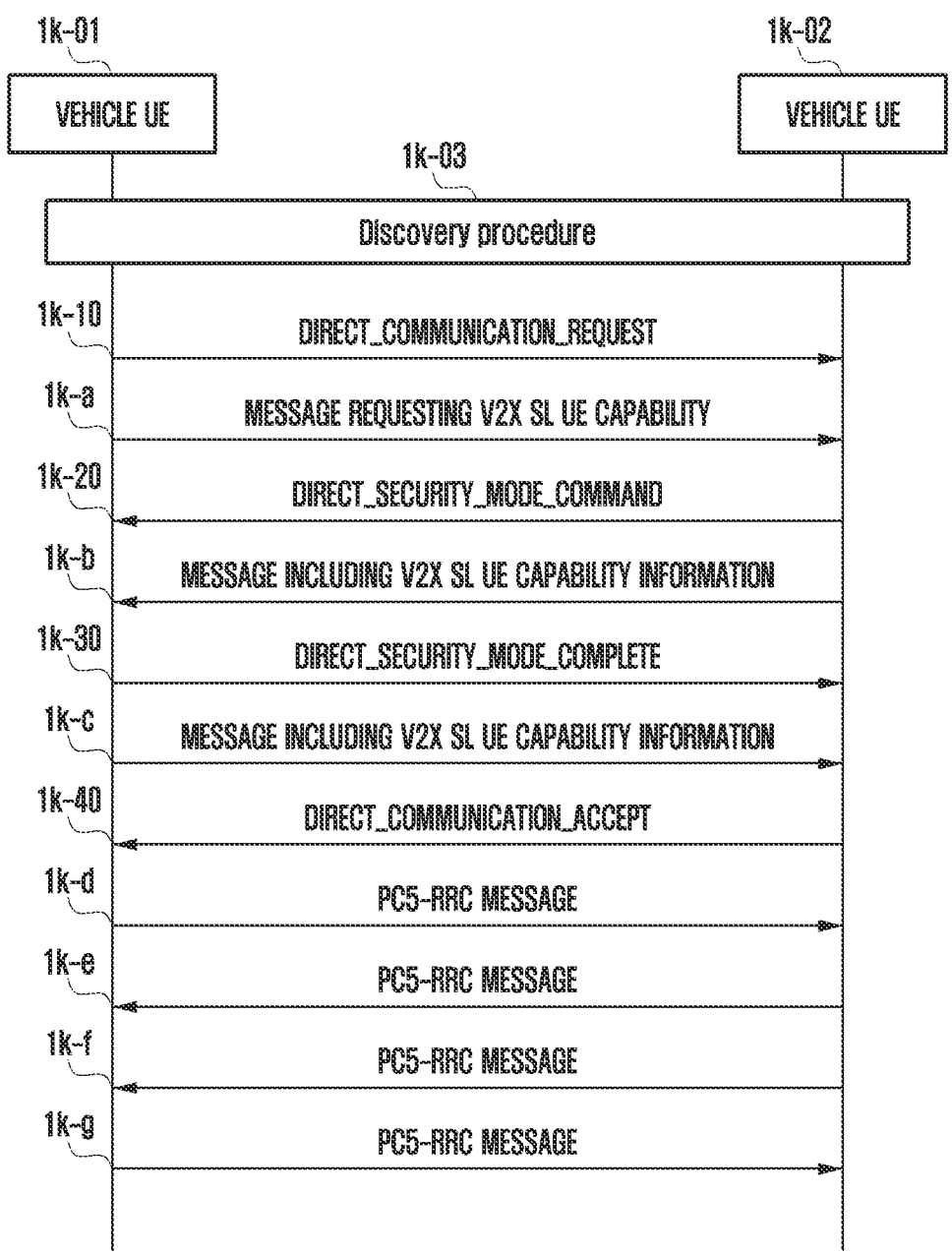
FIG. 1K is a diagram illustrating a V2X SL UE capability transfer procedure to perform NR V2X SL unicast communication between user equipments according to an embodiment of the disclosure.

FIG. 1K is a diagram illustrating a V2X SL UE capability transfer procedure to perform NR V2X SL unicast communication between user equipments according to an embodiment of the disclosure.

Referring to FIG. 1K, a vehicle UE 1*k*-01 can perform a discovery procedure (operation 1*k*-03) with another vehicle UE 1*k*-02 for NR V2X SL unicast communication. The vehicle UE 1*k*-01 can perform an upper layer connection establishment procedure (operation 1*k*-10, operation 1*k*-20, operation 1*k*-30, and operation 1*k*-40) to establish SL connection with the vehicle UE 1*k*-02. The upper layer connection establishment procedure may be performed through the embodiment described above.

The vehicle UE 1*k*-01 can start a V2X SL UE capability transfer procedure when V2X sidelink radio access capability information of the vehicle UE 1*k*-02 is required. The upper layer connection establishment procedure and the V2X SL UE capability transfer procedure may be independently performed, or may be performed in parallel, or may be performed through one process.

1. The vehicle UE 1*k*-01 can transmit a message the requests the V2X sidelink radio access capability information of the vehicle UE 1*k*-02 (operation 1*k*-*a*). For example, the message may be referred to as V2X-SL-UECapabilityEnquiry. The message may be transmitted through an SCCH as a PC5-RRC control message. The vehicle UE 1*k*-01 can request a UE radio access capability for an NR V2X SL or a UE radio access capability for an LTE V2X SL from the vehicle UE 1*k*-02 through the message. The message may include at least one of the following information:

B. V2X-SL-UE-CapabilityRAT-RequestList that is used to request V2X SL UE capability for one or more Radio Access Technologies (RAT) of the vehicle UE 1*k*-02:

i. The V2X-SL-UE-CapabilityRAT-RequestList may include one or more V2X-SL-UE-CapabilityRAT-Request.

ii. Each V2X-SL-UE-CapabilityRequest may include rat-type indicating the type of a radio access technology. The rat-Type may indicate one of NR standalone, EUTRA standalone, and MR-DC. For example, the rat-Type may be indicated as one value of eutra-nr, eutra, and nr-eutra.

iii. Each V2X-SL-UE-CapabilityRequest may include information (v2x-SL-CapabilityRequestFilter) for filtering the V2X SL UE capability of the vehicle UE 1*k*-02. For example, when the rat-Type is configured as an nr (or eutra-nr), v2x-SL-CapabilityRequestFilter may mean V2X-SL-UE-CapabilityRequestNR (or V2X-SL-UE-CapabilityMRDC).

C. An indicator or an information element indicating that the vehicle UE 1*k*-01 transmits a message including V2X SL UE capability information of the vehicle UE 1*k*-01 to the vehicle UE 1*k*-02.

2. The vehicle UE 1*k*-02 receiving the message (e.g., V2X-SL-UECapabilityEnquiry) requesting V2X SL UE capability can compile its SL UE capability information to the vehicle UE 1*k*-01 and can transmit a message including V2X SL UE capability information (operation 1*k*-*b*). For example, the message may be referred to as V2X-SL-UECapabilityInformation. The message may be transmitted through an SCCH as a PC5-RRC control message. The message may include an indicator or an information element requesting transmission of a message including V2X SL UE capability information that the vehicle UE 1*k*-01 supports. Alternatively, the message may include a Provider Service Identifier (PSID) of a V2X application, or Intelligent Transport System-Application Identifiers (ITS-AIDs), or a QoS rule mapped to an identifier such as new identifiers, or a 5G QoS Indicator (5QI) or a V2X QoS Indicator (VQI), or a QoS Flow Indicator (QFI) based on a QoS parameter. Based on the information, the vehicle UE 1*k*-01 can determine that it may not be required to send a message including V2X SL UE capability information to the vehicle UE 1*k*-02.

3. The vehicle UE 1*k*-01 can transmit a message including V2X SL UE capability information that the vehicle UE 1*k*-01 supports, to the vehicle UE 1*k*-02 (operation 1*k*-*c*). For example, the message may be referred to as V2X-SL-UECapabilityInformationComplete. The message may be transmitted through an SCCH as a PC5-RRC control message. The message can be transmitted when an indicator or an information element that indicates that the vehicle UE 1*k*-01 transmits a message including the V2X SL UE capability information of the vehicle UE 1*k*-01 to the vehicle UE 1*k*-02 in operation 1*k*-*a* is included or when an indicator or an information element that requests transmission of a message including V2X SL UE capability information that the vehicle UE 1*k*-01 supports in operation 1*k*-*b* is included. Alternatively, the message may be transmitted anytime.

A message that the vehicle UE 1*k*-01 that has started the V2X SL UE capability transfer procedure transmits to the vehicle UE 1*k*-02 to request V2X SL UE capability (operation 1*k*-*a*):

may be transmitted before a DIRECT_COMMUNICATION_REQUEST message (operation 1*k*-10) is transmitted or may be transmitted simultaneously with a DIRECT_COMMUNICATION_REQUEST message (operation 1*k*-10) or may be multiplexed and transmitted with a DIRECT_COMMUNICATION_REQUEST message (operation 1*k*-10) or may be transmitted after a DIRECT_COMMUNICATION_REQUEST message (operation 1*k*-10) is transmitted or may be transmitted after a DIRECT_SECURITY_MODE_COMMAND message (operation 1*k*-20) is received or may be transmitted before a DIRECT_SECURITY_MODE_COMPLETE message (operation 1*k*-30) is transmitted or may be transmitted simultaneously with a DIRECT_SECURITY_MODE_COMPLETE message (operation 1*k*-30) or may be multiplexed and transmitted with a DIRECT_SECURITY_MODE_COMPLETE message (operation 1*k*-30) or may be transmitted after a DIRECT_SECURITY_MODE_COMPLETE message (operation 1*k*-30) is transmitted or may be transmitted after a DIRECT_COMMUNICATION_ACCEPT message (operation 1*k*-40) is received.

The message (operation 1*k*-*b*) including V2X SL UE capability information that the vehicle UE 1*k*-02 receiving the message (e.g., V2X-SL-UECapabilityEnquiry) requesting V2X SL UE capability transmits to the vehicle UE 1*k*-01:

may be transmitted after a message (operation 1*k*-*a*) requesting V2X SL UE capability is received or may be transmitted before a DIRECT_SECURITY_MO-
DE_COMMAND message (operation 1*k*-20) is trans-
mitted or may be transmitted simultaneously with a DIRECT_SE-
CURITY_MODE_COMMAND message (operation
1*k*-20) or may be multiplexed and transmitted with a DIRECT_SE-
CURITY_MODE_COMMAND message (operation
1*k*-20) or may be transmitted after a DIRECT_SECURITY_MOD-
E_COMMAND message (operation 1*k*-20) is transmit-
ted or may be transmitted after a DIRECT_SECURITY_MOD-
E_COMPLETE message (operation 1*k*-30) is received
or may be transmitted before a DIRECT_COMMUNICA-
TION_ACCEPT message (operation 1*k*-40) is trans-
mitted or may be transmitted simultaneously with a DIRECT_
COMMUNICATION_ACCEPT message (operation
1*k*-40) or may be multiplexed and transmitted with a DIRECT_
COMMUNICATION_ACCEPT message (operation
1*k*-40) or may be transmitted after a DIRECT_COMMUNICA-
TION_ACCEPT message (operation 1*k*-40) is trans-
mitted.

The message (operation 1*k*-c) including V2X SL UE
capability information that the vehicle UE 1*k*-01 receiving
the message (e.g., V2X-SL-UECapabilityEnquiry) includ-
ing V2X SL UE capability information transmits to the
vehicle UE 1*k*-02:

may be transmitted after a message (operation 1*k*-b)
including V2X SL UE capability information is
received or may be transmitted before a DIRECT_COMMUNICA-
TION_REQUEST message (operation 1*k*-10) is trans-
mitted or may be transmitted simultaneously with a DIRECT_
COMMUNICATION_REQUEST message (operation
1*k*-10) or may be multiplexed and transmitted with a DIRECT_
COMMUNICATION_REQUEST message (operation
1*k*-10) or may be transmitted after a DIRECT_COMMUNICA-
TION_REQUEST message (operation 1*k*-10) is trans-
mitted or may be transmitted after a DIRECT_SECURITY_MOD-
E_COMMAND message (operation 1*k*-20) is received
or may be transmitted before a DIRECT_SECURITY_MO-
DE_COMPLETE message (operation 1*k*-30) is trans-
mitted or may be transmitted simultaneously with a DIRECT_SE-
CURITY_MODE_COMPLETE message (operation
1*k*-30) or may be multiplexed and transmitted with a DIRECT_SE-
CURITY_MODE_COMPLETE message (operation
1*k*-30) or may be transmitted after a DIRECT_SECURITY_MOD-
E_COMPLETE message (operation 1*k*-30) is transmit-
ted or may be transmitted after a DIRECT_COMMUNICA-
TION_ACCEPT message (operation 1*k*-40) is
received.

When the vehicle UE 1*k*-01 transmits the message (1*k*-c)
to the vehicle UE 1*k*-02, the vehicle UE 1*k*-01 can transmit
the message 1*k*-c to the vehicle UE 1*k*-02, including only
V2X SL UE capability information that the vehicle UE
1*k*-01 can support, based on the message (1*k*-b) including
the received V2X SL UE capability information. That is, the
message (operation 1*k*-c) may include a portion of or the
entire received message (operation 1*k*-b). Alternatively, the
message (operation 1*k*-c) may indicate only V2X SL UE
capability information that can be supported in the received
message (operation 1*k*-b). Alternatively, the message (opera-
tion 1*k*-c) may indicate only V2X SL UE capability infor-
mation that cannot be supported in the received message
(operation 1*k*-b).

When the V2X SL UE capability transfer procedure is
successfully performed, the vehicle UE 1*k*-01 can perform a
NR V2X SL PC5 RRC connection reconfiguration proce-
dure to provide an AS layer parameter and configuration
information that can be applied to NR V2X SL unicast
communication to the vehicle UE 1*k*-02.

The vehicle UE 1*k*-01 can transmit a PC5-RRC message
including an AS layer parameter and configuration informa-
tion that can be applied to NR V2X SL unicast communi-
cation to the vehicle UE 1*k*-02 (operation 1*k*-b). For
example, the message may be referred to as a V2X-SL-
RRCReconfiguration message. The message may be trans-
mitted through an SCCH as a PC5-RRC control message.
The message may include at least one of information
included in the PC5-RRC message according to the embodi-
ment described above. The message:

may be transmitted after a message (operation 1*k*-b)
including V2X SL UE information is received or may be transmitted simultaneously with a message (op-
eration 1*k*-c) including V2X SL UE information or may be multiplexed and transmitted with a message
(operation 1*k*-c) including V2X SL UE information is
received or may be transmitted after a message (operation 1*k*-c)
including V2X SL UE information is transmitted or may be transmitted before a DIRECT_COMMUNICA-
TION_REQUEST message (operation 1*k*-10) is trans-
mitted or may be transmitted simultaneously with a DIRECT_
COMMUNICATION_REQUEST message (operation
1*k*-10) or may be multiplexed and transmitted with a DIRECT_
COMMUNICATION_REQUEST message (operation
1*k*-10) or may be transmitted after a DIRECT_COMMUNICA-
TION_REQUEST message (operation 1*k*-10) is trans-
mitted or may be transmitted after a DIRECT_SECURITY_MOD-
E_COMMAND message (operation 1*k*-20) is received
or may be transmitted before a DIRECT_SECURITY_MO-
DE_COMPLETE message (operation 1*k*-30) is trans-
mitted or may be transmitted simultaneously with a DIRECT_SE-
CURITY_MODE_COMPLETE message (operation
1*k*-30) or may be multiplexed and transmitted with a DIRECT_SE-
CURITY_MODE_COMPLETE message (operation
1*k*-30) or may be transmitted after a DIRECT_SECURITY_MOD-
E_COMPLETE message (operation 1*k*-30) is transmit-
ted or may be transmitted after a DIRECT_COMMUNICA-
TION_ACCEPT message (operation 1*k*-40) is
received.

The vehicle UE 1k-02 can receive the PC5 RRC message (operation 1k-c) transmitted from the vehicle UE 1k-01, and when the message is applied, the vehicle UE 1k-02 can transmit a PC5 RRC message to inform the vehicle UE 1k-01 that the message has been confirmed (1k-c). For example, the message may be referred to as a V2X-SL-RRCReconfigurationComplete message. The message may be transmitted through an SCCH as a PC5-RRC control message. The message may include at least one of information included in the PC5-RRC message according to the embodiment described above.

The message may be transmitted after a PC5 RRC message (operation 1k-d) including an AS layer parameter and configuration information that can be applied to NR V2X SL unicast communication is received or may be transmitted before a DIRECT_SECURITY_MODE_COMMAND message (operation 1k-20) is transmitted or may be transmitted simultaneously with a DIRECT_SECURITY_MODE_COMMAND message (operation 1k-20) or may be multiplexed and transmitted with a DIRECT_SECURITY_MODE_COMMAND message (operation 1k-20) or may be transmitted after a DIRECT_SECURITY_MODE_COMMAND message (operation 1k-20) is transmitted or may be transmitted after a DIRECT_SECURITY_MODE_COMPLETE message (operation 1k-30) is received or may be transmitted before a DIRECT_COMMUNICATION_ACCEPT message (operation 1k-40) is transmitted or may be transmitted simultaneously with a DIRECT_COMMUNICATION_ACCEPT message (operation 1k-40) or may be multiplexed and transmitted with a DIRECT_COMMUNICATION_ACCEPT message (operation 1k-40) or may be transmitted after a DIRECT_COMMUNICATION_ACCEPT message (operation 1k-40) is transmitted.

The V2X SL UE capability transfer procedure according to an embodiment of the disclosure may be referred to as a 3-operation procedure. The 3-operation may have the following advantages:

When the vehicle UE 1k-01 transmits a message for requesting UE capability to the vehicle UE 1k-02, information for filtering the V2X SL UE capability of the vehicle UE 1k-02 may be included, so the vehicle UE 1k-02 can transmit a message including V2X SL UE capability information, based on filtered information to the vehicle UE 1k-01. That is, less information may be included in the message including the V2X SL UE capability information, so signaling overhead can be reduced.

When the vehicle UE 1k-02 does not know at least some of the V2X SL UE capability information that the vehicle UE 1k-01 supports, the vehicle UE 1k-01 performs the last operation of the 3-operation, whereby the vehicle UE 1k-02 can know the V2X SL UE capability information that the vehicle UE 1k-01 supports.

The vehicle UE 1k-01 performs the last operation, including only V2X SL UE capability information that the vehicle UE 1k-01 can support of the V2X SL UE capability information that the vehicle UE 1k-02 can support, to the vehicle UE 1k-02, thereby being able to reduce signaling overhead.

When the V2X SL UE capability transfer procedure is successfully performed, the vehicle UE 1k-02 can perform a NR V2X SL PC5 RRC connection reconfiguration procedure to provide an AS layer parameter and configuration information that can be applied to NR V2X SL unicast communication to the vehicle UE 1k-01.

The vehicle UE 1k-01 can transmit a PC5-RRC message including an AS layer parameter and configuration information that can be applied to NR V2X SL unicast communication to the vehicle UE 1k-01 (operation 1k-f). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1k-c) including V2X SL UE information is received or may be transmitted before a DIRECT_SECURITY_MODE_COMMAND message (operation 1k-20) is transmitted or may be transmitted simultaneously with a DIRECT_SECURITY_MODE_COMMAND message (operation 1k-20) or may be multiplexed and transmitted with a DIRECT_SECURITY_MODE_COMMAND message (operation 1k-20) or may be transmitted after a DIRECT_SECURITY_MODE_COMMAND message (operation 1k-20) is transmitted or may be transmitted after a DIRECT_SECURITY_MODE_COMPLETE message (operation 1k-30) is received or may be transmitted before a DIRECT_COMMUNICATION_ACCEPT message (operation 1k-40) is transmitted or may be transmitted simultaneously with a DIRECT_COMMUNICATION_ACCEPT message (operation 1k-40) or may be multiplexed and transmitted with a DIRECT_COMMUNICATION_ACCEPT message (operation 1k-40) or may be transmitted after a DIRECT_COMMUNICATION_ACCEPT message (operation 1k-40) is transmitted.

The vehicle UE 1k-01 can receive the PC5 RRC message (operation 1k-f) transmitted from the vehicle UE 1k-02, and when the message is applied, the vehicle UE 1k-02 can transmit a PC5 RRC message to inform the vehicle UE 1k-01 that the message has been confirmed (1k-g). For example, the message may be referred to as a V2X-SL-RRCReconfigurationComplete message. The message may be transmitted through an SCCH as a PC5-RRC control message. The message may include at least one of information included in the PC5-RRC message according to the embodiment described above. The message:

may be transmitted after a PC5 RRC message (operation 1k-f) including an AS layer parameter and configuration information that can be applied to NR V2X SL unicast communication is received or may be transmitted after a DIRECT_SECURITY_MODE_COMMAND message (operation 1k-20) is received or may be transmitted before a DIRECT_SECURITY_MO-
DE_COMPLETE message (operation 1*k*-30) is transmitted or may be transmitted simultaneously with a DIRECT_SE-
CURITY_MODE_COMPLETE message (operation 1*k*-30) or may be multiplexed and transmitted with a DIRECT_SE-
CURITY_MODE_COMPLETE message (operation 1*k*-30) or may be transmitted after a DIRECT_SECURITY_MOD-
E_COMPLETE message (operation 1*k*-30) is transmitted or may be transmitted after a DIRECT_COMMUNICA-
TION_ACCEPT message (operation 1*k*-40) is received.

The 3-operation may have the advantages described above.

Figure 1L:
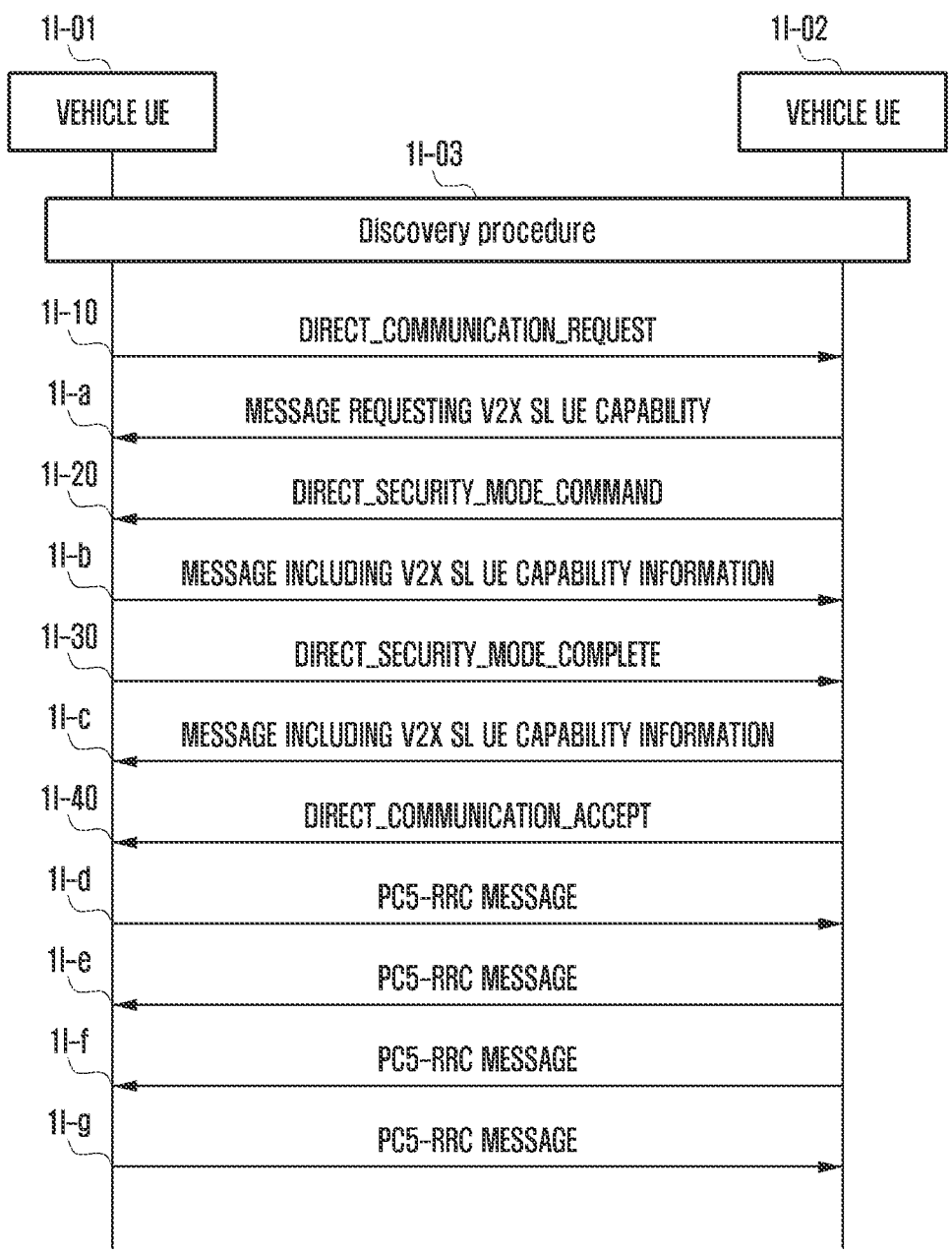
FIG. 1L is a diagram illustrating a V2X SL UE capability transfer procedure to perform NR V2X SL unicast communication between user equipments according to an embodiment of the disclosure.

FIG. 1L is a diagram illustrating a V2X SL UE capability transfer procedure to perform NR V2X SL unicast communication between user equipments according to an embodiment of the disclosure.

Referring to FIG. 1L, a vehicle UE 1*l*-01 can perform a discovery procedure (operation 1*l*-03) with another vehicle UE 1*l*-02 for NR V2X SL unicast communication. The vehicle UE 1*l*-01 can perform an upper layer connection establishment procedure (operation 1*l*-10, operation 1*l*-20, operation 1*l*-30, and operation 1*l*-40) to establish SL connection with the vehicle UE 1*l*-02. The upper layer connection establishment procedure may be performed through the embodiment described above.

The vehicle UE 1*l*-02 can start a V2X SL UE capability transfer procedure when V2X sidelink radio access capability information of the vehicle UE 1*l*-01 is required. The upper layer connection establishment procedure and the V2X SL UE capability transfer procedure may be independently performed, or may be performed in parallel, or may be performed through one process.

1. The vehicle UE 1*l*-02 can transmit a message that requests the V2X sidelink radio access capability information of the vehicle UE 1*l*-01 (operation 1*l*-a). For example, the message may be referred to as V2X-SL-UECapability-Enquiry. The message may be transmitted through an SCCH as a PC5-RRC control message. The vehicle UE 1*l*-02 can request a UE radio access capability for an NR V2X SL or a UE radio access capability for an LTE V2X SL from the vehicle UE 1*l*-01 through the message. The message may include at least one of the following information:

A. V2X-SL-UE-CapabilityRAT-RequestList that is used to request V2X SL UE capability for one or more Radio Access Technologies (RAT) of the vehicle UE 1*l*-01:

i. The V2X-SL-UE-CapabilityRAT-RequestList may include one or more V2X-SL-UE-CapabilityRAT-Request.

ii. Each V2X-SL-UE-CapabilityRequest may include rat-type indicating the type of a radio access technology. The rat-Type may indicate one of NR standalone, EUTRA standalone, and MR-DC. For example, the rat-Type may be indicated as one value of eutra-nr, eutra, and nr-eutra.

iii. Each V2X-SL-UE-CapabilityRequest may include information (v2x-SL-CapabilityRequestFilter) for filtering the V2X SL UE capability of the vehicle UE 1*l*-01. For example, when the rat-Type is configured as nr (or eutra-nr), the v2x-SL-CapabilityRequestFilter may mean V2X-SL-UE-CapabilityRequestNR (or V2X-SL-UE-Capability-MRDC).

B. An indicator or an information element indicating that the vehicle UE 1*l*-02 transmits a message including V2X SL UE capability information of the vehicle UE 1*l*-02 to the vehicle UE 1*k*-01.

2. The vehicle UE 1*l*-01 receiving the message (e.g., V2X-SL-UECapabilityEnquiry) requesting V2X SL UE capability can compile its SL UE capability information to the vehicle UE 1*l*-02 and can transmit a message including V2X SL UE capability information (operation 1*l*-b). For example, the message may be referred to as V2X-SL-UECapabilityInformation. The message may be transmitted through an SCCH as a PC5-RRC control message. The message may include an indicator or an information element requesting transmission of a message including V2X SL UE capability information that the vehicle UE 1*l*-02 supports. Alternatively, the message may include a Provider Service Identifier (PSID) of a V2X application, or Intelligent Transport System-Application Identifiers (ITS-AIDs), or a QoS rule mapped to an identifier such as new identifiers, or a 5G QoS Indicator (5QI) or a QoS Indicator (VQI), or a QoS Flow Indicator (QFI) based on a QoS parameter. Based on the information, the vehicle UE 1*l*-02 can determine that it may not be required to send a message including V2X SL UE capability information to the vehicle UE 1*l*-01.

3. The vehicle UE 1*l*-02 can transmit a message including V2X SL UE capability information that the vehicle UE 1*l*-02 supports, to the vehicle UE 1*l*-01 (operation 1*l*-c). For example, the message may be referred to as V2X-SL-UECapabilityInformationComplete. The message may be transmitted through an SCCH as a PC5-RRC control message. The message can be transmitted when an indicator or an information element that indicates that the vehicle UE 1*k*-02 transmits a message including the V2X SL UE capability information of the vehicle UE 1*l*-02 to the vehicle UE 1*k*-01 in operation 1*l*-a is included or when an indicator or an information element that requests transmission of a message including V2X SL UE capability information that the vehicle UE 1*l*-01 supports in operation 1*l*-b is included. Alternatively, the message may be transmitted anytime.

A message that the vehicle UE 1*l*-02 that has started the V2X SL UE capability transfer procedure transmits to the vehicle UE 1*l*-01 to request V2X SL UE capability (operation 1*l*-a):

may be transmitted after a DIRECT_COMMUNICA-
TION_REQUEST message (operation 1*l*-10) is received or may be transmitted before a DIRECT_SECURITY_MO-
DE_COMMAND message (operation 1*l*-20) is transmitted or may be transmitted simultaneously with a DIRECT_SE-
CURITY_MODE_COMMAND message (operation 1*l*-20) or may be multiplexed and transmitted with a DIRECT_SE-
CURITY_MODE_COMMAND message (operation 1*l*-20) or may be transmitted after a DIRECT_SECURITY_MOD-
E_COMMAND message (operation 1*l*-20) is transmitted or may be transmitted after a DIRECT_SECURITY_MOD-
E_COMPLETE message (operation 1*l*-30) is received or may be transmitted before a DIRECT_COMMUNICA-
TION_ACCEPT message (operation 1*l*-40) is transmitted or may be transmitted simultaneously with a DIRECT_
COMMUNICATION_ACCEPT message (operation 1*l*-40) or may be multiplexed and transmitted with a DIRECT_COMMUNICATION_ACCEPT message (operation 1*l*-40) or may be transmitted after a DIRECT_COMMUNICATION_ACCEPT message (operation 1*l*-40) is transmitted.

The message (operation 1*l*-*b*) including V2X SL UE capability information that the vehicle UE 1*l*-01 receiving the message (e.g., V2X-SL-UECapabilityEnquiry) requesting V2X SL UE capability transmits to the vehicle UE 1*l*-02:

may be transmitted after a message (operation 1*l*-*a*) requesting V2X SL UE capability is received or may be transmitted before a DIRECT_COMMUNICATION_REQUEST message (operation 1*l*-10) is transmitted or may be transmitted simultaneously with a DIRECT_COMMUNICATION_REQUEST message (operation 1*l*-10) or may be multiplexed and transmitted with a DIRECT_COMMUNICATION_REQUEST message (operation 1*l*-10) or may be transmitted after a DIRECT_COMMUNICATION_REQUEST message (operation 1*l*-10) is transmitted or may be transmitted after a DIRECT_SECURITY_MODE_COMMAND message (operation 1*l*-20) is received or may be transmitted before a DIRECT_SECURITY_MODE_COMPLETE message (operation 1*l*-30) is transmitted or may be transmitted simultaneously with a DIRECT_SECURITY_MODE_COMPLETE message (operation 1*l*-30) or may be multiplexed and transmitted with a DIRECT_SECURITY_MODE_COMPLETE message (operation 1*l*-30) or may be transmitted after a DIRECT_SECURITY_MODE_COMPLETE message (operation 1*l*-30) is transmitted or may be transmitted after a DIRECT_COMMUNICATION_ACCEPT message (operation 1*l*-40) is received.

The message (operation 1*l*-*c*) including V2X SL UE capability information that the vehicle UE 1*l*-02 receiving the message (e.g., V2X-SL-UECapabilityEnquiry) including V2X SL UE capability information transmits to the vehicle UE 1*l*-01:

may be transmitted after a message (operation 1*l*-*b*) requesting V2X SL UE capability is received or may be transmitted before a DIRECT_SECURITY_MODE_COMMAND message (operation 1*l*-20) is transmitted or may be transmitted simultaneously with a DIRECT_SECURITY_MODE_COMMAND message (operation 1*l*-20) or may be multiplexed and transmitted with a DIRECT_SECURITY_MODE_COMMAND message (operation 1*l*-20) or may be transmitted after a DIRECT_SECURITY_MODE_COMMAND message (operation 1*l*-20) is transmitted or may be transmitted after a DIRECT_SECURITY_MODE_COMPLETE message (operation 1*l*-30) is received or may be transmitted before a DIRECT_COMMUNICATION_ACCEPT message (operation 1*l*-40) is transmitted or may be transmitted simultaneously with a DIRECT_COMMUNICATION_ACCEPT message (operation 1*l*-40) or may be multiplexed and transmitted with a DIRECT_COMMUNICATION_ACCEPT message (operation 1*l*-40) or may be transmitted after a DIRECT_COMMUNICATION_ACCEPT message (operation 1*l*-40) is transmitted.

When the vehicle UE 1*l*-02 transmits the message (1*l*-*c*) to the vehicle UE 1*l*-01, the vehicle UE 1*l*-02 can transmit the message (operation 1*l*-*c*) to the vehicle UE 1*l*-01, including only V2X SL UE capability information that the vehicle UE 1*l*-02 can support, based on the message (operation 1*l*-*b*) including the received V2X SL UE capability information. That is, the message (operation 1*l*-*c*) may include a portion of or the entire received message (operation 1*l*-*b*). Alternatively, the message (operation 1*l*-*c*) may indicate only V2X SL UE capability information that can be supported in the received message (operation 1*l*-*b*). Alternatively, the message (operation 1*l*-*c*) may indicate only V2X SL UE capability information that cannot be supported in the received message (operation 1*l*-*b*).

When the V2X SL UE capability transfer procedure is successfully performed, the vehicle UE 1*l*-02 can perform a NR V2X SL PC5 RRC connection reconfiguration procedure to provide an AS layer parameter and configuration information that can be applied to NR V2X SL unicast communication to the vehicle UE 1*l*-01.

The vehicle UE 1*l*-01 can transmit a PC5-RRC message including an AS layer parameter and configuration information that can be applied to NR V2X SL unicast communication to the vehicle UE 1*l*-02 (operation 1*l*-*d*). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1*l*-*c*) including V2X SL UE information is received or may be transmitted before a DIRECT_COMMUNICATION_REQUEST message (operation 1*l*-10) is transmitted or may be transmitted simultaneously with a DIRECT_COMMUNICATION_REQUEST message (operation 1*l*-10) or may be multiplexed and transmitted with a DIRECT_COMMUNICATION_REQUEST message (operation 1*l*-10) or may be transmitted after a DIRECT_COMMUNICATION_REQUEST message (operation 1*l*-10) is transmitted or may be transmitted after a DIRECT_SECURITY_MODE_COMMAND message (operation 1*l*-20) is received or may be transmitted before a DIRECT_SECURITY_MODE_COMPLETE message (operation 1*l*-30) is transmitted or may be transmitted simultaneously with a DIRECT_SECURITY_MODE_COMPLETE message (operation 1*l*-30) or may be multiplexed and transmitted with a DIRECT_SECURITY_MODE_COMPLETE message (operation 1*l*-30) or may be transmitted after a DIRECT_SECURITY_MOD-E_COMPLETE message (operation 1*l*-30) is transmitted or may be transmitted after a DIRECT_COMMUNICATION_ACCEPT message (operation 1*l*-40) is received.

The vehicle UE 1*l*-02 can receive the PC5 RRC message (operation 1*l*-c) transmitted from the vehicle UE 1*l*-01, and when the message is applied, the vehicle UE 1*l*-02 can transmit a PC5 RRC message to inform the vehicle UE 1*l*-01 that the message has been confirmed (operation 1*l*-e). For example, the message may be referred to as a V2X-SL-RRCReconfigurationComplete message. The message may be transmitted through an SCCH as a PC5-RRC control message. The message may include at least one of information included in the PC5-RRC message according to the embodiment described above. The message:

- may be transmitted after a PC5 RRC message (operation 1*l*-d) including an AS layer parameter and configuration information that can be applied to NR V2X SL unicast communication is received or
- may be transmitted before a DIRECT_SECURITY_MODE_COMMAND message (operation 1*l*-20) is transmitted or
- may be transmitted simultaneously with a DIRECT_SECURITY_MODE_COMMAND message (operation 1*l*-20) or
- may be multiplexed and transmitted with a DIRECT_SECURITY_MODE_COMMAND message (operation 1*l*-20) or
- may be transmitted after a DIRECT_SECURITY_MODE_COMMAND message (operation 1*l*-20) is transmitted or
- may be transmitted after a DIRECT_SECURITY_MODE_COMPLETE message (operation 1*l*-30) is received or
- may be transmitted before a DIRECT_COMMUNICATION_ACCEPT message (operation 1*l*-40) is transmitted or
- may be transmitted simultaneously with a DIRECT_COMMUNICATION_ACCEPT message (operation 1*l*-40) or
- may be multiplexed and transmitted with a DIRECT_COMMUNICATION_ACCEPT message (operation 1*l*-40) or
- may be transmitted after a DIRECT_COMMUNICATION_ACCEPT message (operation 1*l*-40) is transmitted.

The V2X SL UE capability transfer procedure according to an embodiment of the disclosure may be referred to as a 3-operation procedure. The 3-operation may have the following advantages:

- When the vehicle UE 1*l*-02 transmits a message for requesting UE capability to the vehicle UE 1*l*-01, information for filtering the V2X SL UE capability of the vehicle UE 1*l*-01 may be included, so the vehicle UE 1*l*-01 can transmit a message including V2X SL UE capability information, based on filtered information to the vehicle UE 1*l*-02. That is, less information may be included in the message including the V2X SL UE capability information, so signaling overhead can be reduced.
- When the vehicle UE 1*l*-01 does not know at least some of the V2X SL UE capability information that the vehicle UE 1*l*-02 supports, the vehicle UE 1*l*-02 performs the last operation of the 3-operation, whereby the vehicle UE 1*l*-01 can know the V2X SL UE capability information that the vehicle UE 1*l*-02 supports.

The vehicle UE 1*l*-02 performs the last operation, including only V2X SL UE capability information that the vehicle UE 1*l*-02 can support of the V2X SL UE capability information that the vehicle UE 1*k*-01 can support, to the vehicle UE 1*l*-01, thereby being able to reduce signaling overhead.

When the V2X SL UE capability transfer procedure is successfully performed, the vehicle UE 1*l*-02 can perform a NR V2X SL PC5 RRC connection reconfiguration procedure to provide an AS layer parameter and configuration information that can be applied to NR V2X SL unicast communication to the vehicle UE 1*l*-01.

The vehicle UE 1*l*-01 can transmit a PC5-RRC message including an AS layer parameter and configuration information that can be applied to NR V2X SL unicast communication to the vehicle UE 1*l*-01 (operation 1*l*-f). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

- may be transmitted simultaneously with a message (operation 1*l*-c) including V2X SL UE information or
- may be multiplexed and transmitted with a message (operation 1*l*-c) including V2X SL UE information or
- may be transmitted after a message (operation 1*l*-c) including V2X SL UE information is transmitted or
- may be transmitted before a DIRECT_SECURITY_MODE_COMMAND message (operation 1*l*-20) is transmitted or
- may be transmitted simultaneously with a DIRECT_SECURITY_MODE_COMMAND message (operation 1*l*-20) or
- may be multiplexed and transmitted with a DIRECT_SECURITY_MODE_COMMAND message (operation 1*l*-20) or
- may be transmitted after a DIRECT_SECURITY_MODE_COMMAND message (operation 1*l*-20) is transmitted or
- may be transmitted after a DIRECT_SECURITY_MODE_COMPLETE message (operation 1*l*-30) is received or
- may be transmitted before a DIRECT_COMMUNICATION_ACCEPT message (operation 1*l*-40) is transmitted or
- may be transmitted simultaneously with a DIRECT_COMMUNICATION_ACCEPT message (operation 1*l*-40) or
- may be multiplexed and transmitted with a DIRECT_COMMUNICATION_ACCEPT message (operation 1*l*-40) or
- may be transmitted after a DIRECT_COMMUNICATION_ACCEPT message (operation 1*l*-40) is transmitted.

The vehicle UE 1*l*-01 can receive the PC5 RRC message (operation 1*l*-c) transmitted from the vehicle UE 1*l*-02, and when the message is applied, the vehicle UE 1*l*-01 can transmit a PC5 RRC message to inform the vehicle UE 1*l*-02 that the message has been confirmed (operation 1*l*-g). For example, the message may be referred to as a V2X-SL-RRCReconfigurationComplete message. The message may be transmitted through an SCCH as a PC5-RRC control message. The message may include at least one of information included in the PC5-RRC message according to the embodiment described above. The message:

may be transmitted after a PC5 RRC message (operation 1*l*-0 including an AS layer parameter and configuration information that can be applied to NR V2X SL unicast communication is received or may be transmitted after a DIRECT_SECURITY_MODE_COMMAND message (operation 1*l*-20) is received or may be transmitted before a DIRECT_SECURITY_MODE_COMPLETE message (operation 1*l*-30) is transmitted or may be transmitted simultaneously with a DIRECT_SECURITY_MODE_COMPLETE message (operation 1*l*-30) or may be multiplexed and transmitted with a DIRECT_SECURITY_MODE_COMPLETE message (operation 1*l*-30) or may be transmitted after a DIRECT_SECURITY_MODE_COMPLETE message (operation 1*l*-30) is transmitted or may be transmitted after a DIRECT_COMMUNICATION_ACCEPT message (operation 1*l*-40) is received.

The 3-operation may have the advantages described above.

Figure 1M:
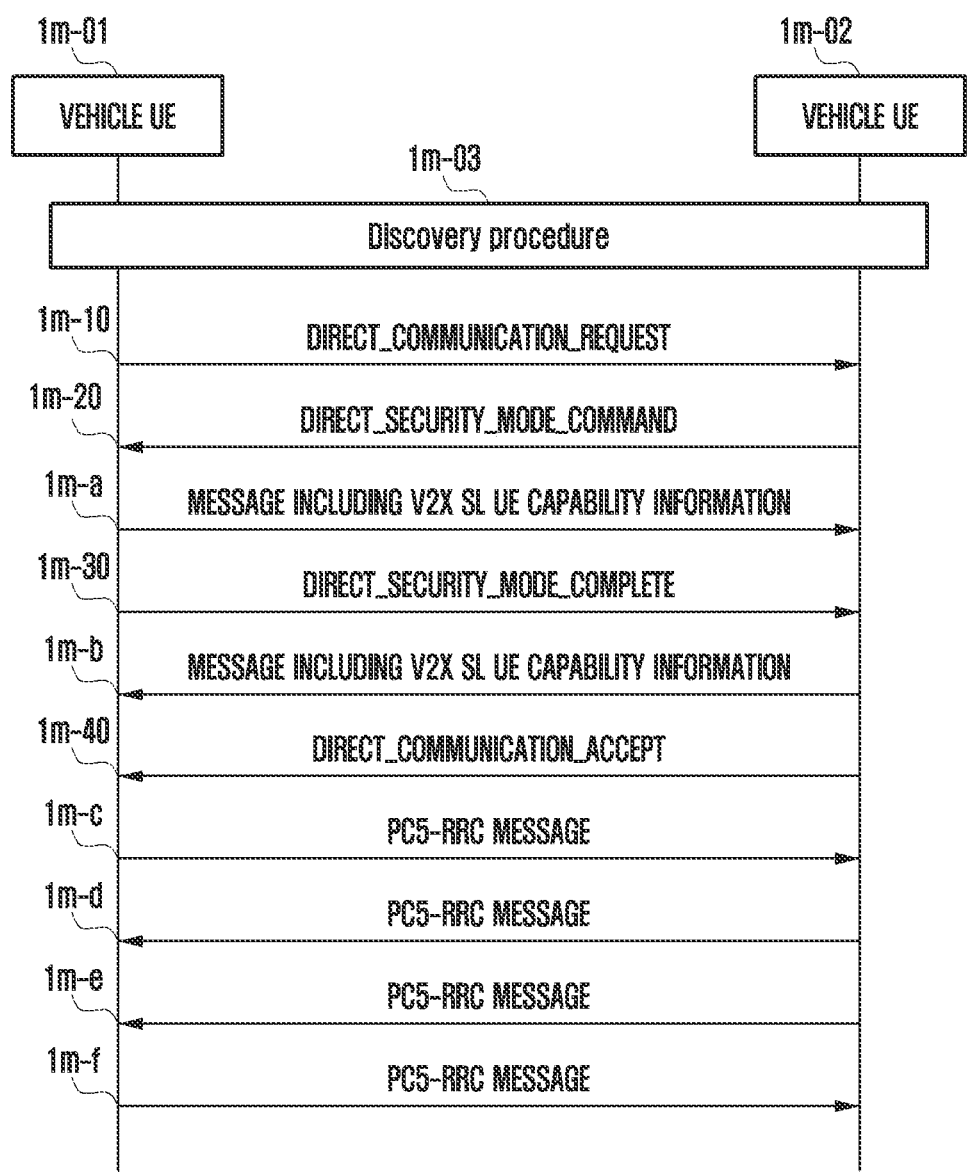
FIG. 1M is a diagram illustrating a V2X SL UE capability transfer procedure to perform NR V2X SL unicast communication between user equipments according to an embodiment of the disclosure.

FIG. 1M is a diagram illustrating a V2X SL UE capability transfer procedure to perform NR V2X SL unicast communication between user equipments according to an embodiment of the disclosure.

Referring to FIG. 1M, a vehicle UE 1*m*-01 can perform a discovery procedure (operation 1*m*-03) with another vehicle UE 1*m*-02 for NR V2X SL unicast communication. The vehicle UE 1*m*-01 can perform an upper layer connection establishment procedure (operation 1*m*-10, operation 1*m*-20, operation 1*m*-30, and operation 1*m*-40) to establish SL connection with the vehicle UE 1*m*-02. The upper layer connection establishment procedure may be performed through the embodiment described above.

The vehicle UE 1*m*-01 can start a V2X SL UE capability transfer procedure when transmitting V2X sidelink radio access capability information to the vehicle UE 1*m*-02. The upper layer connection establishment procedure and the V2X SL UE capability transfer procedure may be independently performed, or may be performed in parallel, or may be performed through one process.

1. The vehicle UE 1*m*-01 can transmit a message including the entire V2X SL UE capability information that it supports, to the vehicle UE 1*m*-02 (operation 1*m*-a). For example, the message may be referred to as V2X-SL-UECapabilityInformation. The message may be transmitted through an SCCH as a PC5-RRC control message. The message may include an indicator or an information element requesting transmission of a message including V2X SL UE capability information that the vehicle UE 1*m*-02 supports. Alternatively, the message may include a Provider Service Identifier (PSID) of a V2X application, or Intelligent Transport System-Application Identifiers (ITS-AIDs), or a QoS rule mapped to an identifier such as new identifiers, or a 5G QoS Indicator (5QI) or a QoS Indicator (VQI), or a QoS Flow Indicator (QFI) based on a QoS parameter. Based on the information, the vehicle UE 1*m*-02 can determine that it may not be required to send a message including V2X SL UE capability information to the vehicle UE 1*m*-01.

2. The vehicle UE 1*m*-02 can transmit a message including V2X SL UE capability information that the vehicle UE 1*m*-02 supports, to the vehicle UE 1*m*-01 (operation 1*m*-b). For example, the message may be referred to as V2X-SL-UECapabilityInformationComplete. The message may be transmitted through an SCCH as a PC5-RRC control message. The message can be transmitted when an indicator or an information element indicating that the vehicle UE 1*m*-01 transmits a message including V2X SL UE capability information of the vehicle UE 1*m*-02 to the vehicle UE 1*m*-02 is included in operation 1*m*-a. Alternatively, the message may be transmitted anytime.

A message including V2X SL UE capability (operation 1*m*-a) that the vehicle UE 1*m*-01 that has started the V2X SL UE capability transfer procedure transmits to the vehicle UE 1*m*-02:

may be transmitted before a DIRECT_COMMUNICATION_REQUEST message (operation 1*m*-10) is transmitted or may be transmitted simultaneously with a DIRECT_COMMUNICATION_REQUEST message (operation 1*m*-10) or may be multiplexed and transmitted with a DIRECT_COMMUNICATION_REQUEST message (operation 1*m*-10) or may be transmitted after a DIRECT_COMMUNICATION_REQUEST message (operation 1*m*-10) is transmitted or may be transmitted after a DIRECT_SECURITY_MODE_COMMAND message (operation 1*m*-20) is received or may be transmitted before a DIRECT_SECURITY_MODE_COMPLETE message (operation 1*m*-30) is transmitted or may be transmitted simultaneously with a DIRECT_SECURITY_MODE_COMPLETE message (operation 1*m*-30) or may be multiplexed and transmitted with a DIRECT_SECURITY_MODE_COMPLETE message (operation 1*m*-30) or may be transmitted after a DIRECT_SECURITY_MODE_COMPLETE message (operation 1*m*-30) is transmitted or may be transmitted after a DIRECT_COMMUNICATION_ACCEPT message (operation 1*m*-40) is received.

The message (operation 1*m*-b) including V2X SL UE capability information that the vehicle UE 1*m*-02 receiving the message (e.g., V2X-SL-UECapabilityInformation) including V2X SL UE capability information transmits to the vehicle UE 1*m*-01:

may be transmitted after a message (operation 1*m*-a) including V2X SL UE information is received or may be transmitted before a DIRECT_SECURITY_MODE_COMMAND message (operation 1*m*-20) is transmitted or may be transmitted simultaneously with a DIRECT_SECURITY_MODE_COMMAND message (operation 1*m*-20) or may be multiplexed and transmitted with a DIRECT_SECURITY_MODE_COMMAND message (operation 1*m*-20) or may be transmitted after a DIRECT_SECURITY_MODE_COMMAND message (operation 1*m*-20) is transmitted or may be transmitted after a DIRECT_SECURITY_MODE_COMPLETE message (operation 1*m*-30) is received or may be transmitted before a DIRECT_COMMUNICATION_ACCEPT message (operation 1*m*-40) is transmitted or may be transmitted simultaneously with a DIRECT_COMMUNICATION_ACCEPT message (operation 1*m*-40) or may be multiplexed and transmitted with a DIRECT_COMMUNICATION_ACCEPT message (operation 1*m*-40) or may be transmitted after a DIRECT_COMMUNICATION_ACCEPT message (operation 1*m*-40) is transmitted.

When the vehicle UE 1*m*-02 transmits the message (operation 1*m*-b) to the vehicle UE 1*m*-01, the vehicle UE 1*m*-02 can transmit the message (operation 1*m*-b) to the vehicle UE 1*m*-01, including only V2X SL UE capability information that the vehicle UE 1*m*-02 can support, based on the message (operation 1*m*-a) including the received V2X SL UE capability information. That is, the message (operation 1*m*-b) may include a portion of or the entire received message (operation 1*m*-a). Alternatively, the message (operation 1*m*-b) may indicate only V2X SL UE capability information that can be supported in the received message (operation 1*m*-a). Alternatively, the message (operation 1*m*-b) may indicate only V2X SL UE capability information that cannot be supported in the received message (operation 1*m*-a).

When the V2X SL UE capability transfer procedure is successfully performed, the vehicle UE 1*m*-01 can perform a NR V2X SL PC5 RRC connection reconfiguration procedure to provide an AS layer parameter and configuration information that can be applied to NR V2X SL unicast communication to the vehicle UE 1*m*-02.

The vehicle UE 1*m*-01 can transmit a PC5-RRC message including an AS layer parameter and configuration information that can be applied to NR V2X SL unicast communication to the vehicle UE 1*m*-02 (operation 1*m*-c). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1*m*-b) including V2X SL UE information is received or may be transmitted before a DIRECT_COMMUNICATION_REQUEST message (operation 1*m*-10) is transmitted or may be transmitted simultaneously with a DIRECT_COMMUNICATION_REQUEST message (operation 1*m*-10) or may be multiplexed and transmitted with a DIRECT_COMMUNICATION_REQUEST message (operation 1*m*-10) or may be transmitted after a DIRECT_COMMUNICATION_REQUEST message (operation 1*m*-10) is transmitted or may be transmitted after a DIRECT_SECURITY_MODE_COMMAND message (operation 1*m*-20) is received or may be transmitted before a DIRECT_SECURITY_MODE_COMPLETE message (operation 1*m*-30) is transmitted or may be transmitted simultaneously with a DIRECT_SECURITY_MODE_COMPLETE message (operation 1*m*-30) or may be multiplexed and transmitted with a DIRECT_SECURITY_MODE_COMPLETE message (operation 1*m*-30) or may be transmitted after a DIRECT_SECURITY_MODE_COMPLETE message (operation 1*m*-30) is transmitted or may be transmitted after a DIRECT_COMMUNICATION_ACCEPT message (operation 1*m*-40) is received.

The vehicle UE 1*m*-02 can receive the PC5 RRC message (operation 1*m*-c) transmitted from the vehicle UE 1*m*-01, and when the message is applied, the vehicle UE 1*m*-02 can transmit a PC5 RRC message to inform the vehicle UE 1*m*-01 that the message has been confirmed (operation 1*m*-e). For example, the message may be referred to as a V2X-SL-RRCReconfigurationComplete message. The message may be transmitted through an SCCH as a PC5-RRC control message. The message may include at least one of information included in the PC5-RRC message according to the embodiment described above. The message:

may be transmitted after a PC5 RRC message (operation 1*m*-c) including an AS layer parameter and configuration information that can be applied to NR V2X SL unicast communication is received or may be transmitted before a DIRECT_SECURITY_MODE_COMMAND message (operation 1*m*-20) is transmitted or may be transmitted simultaneously with a DIRECT_SECURITY_MODE_COMMAND message (operation 1*m*-20) or may be multiplexed and transmitted with a DIRECT_SECURITY_MODE_COMMAND message (operation 1*m*-20) or may be transmitted after a DIRECT_SECURITY_MODE_COMMAND message (operation 1*m*-20) is transmitted or may be transmitted after a DIRECT_SECURITY_MODE_COMPLETE message (operation 1*m*-30) is received or may be transmitted before a DIRECT_COMMUNICATION_ACCEPT message (operation 1*m*-40) is transmitted or may be transmitted simultaneously with a DIRECT_COMMUNICATION_ACCEPT message (operation 1*m*-40) or may be multiplexed and transmitted with a DIRECT_COMMUNICATION_ACCEPT message (operation 1*m*-40) or may be transmitted after a DIRECT_COMMUNICATION_ACCEPT message (operation 1*m*-40) is transmitted.

The V2X SL UE capability transfer procedure according to an embodiment of the disclosure may be referred to as a 2-operation procedure. The 2-operation may have the following advantages:

The vehicle UE 1*m*-01 can transmit a message including V2X SL UE capability information through one-time signaling to the vehicle UE 1*m*-02. That is, the signaling flow can be reduced, so latency can be decreased.

When the vehicle UE 1*m*-01 does not know at least some of the V2X SL UE capability information of the vehicle UE 1*m*-02, the vehicle UE 1*m*-02 performs the last operation of the 2-operation, whereby the vehicle UE 1*m*-01 can know the V2X SL UE capability information that the vehicle UE 1*m*-02 supports.

The vehicle UE 1*m*-02 performs the last operation, including only V2X SL UE capability information that the vehicle UE 1*m*-02 can support of the V2X SL UE capability information that the vehicle UE 1m-01 can support, to the vehicle UE 1m-01, thereby being able to reduce signaling overhead.

When the V2X SL UE capability transfer procedure is successfully performed, the vehicle UE 1m-02 can perform a NR V2X SL PC5 RRC connection reconfiguration procedure to provide an AS layer parameter and configuration information that can be applied to NR V2X SL unicast communication to the vehicle UE 1m-01.

The vehicle UE 1m-02 can transmit a PC5-RRC message including an AS layer parameter and configuration information that can be applied to NR V2X SL unicast communication to the vehicle UE 1m-01 (operation 1m-e). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted simultaneously with a message (operation 1m-b) including V2X SL UE information or may be multiplexed and transmitted with a message (operation 1m-b) including V2X SL UE information or may be transmitted after a message (operation 1m-b) including V2X SL UE information is transmitted or may be transmitted after a DIRECT_COMMUNICATION_REQUEST message (operation 1m-10) is received or may be transmitted before a DIRECT_SECURITY_MODE_COMMAND message (operation 1m-20) is transmitted or may be transmitted simultaneously with a DIRECT_SECURITY_MODE_COMMAND message (operation 1m-20) or may be multiplexed and transmitted with a DIRECT_SECURITY_MODE_COMMAND message (operation 1m-20) or may be transmitted after a DIRECT_SECURITY_MODE_COMMAND message (operation 1m-20) is transmitted or may be transmitted after a DIRECT_SECURITY_MODE_COMPLETE message (operation 1m-30) is received or may be transmitted before a DIRECT_COMMUNICATION_ACCEPT message (operation 1m-40) is transmitted or may be transmitted simultaneously with a DIRECT_COMMUNICATION_ACCEPT message (operation 1m-40) or may be multiplexed and transmitted with a DIRECT_COMMUNICATION_ACCEPT message (operation 1m-40) or may be transmitted after a DIRECT_COMMUNICATION_ACCEPT message (operation 1m-40) is transmitted.

The vehicle UE 1m-01 can receive the PC5 RRC message (operation 1m-e) transmitted from the vehicle UE 1m-02, and when the message is applied, the vehicle UE 1m-01 can transmit a PC5 RRC message to inform the vehicle UE 1m-02 that the message has been confirmed (operation 1m-f). For example, the message may be referred to as a V2X-SL-RRCReconfigurationComplete message. The message may be transmitted through an SCCH as a PC5-RRC control message. The message may include at least one of information included in the PC5-RRC message according to the embodiment described above.

The message may be transmitted after a PC5 RRC message (operation 1m-e) including an AS layer parameter and configuration information that can be applied to NR V2X SL unicast communication is received or may be transmitted before a DIRECT_COMMUNICATION_REQUEST message (operation 1m-10) is transmitted or may be transmitted simultaneously with a DIRECT_COMMUNICATION_REQUEST message (operation 1m-10) or may be multiplexed and transmitted with a DIRECT_COMMUNICATION_REQUEST message (operation 1m-10) or may be transmitted after a DIRECT_COMMUNICATION_REQUEST message (operation 1m-10) is transmitted or may be transmitted after a DIRECT_SECURITY_MODE_COMMAND message (operation 1m-20) is received or may be transmitted before a DIRECT_SECURITY_MODE_COMPLETE message (operation 1m-30) is transmitted or may be transmitted simultaneously with a DIRECT_SECURITY_MODE_COMPLETE message (operation 1m-30) or may be multiplexed and transmitted with a DIRECT_SECURITY_MODE_COMPLETE message (operation 1m-30) or may be transmitted after a DIRECT_SECURITY_MODE_COMPLETE message (operation 1m-30) is transmitted or may be transmitted after a DIRECT_COMMUNICATION_ACCEPT message (operation 1m-40) is received.

The 2-operation may have the advantages described above.

Figure 1N:
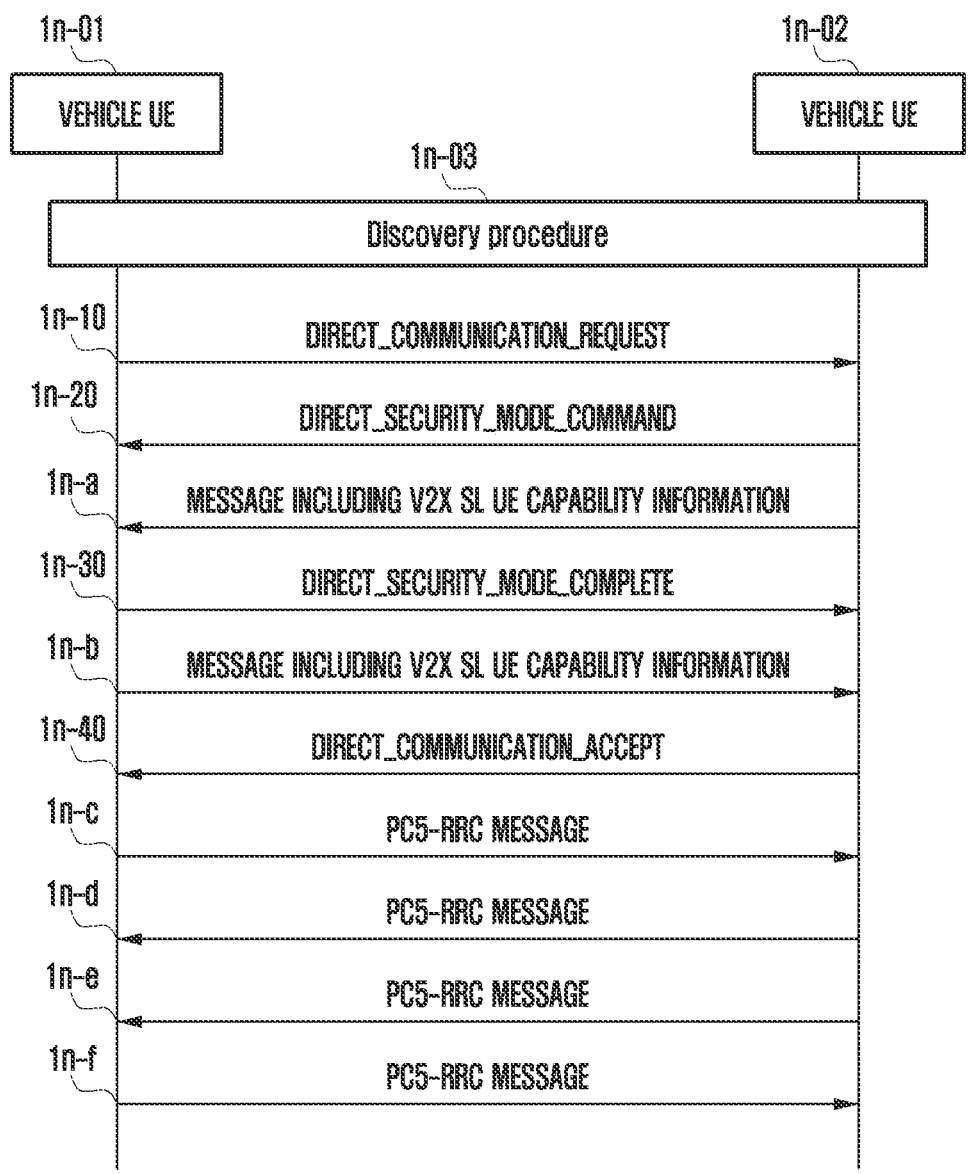
FIG. 1N is a diagram illustrating a V2X SL UE capability transfer procedure to perform NR V2X SL unicast communication between user equipments according to an embodiment of the disclosure.
Figure 10:
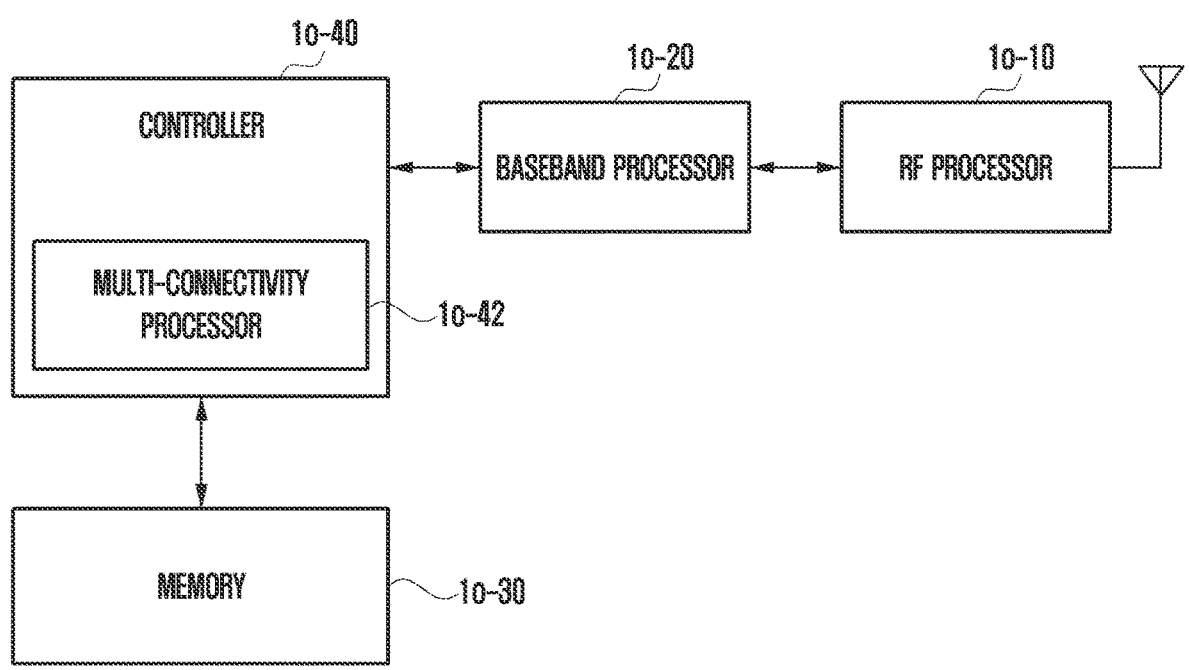

FIG. 1N is a diagram illustrating a V2X SL UE capability transfer procedure to perform NR V2X SL unicast communication between user equipments according to an embodiment of the disclosure.

Referring to FIG. 1N, a vehicle UE 1n-01 can perform a discovery procedure (operation 1n-03) with another vehicle UE 1n-02 for NR V2X SL unicast communication. The vehicle UE 1n-01 can perform an upper layer connection establishment procedure (operation 1n-10, operation 1n-20, operation 1n-30, and operation 1n-40) to establish SL connection with the vehicle UE 1n-02. The upper layer connection establishment procedure may be performed through the embodiment described above.

The vehicle UE 1n-02 can start a V2X SL UE capability transfer procedure when transmitting V2X sidelink radio access capability information to the vehicle UE 1n-01. The upper layer connection establishment procedure and the V2X SL UE capability transfer procedure may be independently performed, or may be performed in parallel, or may be performed through one process.

1. The vehicle UE 1n-02 can transmit a message including the entire V2X SL UE capability information that it supports, to the vehicle UE 1n-01 (operation 1n-a). For example, the message may be referred to as V2X-SL-UECapabilityInformation. The message may be transmitted through an SCCH as a PC5-RRC control message. The message may include an indicator or an information element requesting transmission of a message including V2X SL UE capability information that the vehicle UE 1n-01 supports. Alternatively, the message may include a Provider Service Identifier (PSID) of a V2X application, or Intelligent Transport System-Application Identifiers (ITS-AIDs), or a QoS rule mapped to an identifier such as new identifiers, or a 5G QoS Indicator (5QI) or V2X a QoS Indicator (VQI), or a QoS Flow Indicator (QFI) based on a QoS parameter. Based on the information, the vehicle UE 1*n*-01 can determine that it may not be required to send a message including V2X SL UE capability information to the vehicle 1*n*-02.

2. The vehicle UE 1*n*-01 can transmit a message including V2X SL UE capability information that the vehicle UE 1*n*-01 supports, to the vehicle UE 1*n*-02 (operation 1*n*-b). For example, the message may be referred to as V2X-SL-UECapabilityInformationComplete. The message may be transmitted through an SCCH as a PC5-RRC control message. The message can be transmitted when an indicator or an information element indicating that the vehicle UE 1*n*-01 transmits a message including V2X SL UE capability information of the vehicle UE 1*n*-01 to the vehicle UE 1*n*-01 is included in operation 1*n*-a. Alternatively, the message may be transmitted anytime.

A message including V2X SL UE capability information that the vehicle UE 1*n*-02 that has started the V2X SL UE capability transfer procedure transmits to the vehicle UE 1*n*-01 (operation 1*n*-a):

- may be transmitted after a DIRECT_COMMUNICATION_REQUEST message (operation 1*n*-10) is received or
- may be transmitted before a DIRECT_SECURITY_MODE_COMMAND message (operation 1*n*-20) is transmitted or
- may be transmitted simultaneously with a DIRECT_SECURITY_MODE_COMMAND message (operation 1*n*-20) or
- may be multiplexed and transmitted with a DIRECT_SECURITY_MODE_COMMAND message (operation 1*n*-20) or
- may be transmitted after a DIRECT_SECURITY_MODE_COMMAND message (operation 1*n*-20) is transmitted or
- may be transmitted after a DIRECT_SECURITY_MODE_COMPLETE message (operation 1*n*-30) is received or
- may be transmitted before a DIRECT_COMMUNICATION_ACCEPT message (operation 1*n*-40) is transmitted or
- may be transmitted simultaneously with a DIRECT_COMMUNICATION_ACCEPT message (operation 1*n*-40) or
- may be multiplexed and transmitted with a DIRECT_COMMUNICATION_ACCEPT message (operation 1*n*-40) or
- may be transmitted after a DIRECT_COMMUNICATION_ACCEPT message (operation 1*n*-40) is transmitted.

The message (operation 1*n*-b) including V2X SL UE capability information that the vehicle UE 1*n*-01 receiving the message (e.g., V2X-SL-UECapabilityInformation) including V2X SL UE capability information transmits to the vehicle UE 1*n*-02:

- may be transmitted after a message (operation 1*n*-a) including V2X SL UE information is received or
- may be transmitted before a DIRECT_COMMUNICATION_REQUEST message (operation 1*n*-10) is transmitted or
- may be transmitted simultaneously with a DIRECT_COMMUNICATION_REQUEST message (operation 1*n*-10) or
- may be multiplexed and transmitted with a DIRECT_COMMUNICATION_REQUEST message (operation 1*n*-10) or
- may be transmitted after a DIRECT_COMMUNICATION_REQUEST message (operation 1*n*-10) is transmitted or
- may be transmitted after a DIRECT_SECURITY_MODE_COMMAND message (operation 1*n*-20) is received or
- may be transmitted before a DIRECT_SECURITY_MODE_COMPLETE message (operation 1*n*-30) is transmitted or
- may be transmitted simultaneously with a DIRECT_SECURITY_MODE_COMPLETE message (operation 1*n*-30) or
- may be multiplexed and transmitted with a DIRECT_SECURITY_MODE_COMPLETE message (operation 1*n*-30) or
- may be transmitted after a DIRECT_SECURITY_MODE_COMPLETE message (operation 1*n*-30) is transmitted or
- may be transmitted after a DIRECT_COMMUNICATION_ACCEPT message (operation 1*n*-40) is received.

When the vehicle UE 1*n*-01 transmits the message (1*n*-b) to the vehicle UE 1*n*-02, the vehicle UE 1*n*-01 can transmit the message (operation 1*n*-b) to the vehicle UE 1*n*-02, including only V2X SL UE capability information that the vehicle UE 1*n*-01 can support, based on the message (operation 1*n*-a) including the received V2X SL UE capability information. That is, the message (operation 1*n*-b) may include a portion of or the entire received message (operation 1*n*-a). Alternatively, the message (operation 1*n*-b) may indicate only V2X SL UE capability information that can be supported in the received message (operation 1*n*-a). Alternatively, the message (operation 1*n*-b) may indicate only V2X SL UE capability information that cannot be supported in the received message (operation 1*n*-a).

When the V2X SL UE capability transfer procedure is successfully performed, the vehicle UE 1*n*-01 can perform a NR V2X SL PC5 RRC connection reconfiguration procedure to provide an AS layer parameter and configuration information that can be applied to NR V2X SL unicast communication to the vehicle UE 1*n*-02.

The vehicle UE 1*n*-01 can transmit a PC5-RRC message including an AS layer parameter and configuration information that can be applied to NR V2X SL unicast communication to the vehicle UE 1*n*-02 (operation 1*n*-c). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

- may be transmitted simultaneously with a message (operation 1*n*-b) including V2X SL UE information or
- may be multiplexed and transmitted with a message (operation 1*n*-b) including V2X SL UE information or
- may be transmitted after a message (operation 1*n*-b) including V2X SL UE information is transmitted or
- may be transmitted before a DIRECT_COMMUNICATION_REQUEST message (operation 1*n*-10) is transmitted or
- may be transmitted simultaneously with a DIRECT_COMMUNICATION_REQUEST message (operation 1*n*-10) or may be multiplexed and transmitted with a DIRECT_COMMUNICATION_REQUEST message (operation 1n-10) or may be transmitted after a DIRECT_COMMUNICATION_REQUEST message (operation 1n-10) is transmitted or may be transmitted after a DIRECT_SECURITY_MODE_COMMAND message (operation 1n-20) is received or may be transmitted before a DIRECT_SECURITY_MODE_COMPLETE message (operation 1n-30) is transmitted or may be transmitted simultaneously with a DIRECT_SECURITY_MODE_COMPLETE message (operation 1n-30) or may be multiplexed and transmitted with a DIRECT_SECURITY_MODE_COMPLETE message (operation 1n-30) or may be transmitted after a DIRECT_SECURITY_MODE_COMPLETE message (operation 1n-30) is transmitted or may be transmitted after a DIRECT_COMMUNICATION_ACCEPT message (operation 1n-40) is received.

The vehicle UE 1n-02 can receive the PC5 RRC message (operation 1n-b) transmitted from the vehicle UE 1n-01, and when the message is applied, the vehicle UE 1n-02 can transmit a PC5 RRC message to inform the vehicle UE 1j-01 that the message has been confirmed (1n-c). For example, the message may be referred to as a V2X-SL-RRCReconfigurationComplete message. The message may be transmitted through an SCCH as a PC5-RRC control message. The message may include at least one of information included in the PC5-RRC message according to the embodiment described above.

The message may be transmitted after a PC5 RRC message (operation 1n-c) including an AS layer parameter and configuration information that can be applied to NR V2X SL unicast communication is received or may be transmitted after a DIRECT_COMMUNICATION_REQUEST message (operation 1n-10) is received or may be transmitted before a DIRECT_SECURITY_MODE_COMMAND message (operation 1n-20) is transmitted or may be transmitted simultaneously with a DIRECT_SECURITY_MODE_COMMAND message (operation 1n-20) or may be multiplexed and transmitted with a DIRECT_SECURITY_MODE_COMMAND message (operation 1n-20) or may be transmitted after a DIRECT_SECURITY_MODE_COMMAND message (operation 1n-20) is transmitted or may be transmitted after a DIRECT_SECURITY_MODE_COMPLETE message (operation 1n-30) is received or may be transmitted before a DIRECT_COMMUNICATION_ACCEPT message (operation 1n-40) is transmitted or may be transmitted simultaneously with a DIRECT_COMMUNICATION_ACCEPT message (operation 1n-40) or may be multiplexed and transmitted with a DIRECT_COMMUNICATION_ACCEPT message (operation 1n-40) or may be transmitted after a DIRECT_COMMUNICATION_ACCEPT message (operation 1n-40) is transmitted.

The V2X SL UE capability transfer procedure according to an embodiment of the disclosure may be referred to as a 2-operation procedure. The 2-operation may have the following advantages:

The vehicle UE 1n-02 can transmit a message including V2X SL UE capability information through one-time signaling to the vehicle UE 1n-01. That is, the signaling flow can be reduced, so latency can be decreased.

When the vehicle UE 1n-02 does not know at least some of the V2X SL UE capability information of the vehicle UE 1n-01, the vehicle UE 1n-01 performs the last operation of the 2-operation, whereby the vehicle UE 1n-02 can know the V2X SL UE capability information that the vehicle UE 1n-01 supports.

The vehicle UE 1n-01 performs the last operation, including only V2X SL UE capability information that the vehicle UE 1n-01 can support of the V2X SL UE capability information that the vehicle UE 1n-02 can support, to the vehicle UE 1n-02, thereby being able to reduce signaling overhead.

When the V2X SL UE capability transfer procedure is successfully performed, the vehicle UE 1n-02 can perform a NR V2X SL PC5 RRC connection reconfiguration procedure to provide an AS layer parameter and configuration information that can be applied to NR V2X SL unicast communication to the vehicle UE 1n-01.

The vehicle UE 1n-02 can transmit a PC5-RRC message including an AS layer parameter and configuration information that can be applied to NR V2X SL unicast communication to the vehicle UE 1n-01 (operation 1n-e). For example, the message may be referred to as a V2X-SL-RRCReconfiguration message. The message may be transmitted through an SCCH as a PC5-RRC control message. The message may include at least one of information included in the PC5-RRC message according to the embodiment described above. The message:

may be transmitted after a message (operation 1n-b) including V2X SL UE information is received or may be transmitted after a DIRECT_COMMUNICATION_REQUEST message (operation 1n-10) is received or may be transmitted before a DIRECT_SECURITY_MODE_COMMAND message (operation 1n-20) is transmitted or may be transmitted simultaneously with a DIRECT_SECURITY_MODE_COMMAND message (operation 1n-20) or may be multiplexed and transmitted with a DIRECT_SECURITY_MODE_COMMAND message (operation 1n-20) or may be transmitted after a DIRECT_SECURITY_MODE_COMMAND message (operation 1n-20) is transmitted or may be transmitted after a DIRECT_SECURITY_MODE_COMPLETE message (operation 1n-30) is received or may be transmitted before a DIRECT_COMMUNICATION_ACCEPT message (operation 1n-40) is transmitted or may be transmitted simultaneously with a DIRECT_COMMUNICATION_ACCEPT message (operation 1n-40) or may be multiplexed and transmitted with a DIRECT_COMMUNICATION_ACCEPT message (operation 1n-40) or may be transmitted after a DIRECT_COMMUNICATION_ACCEPT message (operation 1n-40) is transmitted.

The vehicle UE 1n-01 can receive the PC5 RRC message (operation 1n-e) transmitted from the vehicle UE 1n-02, and when the message is applied, the vehicle UE 1n-01 can transmit a PC5 RRC message to inform the vehicle UE 1n-02 that the message has been confirmed (1n-f). For example, the message may be referred to as a V2X-SL-RRCReconfigurationComplete message. The message may be transmitted through an SCCH as a PC5-RRC control message. The message may include at least one of information included in the PC5-RRC message according to the embodiment described above. The message:

may be transmitted after a PC5 RRC message (operation 1n-e) including an AS layer parameter and configuration information that can be applied to NR V2X SL unicast communication is received or may be transmitted before a DIRECT_COMMUNICATION_REQUEST message (operation 1n-10) is transmitted or may be transmitted simultaneously with a DIRECT_COMMUNICATION_REQUEST message (operation 1n-10) or may be multiplexed and transmitted with a DIRECT_COMMUNICATION_REQUEST message (operation 1n-10) or may be transmitted after a DIRECT_COMMUNICATION_REQUEST message (operation 1n-10) is transmitted or may be transmitted after a DIRECT_SECURITY_MODE_COMMAND message (operation 1n-20) is received or may be transmitted before a DIRECT_SECURITY_MODE_COMPLETE message (operation 1n-30) is transmitted or may be transmitted simultaneously with a DIRECT_SECURITY_MODE_COMPLETE message (operation 1n-30) or may be multiplexed and transmitted with a DIRECT_SECURITY_MODE_COMPLETE message (operation 1n-30) or may be transmitted after a DIRECT_SECURITY_MODE_COMPLETE message (operation 1n-30) is transmitted or may be transmitted after a DIRECT_COMMUNICATION_ACCEPT message (operation 1n-40) is received.

The 2-operation may have the advantages described above.

When two UEs start the same procedure in accordance with an embodiment of the disclosure, the UEs can start one procedure in accordance with a received system frame number, an earlier system frame number through GNSS synchronization, or GNSS synchronization.

Procedures (FIGS. 1F to 1N) according to the disclosure may also be applied to perform NR V2X SL groupcast communication. For example, a UE corresponding to a leader and a UE corresponding to a follower or a member in a groupcast can perform a procedure according to an embodiment of the procedures (FIGS. 1F to 1N) according to the disclosure.

FIG. 1O is a diagram illustrating a structure of a user equipment according to an embodiment of the disclosure.

Referring to FIG. 1O, the UE may include a radio frequency (RF) processor 1o-10, a baseband processor 1o-20, a storage 1o-30, and a controller 1o-40.

The RF processor 1o-10 according to an embodiment of the disclosure can perform a function for transmitting/receiving a signal through a radio channel such as changing and amplifying the band of a signal. That is, the RF processor 1o-10 can convert upward a baseband signal provided from the baseband processor 1o-20 into an RF band signal and then receive the RF band signal through an antenna, and can convert the RF band signal received through the antenna downward into a baseband signal. For example, the RF processor 1o-10 may include a transmission filter, a reception filter, an amplifier, a mixer, an oscillator, a digital-to-analog converter (DAC), an analog-to-digital converter (ADC), etc.

Although only one antenna is shown in FIG. 1O, the UE may include several antennas.

The RF processor 1o-10 may include several RF chains. The RF processor 1o-10 can perform beamforming. For beamforming, the RF processor 1o-10 can adjust the phases and intensities of signals transmitted/received through several antennas or antenna elements. The RF processor 1o-10 can perform Multiple-Input Multiple-Output (MIMO) and can receive several layers when performing MIMO. The RF processor 1o-10 can perform sweeping a reception beam by appropriately configuring several antennas or antenna elements or can adjust the direction and the beam width of a reception beam such that the reception beam is consonant with a transmission beam in accordance with control by the controller 1o-40.

The baseband processor 1o-20 can perform a conversion function among base band signals and bit strings in accordance with the physical layer specification of the system. For example, the baseband processor 1o-20 can generate complex symbols by encoding and modulating transmission bit strings when transmitting data. Further, when receiving data, the baseband processor 1o-20 can restore reception bit strings by demodulating or decoding a baseband signal provided from the RF processor 1o-10. For example, according to Orthogonal Frequency Division Multiplexing (OFDM), when transmitting data, the baseband processor 1o-20 generates complex symbols by encoding and modulating transmission bit strings, maps the complex symbols to subcarriers, and then performs Inverse Fast Fourier transform (IFFT) and Cyclic Prefix (CP), thereby being able to configure OFDM symbols. Further, when receiving data, the baseband processor 1o-20 divides a baseband signal provided from the RF processor 1o-10 in the unit of OFDM symbol, restores signals mapped to subcarriers through Fast Fourier Transform (FFT), and then performs demodulating or decoding, thereby being able to restore a reception bit string.

The baseband processor 1o-20 and the RF processor 1o-10 can transmit and receive a signal, as described above. Accordingly, the baseband processor 1o-20 and the RF processor 1o-10 may be referred to as a transmitter, a receiver, a transceiver, or a communicator. At least one of the baseband processor 1o-20 and the RF processor 1o-10 may include several communication modules to support several different radio access technologies. At least one of the baseband processor 1o-20 and the RF processor 1o-10 may include different communication modules to process signals of different frequency bands. For example, the different radio access technologies may include an LTE network, an NR network, etc. The different frequency bands may include Super High Frequency (SHF) bands (for example, 2.2 GHz and 2 GHz) and millimeter wave bands (for example, 60 GHz).

The storage 1o-30 can store data such as fundamental programs, applications, and configuration information for operation of the UE. The storage 1o-30 can provide stored data in accordance with a request from the controller 1o-40.

The controller 1o-40 can control general operations of the UEs. For example, the controller 1o-40 can transmit/receive a signal through the baseband processor 1o-20 and the RF processor 1o-30. The controller 1o-40 can record and read data in and from the storage 1o-30. To this end, the controller 1o-40 may include at least one processor 1o-42. For example, the controller 1o-40 may include a communication processor (CP) that controls communication and an application processor (AP) that control upper links such as applications.

Figure 1P:
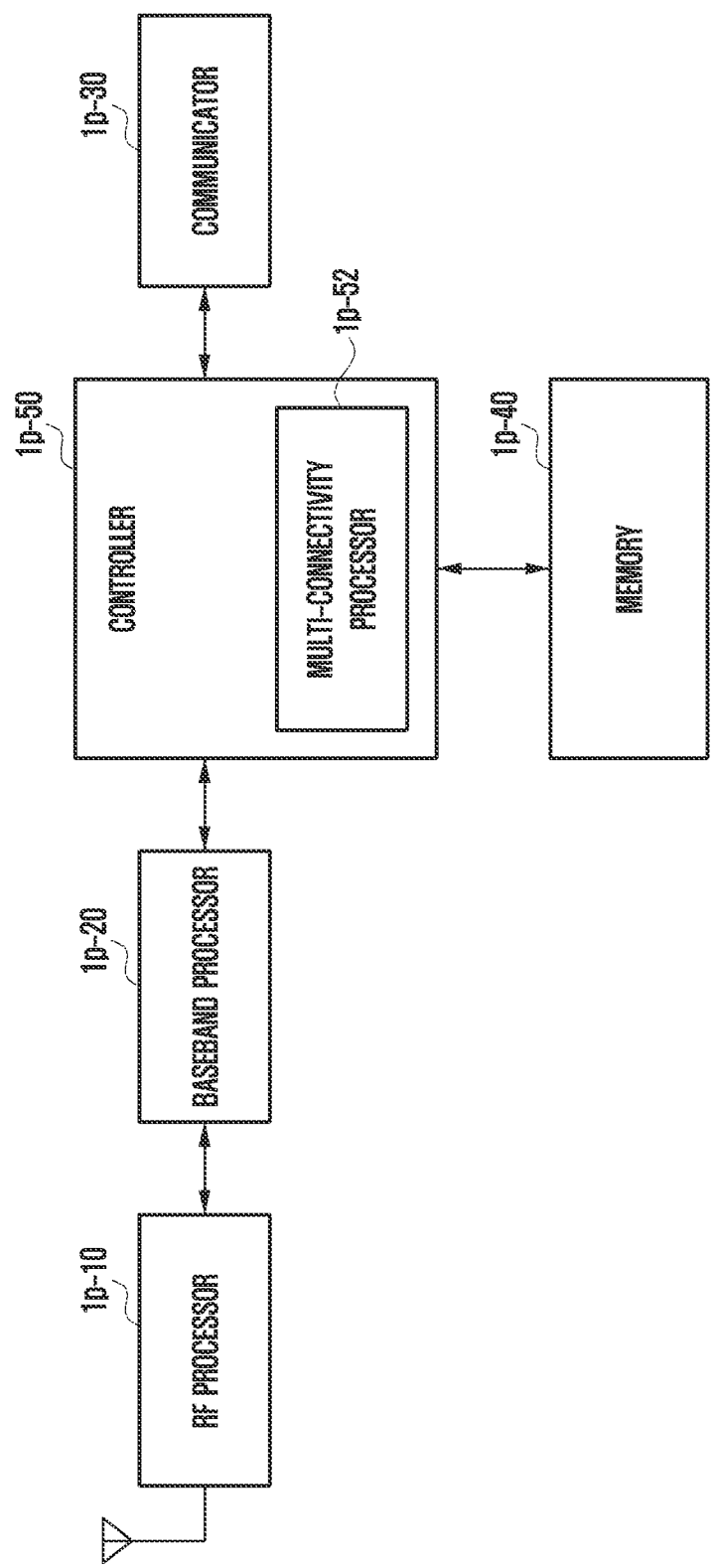
FIG. 1P is a diagram illustrating a structure of a base station according to an embodiment of the disclosure.

FIG. 1P is a diagram illustrating a structure of a base station according to an embodiment of the disclosure.

A base station according to an embodiment of the disclosure may include one or more Transmission Reception Points (TRP).

Referring to FIG. 1P, the base station according to an embodiment of the disclosure may include an RF processor 1p-10, a baseband processor 1p-20, a backhaul communicator 1p-30, a storage 1p-40, and a controller 1p-50.

The RF processor 1p-10 can perform a function for transmitting/receiving a signal through a radio channel such as changing and amplifying the band of a signal. That is, the RF processor 1p-10 can convert upward a baseband signal provided from the baseband processor 1p-20 into an RF band signal and then receive the RF band signal through an antenna, and can convert the RF band signal received through the antenna downward into a baseband signal. For example, the RF processor 1p-10 may include a transmission filter, a reception filter, an amplifier, a mixer, an oscillator, a DAC, an ADC, etc.

Although only one antenna is shown in FIG. 1P, the base station may include several antennas.

The RF processor 1p-10 may include several RF chains. The RF processor 1p-10 can perform beamforming. For beamforming, the RF processor 1p-10 can adjust the phases and intensities of signals transmitted/received through several antennas or antenna elements. The RF processor 1p-10 can perform downward MIMO by transmitting one or more layers.

The baseband processor 1p-20 can perform a conversion function among base band signals and bit strings in accordance with the physical layer specification of a first radio access technology. For example, the baseband processor 1p-20 can generate complex symbols by encoding and modulating transmission bit strings when transmitting data. Further, when receiving data, the baseband processor 1p-20 can restore reception bit strings by demodulating or decoding a baseband signal provided from the RF processor 1p-10. For example, according to OFDM, the baseband processor 1p-20 generates complex symbols by encoding and modulating transmission bit strings when transmitting data, maps the complex symbols to subcarriers, and then performs IFFT and CP, thereby being able to configure OFDM symbols. Further, when receiving data, the baseband processor 1p-20 divides a baseband signal provided from the RF processor 1p-10 in the unit of OFDM symbol, restores signals mapped to subcarriers through FFT, and then performs demodulating or decoding, thereby being able to restore a reception bit string. The baseband processor 1p-20 and the RF processor 1p-10 can transmit and receive a signal, as described above.

Accordingly, the baseband processor 1p-20 and the RF processor 1p-10 may be referred to as a transmitter, a receiver, a transceiver, a communicator, or a radio communicator.

The communicator 1p-30 provides an interface for communication with other nodes in the network. That is, the communicator 1p-30 can convert a bit string transmitted from a main base station to another node, for example, a sub-base station and a core network into a physical signal and can convert a physical signal received from another node into a bit string.

The storage 1p-40 can store data such as fundamental programs, applications, and configuration information for operation of the main base station. In particular, the storage 1p-40 can store information about a bearer allocated to a connected UE, a measurement result reported from the connected UE, etc. The storage 1p-40 can provide multi-connection to a UE or can store information that is the reference for determining whether to stop the multi-connection. The storage 1p-40 can provide stored data in accordance with a request from the controller 1p-50.

The controller 1p-50 can control general operations of the main base station. For example, the controller 1p-50 can transmit/receive a signal through the baseband processor 1p-20 and the RF processor 1p-10, or through the communicator 1p-30. The controller 1p-50 can record and read data in and from the storage 1p-40. To this end, controller 1p-50 may include at least one processor 1p-52.

Methods according to the claims of the disclosure or the embodiments described in the specification may be implemented in hardware, software, or a combination of software and hardware.

When they are implemented in software, a computer-readable storage medium that stores one or more programs (software modules) may be provided. The one or more programs stored in the computer-readable storage medium are configured to be able to be executed by one or more processors in an electronic device. The one or more programs include instructions for the electronic device to perform the methods according to the claims of the disclosure or embodiments described in the specification.

Such programs (software modules, software) may be stored in a nonvolatile memory including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or another type of optical storage device, and a magnetic cassette. Alternatively, they may be stored in a memory configured by combining some or all of the devices. Each configuration memory may be included as several pieces.

The programs may be stored in an attachable storage device that can be accessed through a communication network such as the internet, an intranet, a Local Area Network (LAN), a Wide LAN (WLAN), or a Storage Area Network (SAN), or a network configured by combining them. The storage device can access a device that performs embodiments of the disclosure through an external port. A separate storage device in a communication network can access a device that performs the embodiments of the disclosure.

In the detailed embodiment of the disclosure described above, the components included in the disclosure were described in singular forms or plural forms, depending on the proposed detailed embodiments. However, the singular or plural expressions were appropriately selected in the proposed situations for the convenience of description and the disclosure is not limited to the singular or plural components. Further, even if components are described in a plural form, they may be singular components, or even if components are described in a singular form, they may be plural components.

Although detailed embodiments were described above, various modifications are possible without departing from the scope of the disclosure. Accordingly, the range of the disclosure is not limited to the embodiments and should be defined by not only the range of the claims described below, but also equivalents to the range of the claims.

Second Embodiment

In the following description of the disclosure, detailed descriptions of well-known functions or configurations relating to the disclosure will not be provided so as not to obscure the description of the disclosure with unnecessary details. Hereinafter, embodiments of the disclosure are described with reference to the accompanying drawings.

Figure 2A:
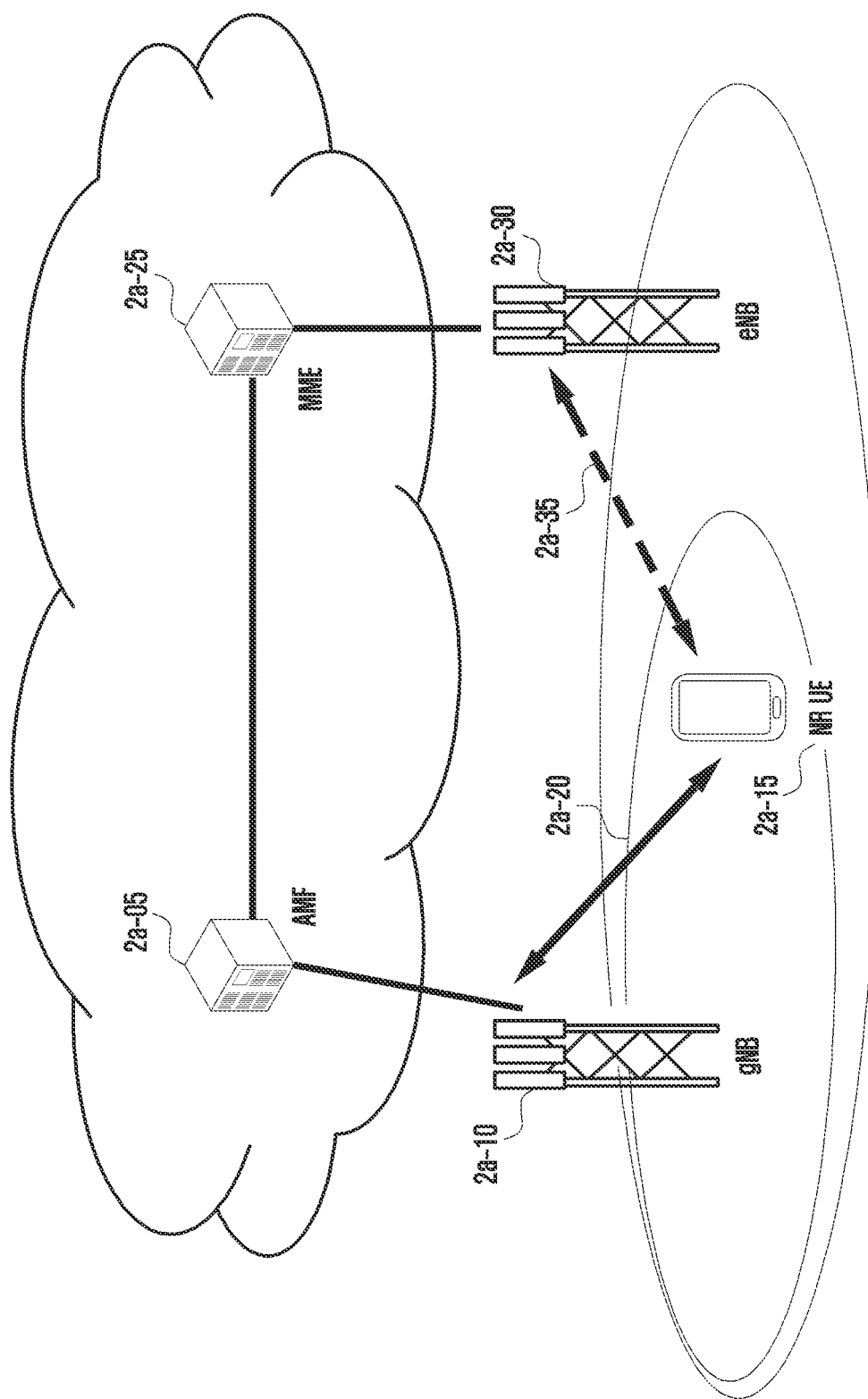
FIG. 2A is a diagram illustrating a structure of a next generation mobile communication system according to an embodiment of the disclosure.

FIG. 2A is a diagram illustrating a structure of a next generation mobile communication system according to an embodiment of the disclosure.

Referring to FIG. 2A, as shown in the figure, a radio access network of a next generation mobile communication system (new radio, NR) may be composed of a new radio node B (hereafter, a gNB) 2a-10 and an access and mobility management function (AMF) (New Radio Core Network) 2a-05. A new radio user equipment (hereafter, a NR UE or UE) 2a-15 in a cell 2a-20 is connected to an external network through the gNB 2a-10 and the AMF 2a-05.

In FIG. 2A, the gNB correspond to an Evolved Node B (eNB) of an existing LTE system. The gNB is connected with the NR UE through a radio channel and can provide an excellent service more than an existing node B. In the next generation mobile communication system, all user traffics are served through a shared channel, so there is a need for a device that performs scheduling by combining state information such as a buffer state, an available power state, and a channel state of UEs, and the gNB 2g-10 takes charge of the device. One gNB generally controls several cells. In order to implement high-speed data transmission faster than existing LTE, a bandwidth over an existing maximum bandwidth may be provided, and a beamforming technology may be additionally employed by using orthogonal frequency division multiplexing (hereafter, referred to as OFDM) as a radio access technology. It is also possible to apply modulation scheme and Adaptive Modulation & Coding (hereafter, referred to as AMC) determining a channel coding rate, depending on the channel state of a user equipment. The AMF 2a-05 performs functions such as supporting mobility, configuring a bearer, and configuring QoS. The AMF, which is a device being in charge of not only a mobility management function for UEs, but also various control functions, is connected to several base stations. The next generation mobile communication system can operate with an existing LTE system and the AMF is connected with an MME 2a-25 through a network interface. The MME is connected with an eNB 2a-30 that is an existing base station. A UE supporting LTE-NR Dual Connectivity can transmit/receive data while maintaining connection with not only the gNB, but also the eNB (2a-35).

Figure 2B:
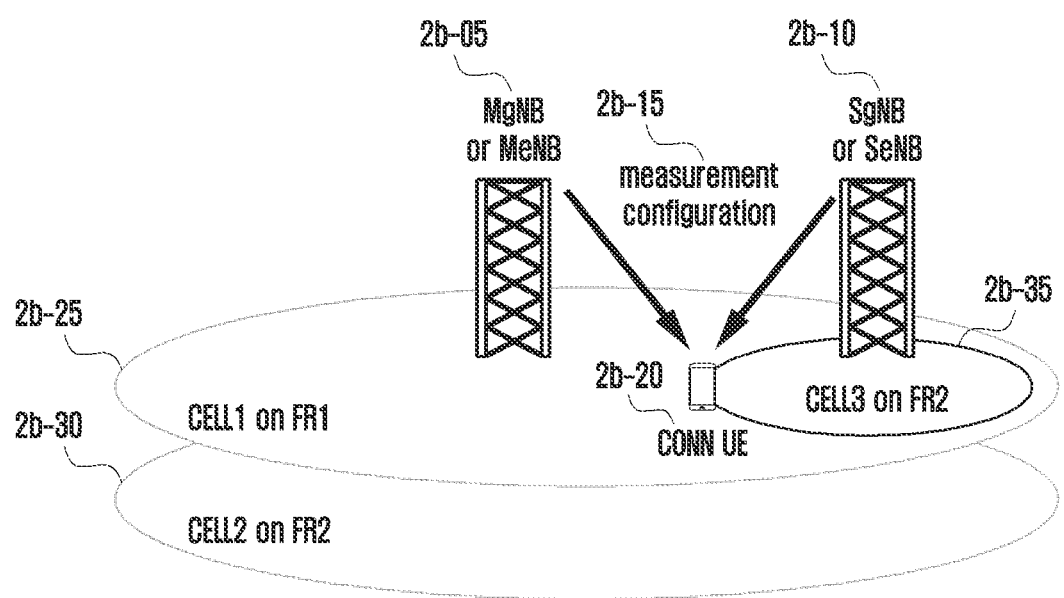
FIG. 2B is a diagram illustrating a dual-connection scenario in a next generation mobile communication system according to an embodiment of the disclosure.

FIG. 2B is a diagram illustrating a dual-connectivity scenario in a next generation mobile communication system according to an embodiment of the disclosure.

Referring to FIG. 2B, Dual Connectivity (DC) refers to a technology that is connected with a plurality of base stations 2b-05 and 2b-10 and is provided with a radio communication service. The first base station 2b-05, which is a Master Node (MN), configures one or more serving cells of the second base station 2b-10, that is, a Secondary Node (SN) to a UE 2b-20. If both of the first base station and the second base station are NR base stations, they are referred as NR-DCs, if the first base station is an LTE base station and the second base station of an NR base station, they are referred to as EN-DCs, and if the first base station is an NR base station and the second base station is an LTE base station, they are referred to as NE-DCs. The serving cells of each base station can serve the UE 2b-20 using different frequencies. In general, a low frequency range (450-6000 MHz) is referred to as an FR1 and a high frequency range (24250-52600 MHz) is referred to as an FR2. For example, the first cell 2b-25 that the first base station provides pertains to the FR1 and the second cell 2b-30 pertains to the FR2, and the third cell 2b-35 that the second base station provides pertains to the FR2.

In the disclosure, it may be possible to consider a situation in which macro cells and micro cells exist together. The macro cell, which is a cell that is controlled by a macro base station, provides a service in a relative wide area. In this case, the macro cell may be composed of an LTE base station MeNB and an LTE base station SeNB. As another embodiment, in this case, the macro cell may be composed of an LTE (MeNB) base station and an NR base station SgNB. As another embodiment, in this case, the macro cell may be composed of an NR (MgNB) base station and an LTE base station SgNB. As another embodiment, in this case, the macro cell may be composed of an NR (MgNB) base station and an NR base station SgNB.

A base station can configure a measurement gap 2b-15 that temporarily stops data transmission/reception to a UE to measure another frequency.

In a DC scenario, the MN can configure a measurement gap that is applied to the serving cells of the MN or the SN and the SN can also configure a measurement gap that is applied to the serving cells of the SN. The measurement gap is largely classified into three kinds. A per-UE gap is applied to all serving cells configured in a UE. An FR1 gap is applied to serving cells pertaining to the FR1. An FR2 gap is applied to serving cells pertaining to the FR2. As for the EN-DC, the MN can configure all of the per-UE gap, FR1 gap, and FR2 gap and the SN can configure only the FR2 gap. When the per-UE gap is configured, the RF1 gap and the FR2 gap can be configured. The configuration information of the gaps includes the following information:

gapOffset: offset information of gap pattern
mgl: length of gap
mgrp: repetitive cycle of gap
mgta: gap timing advance information A UE receiving the information can derive a radio frame and a subframe at which the gaps start through the following formula:

$$\text{SFN mod } T = \text{FLOOR}(\text{gapOffset}/10)$$

$$\text{subframe} = \text{gapOffset mod } 10$$

where $T = MGRP/10$                                Formula 1

An SFN and a subframe timing that are references are required to derive an actual gap period from the formula. In a DC, a plurality of serving cells may exist and the SFN and the subframe timing of the serving cells may be different. Accordingly, it is required to use the SFN and the subframe of which serving cell as references.

The disclosure proposes a method of selecting a serving cell that is the reference from various DC scenarios such as the EN-DC, NR-DC, and NE-DC.

A 2-1 embodiment is characterized by driving a gap, based on the SFN and the subframe of a special cell of a base station configuring the gas configuration information. A base station that configured one item of gap configuration information and a base station providing the information to a UE may be different. For example:

In case 1: If gap configuration information is provided through an RRCReconfiguration message pertaining to an SBR1, the configuration information is configured and provided to a UE by an MN.

In case 2: If gap configuration information is provided through an RRCReconfiguration message pertaining to an SBR3, the configuration information is configured and provided to a UE by an SN. The corresponding DC scenario is an NR-DC or an EN-DC.

In case 3: If gap configuration information is accommodated in an nr-SCG (a container accommodating NR SCG-related configuration information) and provided from an RRCReconfiguration message pertaining to the SRB1, the configuration information is configured by an SN and is provided to a UE by an MN. The corresponding DC scenario is an NR-DC.

In case 4: If gap configuration information is accommodated in an eutra-SCG (a container accommodating EUTRA SCG-related configuration information) and provided from an RRCReconfiguration message pertaining to the SRB1, the configuration information is configured by an SN and is provided to a UE by an MN. The corresponding DC scenario is an NE-DC.

In case 5: If gap configuration information is accommodated in an NR container and provided from an RRCConnectionReconfiguration message pertaining to the SRB1, the configuration information is configured by an SN and is provided to a UE by an MN. The corresponding DC scenario is an EN-DC.

In consideration of a node in which the gap configuration information is configured, the case 1 selects PCell, the case 2 selects PSCell, the case 3 selects PSCell, the case 4 selects PSCell, and the case 5 selects PSCell as reference cells, respectively, and the SFN and the subframe numbers of the serving cells are applied to the formula.

A 2-2 embodiment is characterized by applying the SFN and the timing of the subframe of PSCell only to the FR2 gap in the EN-DC. The SFN and the timing of the subframe of PCell are applied to all of the other DC scenario, NR-DC, and NE-DC except for the EN-DC. A UE receiving an RRCReconfiguration message including measConfig determines a reference serving cell. The method of selecting the reference serving cell in the 2-2 embodiment is as follows.

If it is a per-UE gap/FR1 gap, a gap timing is calculated by applying the SFN and the subframe number of the PCell.

If it is FR2 gap and the EN-DC is configured, that is, if the PCell is an LTE cell and an MCG is composed of LTE serving cells or the MCG is LTE, the gap timing is calculated by applying the SFN and the subframe number of the PSCell pertaining to the FR2.

When it is the FR2gap and the EN-DC is not configured, that is, an NR SA, an NE-DC, and an NR-DC are configured, or the MCG is an NR, the gap timing is calculated by applying the SFN and the subframe number of the PCell.

If it is the per-UE gap during the determined gap time period, downlink reception and uplink transmission are stopped in all serving cells, if it is the FR1 gap, downlink reception and uplink transmission are stopped in all serving cells pertaining to the FR1, and if it is the FR2 gap, downlink reception and uplink transmission are stopped in all serving cells pertaining to the FR2.

Figure 2C:
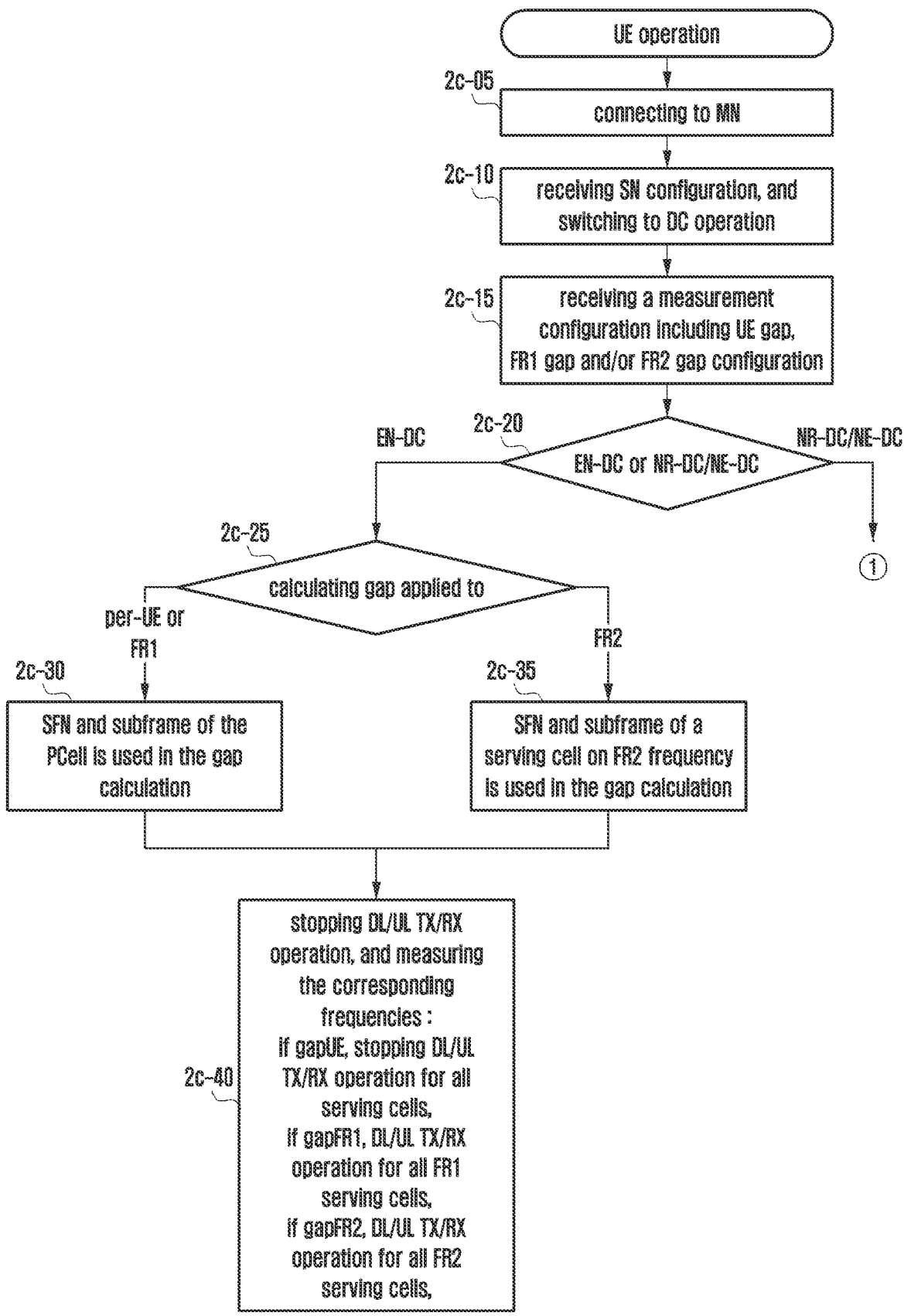
FIGS. 2CA and 2CB are flowcharts illustrating a user equipment process of applying cell measurement period configuration in a dual-connection scenario in a 2-1 embodiment according to various embodiments of the disclosure.
Figure 2C:
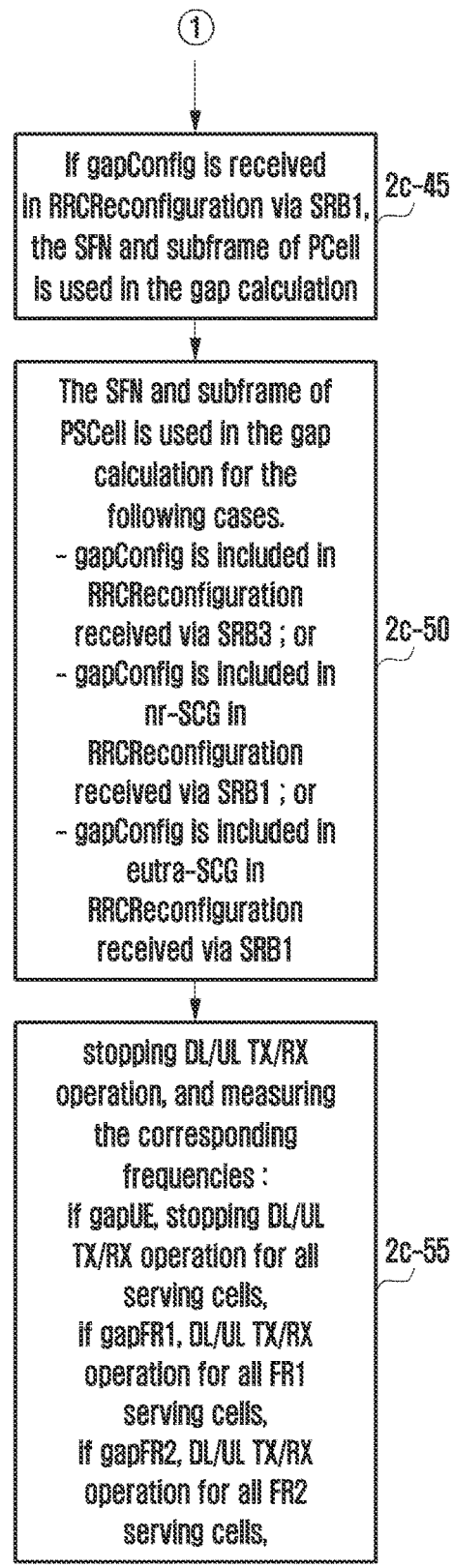

FIGS. 2CA and 2CB are flowcharts illustrating a user equipment process of applying cell measurement period configuration in a dual connectivity scenario in the 2-1 embodiment according to various embodiments of the disclosure.

Referring to FIGS. 2CA and 2CB, a UE is connected with an MN in operation 2c-05.

In operation 2c-10, the UE receives configuration information related to SN connection from the MN and performs dual connectivity.

In operation 2c-15, the UE receives measurement configuration information including gap configuration information from the MN or the SN.

In operation 2c-20, the UE determines the DC scenario that is being applied.

In operation 2c-25, if it is an EN-DC, the UE determines what kind of gap has been configured.

In operation 2c-30, if it is a per-UE or an FR1 gap, the SFN and the subframe of PCell are applied to the gap calculation.

In operation 2c-35, if it is an FR2 gap, the SFN and the subframe of PSCell are applied to the gap calculation.

In operation 2c-40, the per-UE gap is applied to all serving cells configured in the UE. The FR1 gap is applied to serving cells pertaining to the FR1. The FR2 gap is applied to serving cells pertaining to the FR2. The UE stops downlink reception and uplink transmission during the gap time period.

In operation 2c-45, if it is an NR-DC or an NE-DC and the gap configuration information has been received through an RRCReconfiguration message pertaining to the SRB1, the SFN and the subframe of the PCell are applied to the gap calculation.

In operation 2c-50, if it is an NR-DC or an NE-DC and the gap configuration information has not been received through an RRCReconfiguration message pertaining to the SRB1, the SFN and the subframe of the PSCell are applied to the cap calculation.

In operation 2c-55, the per-UE gap is applied to all serving cells configured in the UE. The FR1 gap is applied to serving cells pertaining to the FR1. The FR2 gap is applied to serving cells pertaining to the FR2. The UE stops downlink reception and uplink transmission during the gap time period.

Figure 2D:
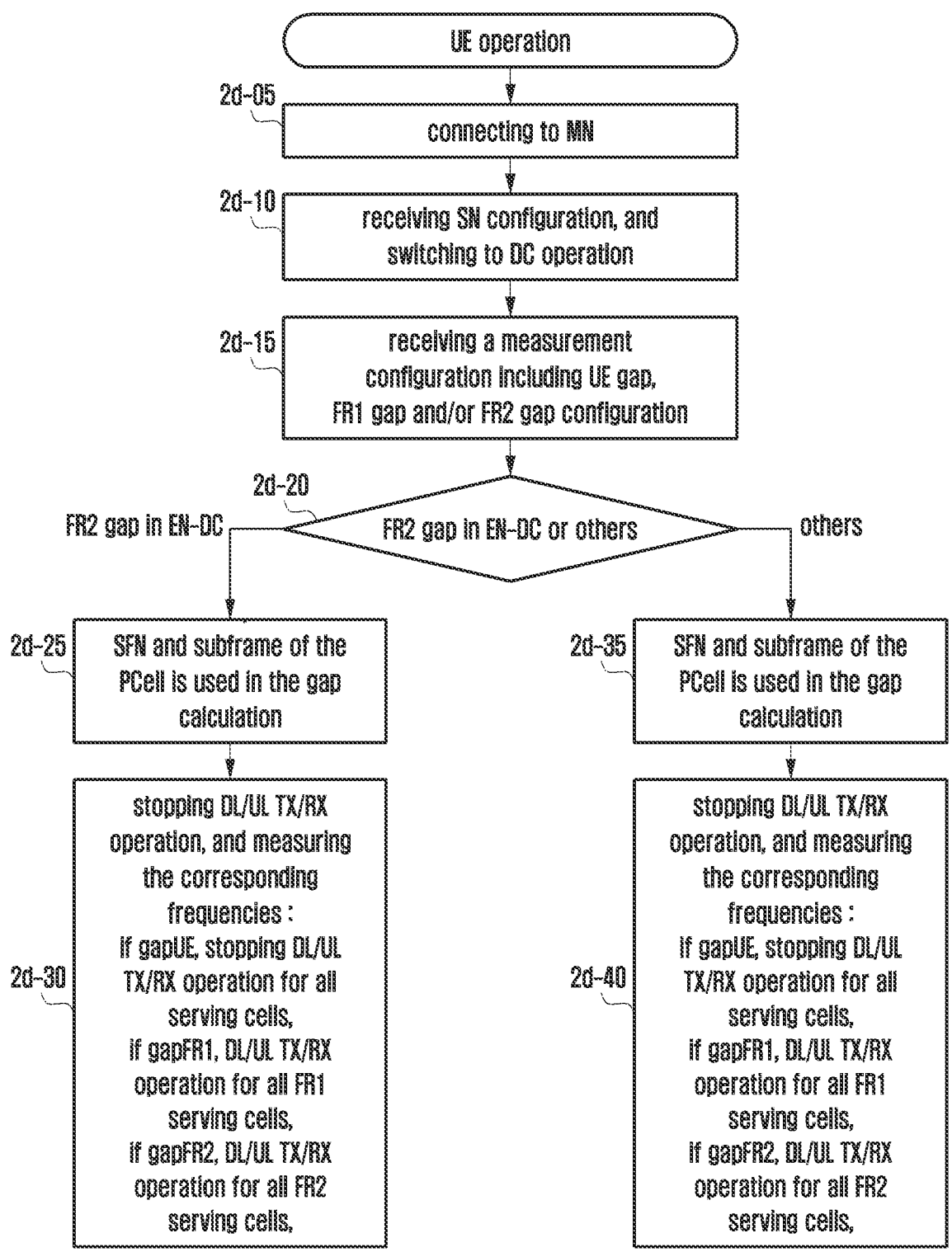
FIG. 2D is a flowchart illustrating a user equipment process of applying cell measurement period configuration in a dual-connection scenario in a 2-2 embodiment according to an embodiment of the disclosure.

FIG. 2D is a flowchart illustrating a user equipment process of applying cell measurement period configuration in a dual-connection scenario in a 2-2 embodiment according to an embodiment of the disclosure.

Referring to FIG. 2D, a UE is connected with an MN in operation 2d-05.

In operation 2d-10, the UE receives configuration information related to SN connection from the MN and performs dual connectivity.

In operation 2d-15, the UE receives measurement configuration information including gap configuration information from the MN or the SN.

In operation 2d-20, the UE determines whether the EN-DC has been configured and FR2 gap configuration information has been provided.

In operation 2d-25, if the EN-DC has been configured and the FR2 gap configuration information has been provided, the SFN and the subframe of the PSCell are applied to the gap calculation.

In operation 2*d*-30, the per-UE gap is applied to all serving cells configured in the UE. The FR1 gap is applied to serving cells pertaining to the FR1. The FR2 gap is applied to serving cells pertaining to the FR2. The UE stops downlink reception and uplink transmission during the gap time period.

In operation 2*d*-35, if per-UE gap or FR1 gap configuration information has been provided or if the EN-DC has not been configured and the FR2 gap configuration information has been provided, the SFN and the subframe of the PCell are applied to the gap calculation.

In operation 2*d*-40, the per-UE gap is applied to all serving cells configured in the UE. The FR1 gap is applied to serving cells pertaining to the FR1. The FR2 gap is applied to serving cells pertaining to the FR2. The UE stops downlink reception and uplink transmission during the gap time period.

Figure 2E:
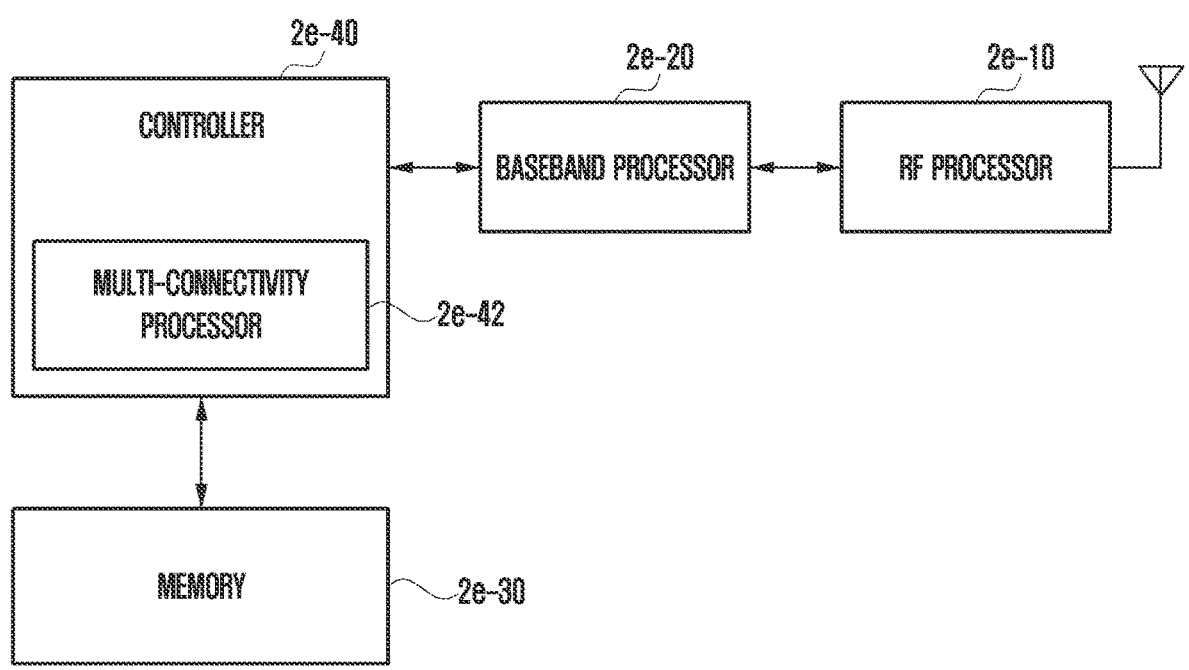
FIG. 2E is a block diagram illustrating an internal structure of a user equipment according to an embodiment of the disclosure.

FIG. 2E illustrates the structure of a UE according to an embodiment of the disclosure.

Referring to FIG. 2E, the UE includes a Radio Frequency (RF) processor 2*e*-10, a baseband processor 2*e*-20, a storage 2*e*-30, and a controller 2*e*-40.

The RF processor 2*e*-10 performs a function for transmitting/receiving a signal through a radio channel such as changing and amplifying the band of a signal. That is, the RF processor 2*e*-10 converts upward a baseband signal provided from the baseband processor 2*e*-20 into an RF band signal and then receives the RF band signal through an antenna, and converts the RF band signal received through the antenna downward into a baseband signal. For example, the RF processor 2*e*-10 may include a transmission filter, a reception filter, an amplifier, a mixer, an oscillator, a digital-to-analog converter (DAC), an analog-to-digital converter (ADC), etc. Although only one antenna is shown in the figure, the UE may have several antennas. The RF processor 2*e*-10 may include several RF chains. The RF processor 2*e*-10 can perform beamforming. For beamforming, the RF processor 2*e*-10 can adjust the phases and intensities of signals transmitted/received through several antennas or antenna elements. The RF processor can perform MIMO and can receive several layers when performing MIMO.

The baseband processor 2*e*-20 performs a conversion function among base band signals and bit strings in accordance with the physical layer specification of the system. For example, the baseband processor 2*e*-20 generates complex symbols by encoding and modulating transmission bit strings when transmitting data. When receiving data, the baseband processor 2*e*-20 restores a reception bit string by demodulating and decoding a baseband signal provided from the RF processor 2*e*-10. For example, according to Orthogonal Frequency Division Multiplexing (OFDM), the baseband processor 2*e*-20 generates complex symbols by encoding and modulating transmission bit strings when transmitting data, maps the complex symbols to subcarriers, and then performs Inverse Fast Fourier transform (IFFT) and Cyclic Prefix (CP), thereby configuring OFDM symbols. Further, when receiving data, the baseband processor 2*e*-20 divides a baseband signal provided from the RF processor 2*e*-10 in the unit of OFDM symbol, restores signals mapped to subcarriers through Fast Fourier Transform (FFT), and then performs demodulating or decoding, thereby restoring a reception bit string.

The baseband processor 2*e*-20 and the RF processor 2*e*-10 transmit and receive a signal, as described above. Accordingly, the baseband processor 2*e*-20 and the RF processor 2*e*-10 may be referred to as a transmitter, a receiver, a transceiver, or a communicator. At least one of the baseband processor 2*e*-20 and the RF processor 2*e*-10 may include several communication modules to support several different radio access technologies. At least one of the baseband processor 2*e*-20 and the RF processor 2*e*-10 may include different communication modules to process signals of different frequency bands. For example, the different radio access technologies may include a radio LAN (e.g., IEEE 802.11) and a cellular network (e.g., LTE). The different frequency bands may include Super High Frequency (SHF) bands (for example, 2.NRHz and NRhz) and millimeter wave bands (for example, 60 GHz).

The storage 2*e*-30 keeps data such as fundamental programs, applications, and setting information for operation of the UE. In particular, the storage 2*e*-30 can store information about a second access node that performs radio communication using a second radio access technology. The storage 2*e*-30 provides stored data in accordance with a request from the controller 2*e*-40.

The controller 2*e*-40 controls general operations of the UE. For example, the controller 2*e*-40 transmits and receives a signal through the baseband processor 2*e*-20 and the RF processor 2*e*-10. The controller 2*e*-40 records and reads data in and from the storage 2*e*-30. To this end, the controller 1*o*-40 may include at least one processor. For example, the controller 2*e*-40 may include a communication processor (CP) 2*e*-42 that controls communication and an application processor (AP) that control upper links such as applications.

Figure 2F:
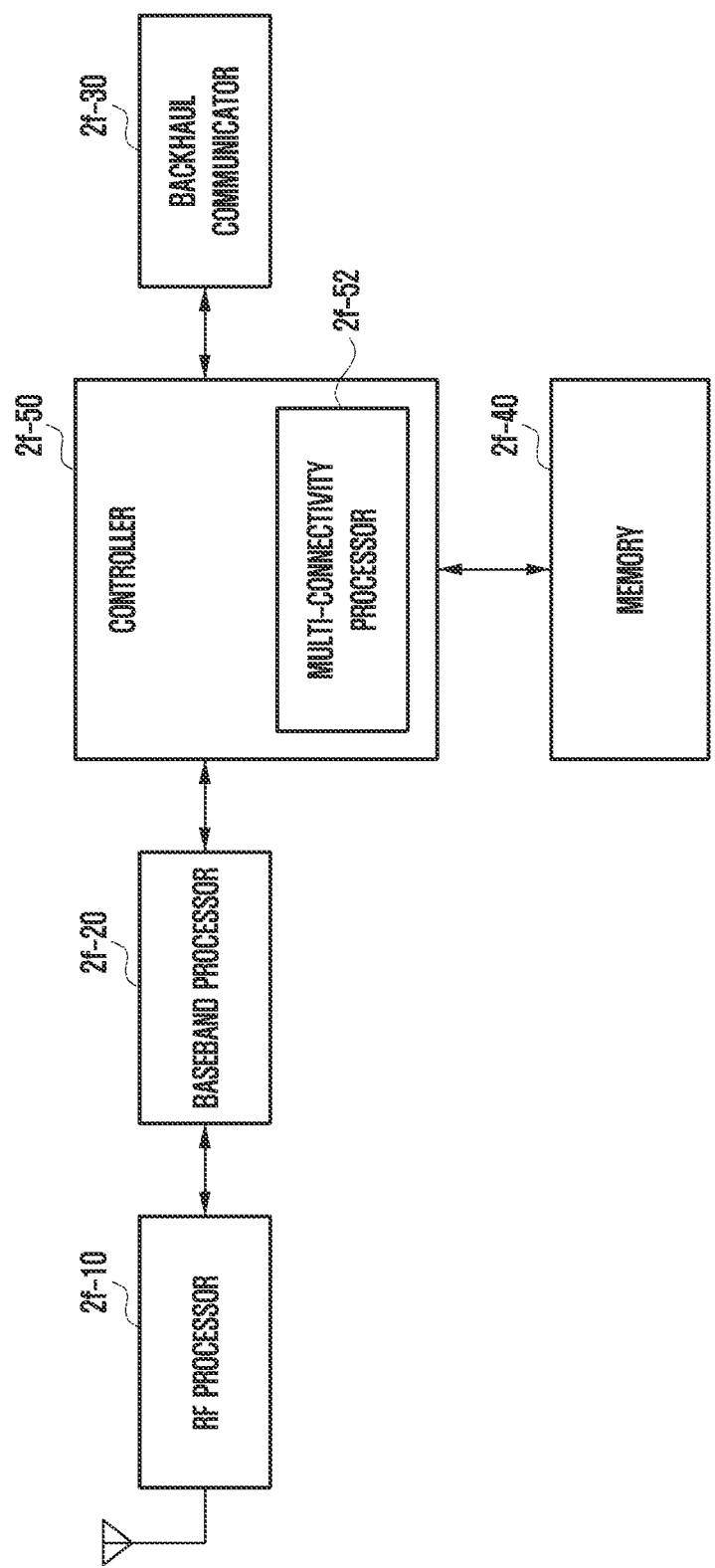
FIG. 2F is a block diagram illustrating a configuration of a base station according to an embodiment of the disclosure.

FIG. 2F illustrates a block configuration of a main base station in a radio communication system according to an embodiment of the disclosure.

Referring to FIG. 2F, the base station includes an RF processor 2*f*-10, a baseband processor 2*f*-20, a backhaul communicator 2*f*-30, a storage 2*f*-40, and a controller 2*f*-50.

The RF processor 2*f*-10 performs a function for transmitting/receiving a signal through a radio channel such as changing and amplifying the band of a signal. That is, the RF processor 2*f*-10 converts upward a baseband signal provided from the baseband processor 2*f*-20 into an RF band signal and then transmits the RF band signal through an antenna, and converts the RF band signal received through the antenna downward into a baseband signal. For example, the RF processor 2*f*-10 may include a transmission filter, a reception filter, an amplifier, a mixer, an oscillator, a DAC, an ADC, etc. Although only one antenna is shown in the figure, the first access node may have several antennas. The RF processor 2*f*-10 may include several RF chains. The RF processor 2*f*-10 can perform beamforming. For beamforming, the RF processor 2*f*-10 can adjust the phases and intensities of signals transmitted/received through several antennas or antenna elements. The RF processor can perform downward MIMO by transmitting one or more layers.

The baseband processor 2*f*-20 performs a conversion function among base band signals and bit strings in accordance with the physical layer specification of a first radio access technology. For example, the baseband processor 2*f*-20 generates complex symbols by encoding and modulating transmission bit strings when transmitting data. When receiving data, the baseband processor 2*f*-20 restores a reception bit string by demodulating and decoding a baseband signal provided from the RF processor 2*f*-10. For example, according to OFDM, the baseband processor 2*f*-20 generates complex symbols by encoding and modulating transmission bit strings when transmitting data, maps the complex symbols to subcarriers, and then performs IFFT and CP, thereby configuring OFDM symbols. Further, when receiving data, the baseband processor 2*f*-20 divides a baseband signal provided from the RF processor 2*f*-10 in the unit of OFDM symbol, restores signals mapped to subcarriers through FFT, and then performs demodulating or decoding, thereby restoring a reception bit string. The baseband processor 2f-20 and the RF processor 2f-10 transmit and receive a signal, as described above. Accordingly, the baseband processor 2f-20 and the RF processor 2f-10 may be referred to as a transmitter, a receiver, a transceiver, a communicator, or a radio communicator.

The backhaul communicator 2f-30 provides an interface for communication with other nodes in the network. That is, the backhaul communicator 2f-30 converts a bit string transmitted from a main base station to another node, for example, a sub-base station and a core network into a physical signal and converts a physical signal received from another node into a bit string.

The storage 2f-40 keeps data such as fundamental programs, applications, and setting information for operation of the main base station. In particular, the storage 2f-40 can store information about a bearer allocated to a connected UE, a measurement result reported from the connected UE, etc. The storage 2f-40 can provide multi-connection to a UE or can store information that is the reference for determining whether to stop the multi-connection. The storage 2f-40 provides stored data in accordance with a request from the controller 2f-50.

The controller 2f-50 controls general operations of the main base station. For example, the controller 2f-50 transmits and receives a signal through the baseband processor 2e-20 and the RF processor 2e-10, or through the backhaul communicator 2f-30. The controller 2f-50 records and reads data in and from the storage 2f-40. To this end, controller 2f-50 may include at least one processor. 2f-52

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) in a radio communication system, the method comprising:
    transmitting, to a second UE, a UECapabilityEnquirySidelink message for requesting a sidelink UE capability of the second UE, wherein the UECapabilityEnquirySidelink message includes information associated with a sidelink UE capability including a radio access capability of the first UE and information to request a filtered sidelink UE capability of the second UE;
    receiving, from the second UE, a message including information associated with the filtered sidelink UE capability of the second UE, in response to transmission of the UECapabilityEnquirySidelink message; and
    transmitting a radio resource control (RRC) message including at least one of information related to a sidelink signaling radio bearer (SRB), information related to a sidelink data radio bearer (DRB), or resource pool, based on the received information associated with the filtered sidelink UE capability of the second UE.

2. The method of claim 1, wherein the radio access capability includes radio access technology (RAT) information.

3. The method of claim 1, further comprising performing a discovery procedure for sidelink unicast communication between the first UE and the second UE.

4. A method performed by a second user equipment (UE) in a radio communication system, the method comprising:
    receiving, from a first UE, a UECapabilityEnquirySidelink message requesting for a sidelink UE capability of the second UE, wherein the UECapabilityEnquirySidelink message includes information associated with a sidelink UE capability including a radio access capability of the first UE and information to request a filtered sidelink UE capability of the second UE;
    transmitting, to the first UE, a message including information associated with the filtered sidelink UE capability of the second UE, in response to reception of the UECapabilityEnquirySidelink message; and
    receiving a radio resource control (RRC) message including at least one of information related to a sidelink signaling radio bearer (SRB), information related to a sidelink data radio bearer (DRB), or resource pool, based on the transmitted information associated with the filtered sidelink UE capability of the second UE.

5. The method of claim 4, wherein the radio access capability includes radio access technology (RAT) information.

6. The method of claim 4, further comprising performing a discovery procedure for sidelink unicast communication by between the first UE and the second UE.

7. A first user equipment (UE) comprising:
    a transceiver; and
    at least one processor configured to:
        control the transceiver to transmit, to a second UE, a UECapabilityEnquirySidelink message requesting fora sidelink UE capability of the second UE, wherein the UECapabilityEnquirySidelink message includes information associated with a sidelink UE capability including a radio access capability of the first UE and information to request a filtered sidelink UE capability of the second UE,
        control the transceiver to receive, from the second UE, a message including information associated with the filtered sidelink UE capability of the second UE, in response to transmission of the UECapabilityEnquirySidelink message, and
        control the transceiver to transmit a radio resource control (RRC) message including at least one of information related to a sidelink signaling radio bearer (SRB), information related to a sidelink data radio bearer (DRB), or resource pool, based on the received information associated with the filtered sidelink UE capability of the second UE.

8. The first user equipment of claim 7, wherein the radio access capability includes radio access technology (RAT) information.

9. The first UE of claim 7, wherein the at least one processor is further configured to perform a discovery procedure for sidelink unicast communication between the first UE and the second UE.

10. A second user equipment (UE) comprising:
    a transceiver; and
    at least one processor configured to:
        control the transceiver to receive, from a first UE, a UECapabilityEnquirySidelink message requesting fora sidelink UE capability of the second UE, wherein the UECapabilityEnquirySidelink message includes information associated with a sidelink UE capability including a radio access capability of the first UE and information to request a filtered sidelink UE capability of the second UE,
        control the transceiver to transmit, to the first UE, a message including information associated with the filtered sidelink UE capability of the second UE, in response to reception of the UECapabilityEnquirySidelink message, and control the transceiver to receive a radio resource control (RRC) message including at least one of information related to a sidelink signaling radio bearer (SRB), information related to a sidelink data radio bearer (DRB), or resource pool, based on the transmitted information associated with the filtered sidelink UE capability of the second UE.

11. The second user equipment of claim 10, wherein the radio access capability includes radio access technology (RAT) information.

12. The second UE of claim 10, wherein the at least one processor is further configured such that the first UE and the second UE perform a discovery procedure for sidelink unicast communication.

* * * * *